(12) United States Patent
Baba et al.

(10) Patent No.: US 9,739,038 B2
(45) Date of Patent: Aug. 22, 2017

(54) POSTURE COMPUTING APPARATUS FOR WORK MACHINE, WORK MACHINE, AND POSTURE COMPUTATION METHOD FOR WORK MACHINE

(71) Applicant: Komatsu Ltd., Tokyo (JP)

(72) Inventors: Akinori Baba, Hiratsuka (JP); Masashi Ichihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 310 days.

(21) Appl. No.: 14/390,157

(22) PCT Filed: Jun. 4, 2014

(86) PCT No.: PCT/JP2014/064891
§ 371 (c)(1),
(2) Date: Oct. 2, 2014

(87) PCT Pub. No.: WO2015/186214
PCT Pub. Date: Dec. 10, 2015

(65) Prior Publication Data
US 2016/0251836 A1 Sep. 1, 2016

(51) Int. Cl.
*G06F 3/048* (2013.01)
*E02F 9/26* (2006.01)
(Continued)

(52) U.S. Cl.
CPC .............. *E02F 9/265* (2013.01); *E02F 3/435* (2013.01); *E02F 9/123* (2013.01); *E02F 9/262* (2013.01);
(Continued)

(58) Field of Classification Search
CPC ......... E02F 3/435; E02F 9/2025; E02F 3/438; E02F 3/437; E02F 9/2221; E02F 9/205; G08C 17/02; G06F 3/048
See application file for complete search history.

(56) References Cited

U.S. PATENT DOCUMENTS 5,303,551 A * 4/1994 Lee ...................... E02F 9/2221
417/34
5,629,849 A * 5/1997 Ahn ....................... E02F 3/438
340/686.1
(Continued)

FOREIGN PATENT DOCUMENTS

CN 1952827 A 4/2007
CN 101232979 A 7/2008
(Continued)

OTHER PUBLICATIONS

International Search Report and Written Opinion mailed Sep. 2, 2014, issued for PCT/JP2014/064891.

*Primary Examiner* — Yuri Kan
(74) *Attorney, Agent, or Firm* — Locke Lord LLP

(57) ABSTRACT

A posture computing apparatus for a work machine includes a detection apparatus that is provided to the work machine and detects angular velocity and acceleration; a first posture angle computing unit that is provided to the detection apparatus and obtains a posture angle of the work machine from the angular velocity and the acceleration detected by the detection apparatus; a low-pass filter that allows the posture angle obtained by the first posture angle computing unit to pass therethrough to output the posture angle as a first posture angle; a second posture angle computing unit that outputs, as a second posture angle, a posture angle obtained from the angular velocity and the acceleration detected by the detection apparatus; and a selecting unit that outputs the first posture angle and the second posture angle in a switching manner, based on information about a change in an angle of the work machine.

21 Claims, 26 Drawing Sheets

(51) Int. Cl.
    *E02F 3/43*         (2006.01)
    *E02F 9/12*         (2006.01)
    *E02F 3/32*         (2006.01)
    *E02F 9/22*         (2006.01)
    *G01C 21/16*      (2006.01)

(52) U.S. Cl.
    CPC ............... *E02F 3/32* (2013.01); *E02F 9/2285* (2013.01); *G01C 21/16* (2013.01)

(56) References Cited

U.S. PATENT DOCUMENTS

| | | | | |
|---|---|---|---|---|
| 5,704,429 A * | 1/1998 | Lee | ................. | E02F 9/2025 |
| | | | | 172/4.5 |
| 5,835,874 A * | 11/1998 | Hirata | ................. | E02F 3/435 |
| | | | | 414/4 |
| 6,098,322 A * | 8/2000 | Tozawa | ................. | E02F 3/437 |
| | | | | 37/414 |
| 7,949,487 B2 | 5/2011 | Sugihara et al. | | |
| 9,080,317 B2 | 7/2015 | Matsuyama | | |
| 2010/0138180 A1 | 6/2010 | Sugihara et al. | | |
| 2010/0249957 A1* | 9/2010 | Price | ................. | G08C 17/02 |
| | | | | 700/83 |
| 2013/0302124 A1 | 11/2013 | Matsuyama | | |
| 2014/0107897 A1* | 4/2014 | Zhu | ................. | E02F 3/435 |
| | | | | 701/50 |

FOREIGN PATENT DOCUMENTS

| | | |
|---|---|---|
| CN | 201285289 Y | 8/2009 |
| JP | 06-057782 A | 3/1994 |
| JP | 2007-147588 A | 6/2007 |
| JP | 4807301 B2 | 11/2011 |
| KR | 10-2013-0113515 A | 10/2013 |
| WO | WO-95/30059 A1 | 11/1995 |
| WO | WO-2014/061790 A1 | 4/2014 |

\* cited by examiner

POSTURE COMPUTING APPARATUS FOR WORK MACHINE, WORK MACHINE, AND POSTURE COMPUTATION METHOD FOR WORK MACHINE

FIELD

The present invention relates to a posture computing apparatus for a work machine, a work machine, and a posture computation method for a work machine.

BACKGROUND

In recent years, there have been techniques in which a work machine such as an excavator or a bulldozer controls a work implement so as not to excavate beyond a boundary of a region of an excavation object where invasion is not allowed, and thereby excavates along the boundary (e.g., Patent Literature 1).

CITATION LIST

Patent Literature

Patent Literature 1: WO 1995/030059 A

SUMMARY

Technical Problem

When the work machine excavates along a target excavation topography representing a target shape of an excavation object of the work implement, there is a need to determine the position of the work implement included in the work machine, e.g., the position of the tooth edges of a bucket in the case of an excavator. In this case, information about the tilt of the work machine needs to be obtained accurately. For example, an IMU (Inertial Measurement Unit) is mounted on the work machine, and tilt angles such as a roll angle and a pitch angle can be obtained as information about the tilt of the work implement, from the detected values of the IMU.

When the work machine is moving, the work implement needs to be controlled to inhibit excavation of the excavation object beyond the boundary by determining the position of the work implement according to the movement of the work machine to allow the work machine to excavate along the target excavation topography. Thus, high responsiveness is required upon detecting a posture angle. However, if the responsiveness upon detecting a posture angle is increased, then the posture angle detected by the IMU may change in short cycles. Hence, when the work implement is controlled to inhibit excavation of the excavation object beyond the boundary by allowing the work machine to excavate along the target excavation topography when the work machine is static, the detection result of the position of the work implement may swing.

An object of the present invention is to control the work implement such that excavation of the excavation object beyond the target excavation topography can be inhibited, regardless of the operating state of the work machine.

Solution to Problem

According to the present invention, a posture computing apparatus for a work machine, to obtain a posture angle of the work machine including a work implement, the posture computing apparatus comprises: a detection apparatus that detects angular velocity and acceleration, the detection apparatus being provided to the work machine; a first posture angle computing unit that obtains a posture angle of the work machine from the angular velocity and the acceleration detected by the detection apparatus, the first posture angle computing unit being provided to the detection apparatus; a low-pass filter that allows the posture angle obtained by the first posture angle computing unit to pass therethrough to output the posture angle as a first posture angle; a second posture angle computing unit that outputs, as a second posture angle, a posture angle obtained from the angular velocity and the acceleration detected by the detection apparatus; and a selecting unit that outputs the first posture angle and the second posture angle in a switching manner, based on information about a change in an angle of the work machine.

According to the present invention, a posture computing apparatus for a work machine, to obtain a posture angle of the work machine including a work implement, the posture computing apparatus comprises: a detection apparatus that detects angular velocity and acceleration, the detection apparatus being provided to the work machine; a posture angle computing unit that obtains a posture angle of the work machine from the angular velocity and the acceleration detected by the detection apparatus, the posture angle computing unit being provided to the detection apparatus; a low-pass filter that performs a filtering process on the posture angle obtained by the posture angle computing unit, to obtain a first posture angle; and a selecting unit that uses, as a second posture angle, the posture angle in the posture angle computing unit, and outputs the first posture angle and the second posture angle in a switching manner, based on information about a change in an angle of the work machine.

In the present invention, it is preferable that the second posture angle computing unit includes: a first complementary filter that reduces noise contained in the posture angle obtained from the angular velocity and the acceleration detected by the detection apparatus to output a third posture angle, the first complementary filter being set with a first cutoff frequency; a second complementary filter that reduces noise contained in the posture angle obtained from the angular velocity and the acceleration detected by the detection apparatus to output a fourth posture angle, the second complementary filter being set with a second cutoff frequency different than the first cutoff frequency; and a switching unit that outputs, as the second posture angle, the third posture angle or the fourth posture angle in a switching manner, according to a state of movement of the work machine.

In the present invention, it is preferable that the second posture angle is an angle obtained by allowing the posture angle of the work machine to pass through a filter with a higher cutoff frequency than that of the low-pass filter.

In the present invention, it is preferable that the information about a change in an angle is information about a swing of the work machine.

In the present invention, it is preferable that the work machine includes a traveling body and a swing body provided on top of the traveling body, and the information about a swing of the work machine is a swing speed of the swing body, and the selecting unit outputs the first posture angle when the swing speed is less than or equal to a predetermined threshold value, and outputs the second posture angle when the swing speed exceeds the predetermined threshold value.

In the present invention, it is preferable that the selecting unit outputs the second posture angle when a difference between the first posture angle and the second posture angle exceeds a predetermined threshold value.

In the present invention, it is preferable that the selecting unit outputs the first posture angle when a swing speed of the swing body is less than or equal to a predetermined threshold value, outputs the second posture angle when the swing speed exceeds the predetermined threshold value, and outputs the second posture angle when a difference between the first posture angle and the second posture angle exceeds a predetermined threshold value.

According to the present invention, a work machine comprises: a posture computing apparatus for a work machine, wherein at least some position information of the work machine is obtained using the first posture angle or the second posture angle outputted from the posture computing apparatus for a work machine.

In the present invention, it is preferable that the work machine, comprises: a position detection apparatus that detects position information of the work machine; and a target excavation topography generating apparatus that determines a position of a work implement based on the at least some position information of the work machine outputted from the posture computing apparatus for a work machine, and the position information detected by the position detection apparatus, and generates information about a target excavation topography representing a target shape of an excavation object of the work implement, from information on a target working plane representing the target shape.

In the present invention, it is preferable that the work machine, comprises a display apparatus that displays the target excavation topography, based on display information for displaying the target excavation topography.

In the present invention, it is preferable that the work machine, comprising a work implement control unit that performs excavation control such that a speed in a direction in which the work implement approaches the excavation object is less than or equal to a speed limit, based on the information about a target excavation topography obtained from the target excavation topography generating apparatus.

According to the present invention, a posture computation method for a work machine, to obtain a posture angle of the work machine including a work implement, the posture computation method comprises: allowing a posture angle of the work machine to pass through a low-pass filter to output the posture angle as a first posture angle, and outputting the posture angle of the work machine as a second posture angle; and outputting the first posture angle and the second posture angle in a switching manner, based on information about a change in an angle of the work machine.

The present invention can control the work implement such that excavation of the excavation object beyond the target excavation topography can be inhibited, regardless of the operating state of the work machine.

DESCRIPTION OF EMBODIMENTS

A mode (embodiment) for carrying out the present invention will be described in detail with reference to the drawings.

<Overall Configuration of a Work Machine>

Figure 1A:
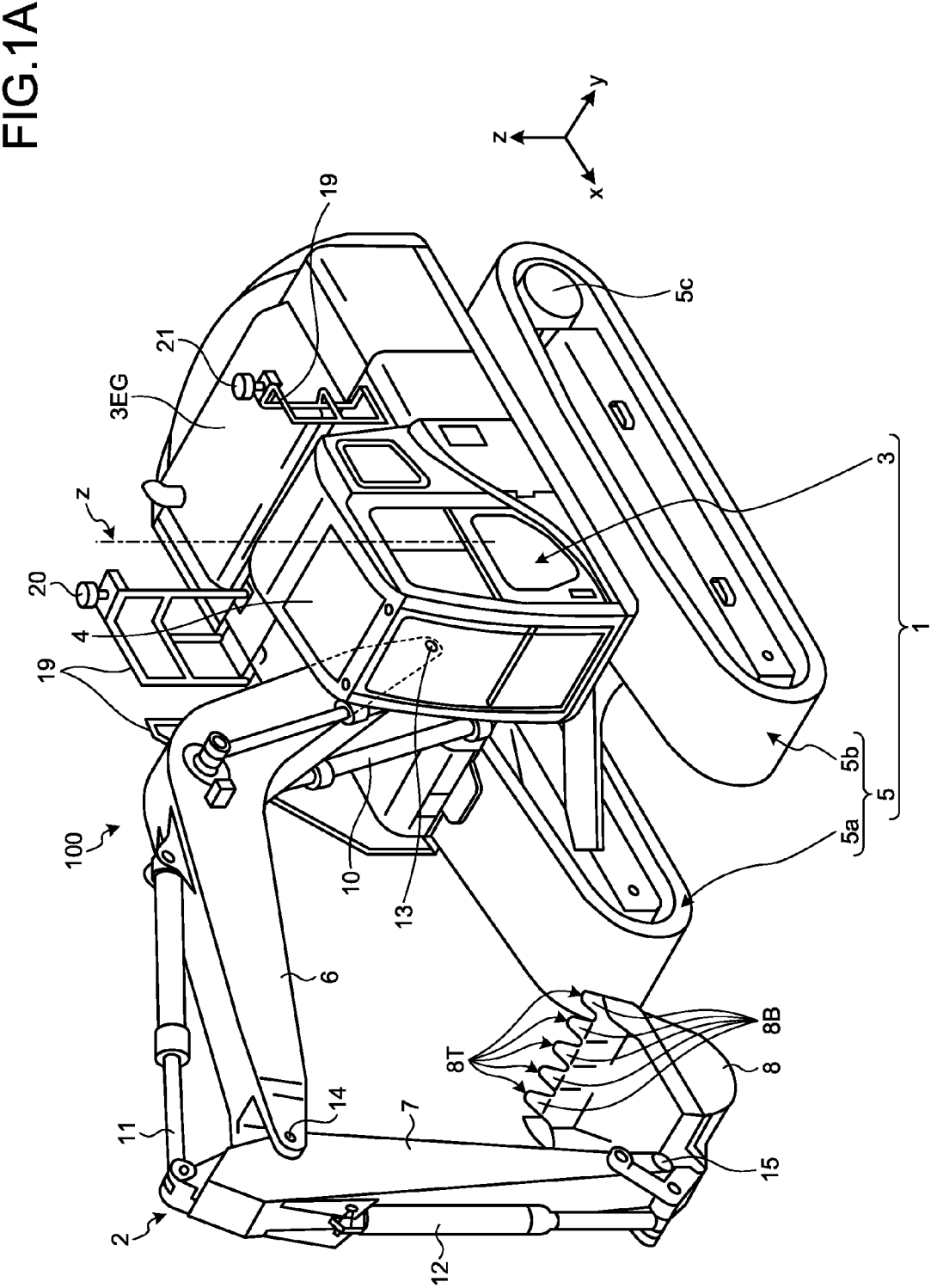
FIG. 1A is a perspective view of a work machine according to the present embodiment.
Figure 1B:
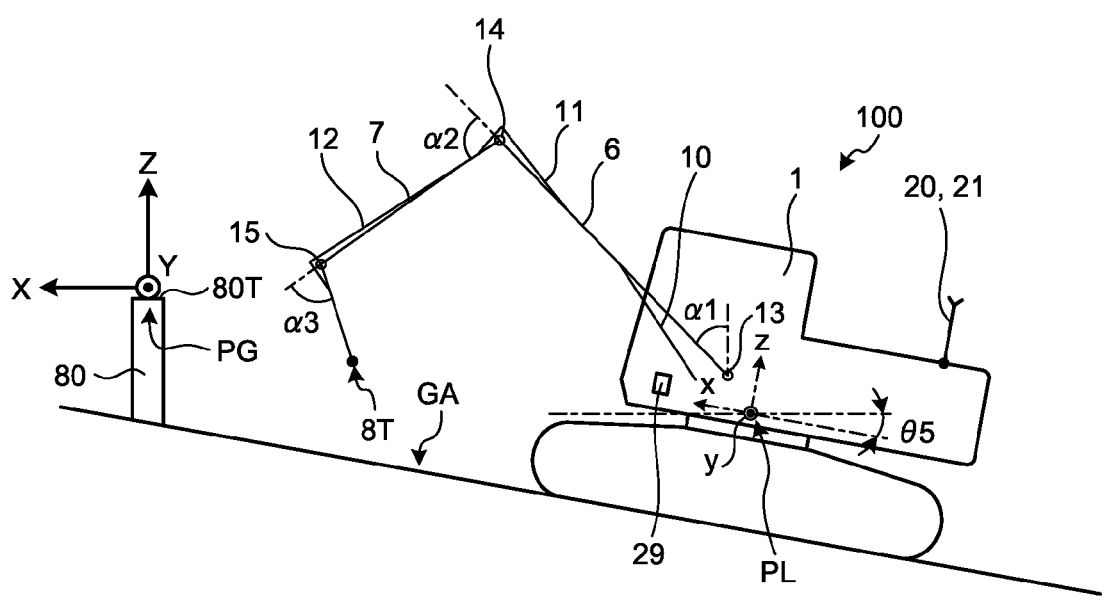
FIG. 1B is a side view of the work machine according to the present embodiment.
Figure 2:
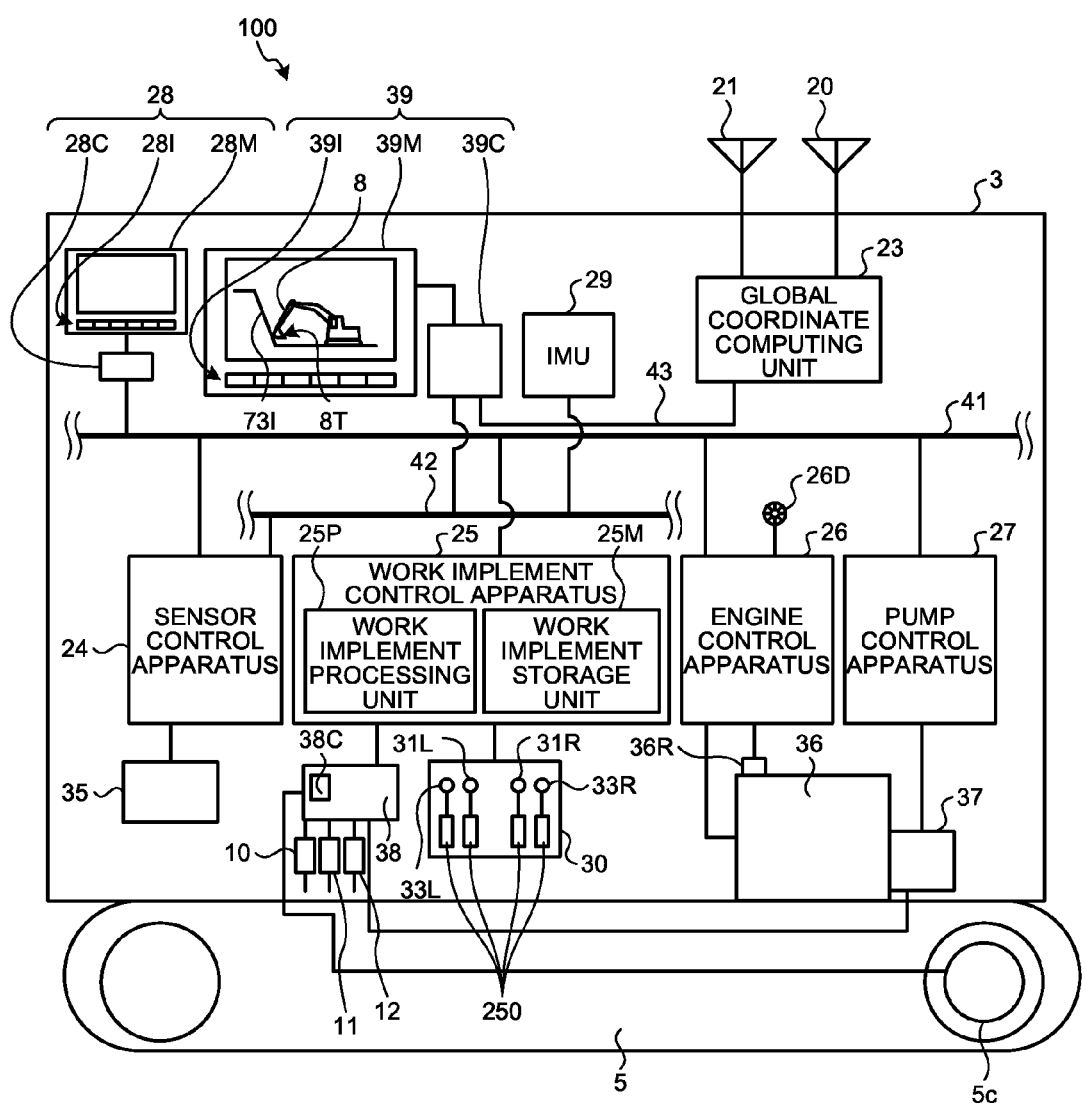
FIG. 2 is a diagram illustrating a control system of the work machine according to the present embodiment.

FIG. 1A is a perspective view of a work machine according to the present embodiment. FIG. 1B is a side view of the work machine according to the present embodiment. FIG. 2 is a diagram illustrating a control system of the work machine according to the present embodiment. An excavator 100 serving as a work machine has a vehicle main body 1 serving as a main body unit; and a work implement 2. The vehicle main body 1 has an upper swing body 3 serving as a swing body; and a traveling apparatus 5 serving as a traveling body. In the upper swing body 3, an engine room 3EG contains therein apparatuses such as an engine 36 serving as a power generating apparatus and a hydraulic pump 37 which are illustrated in FIG. 2. The engine room 3EG is disposed on the one end side of the upper swing body 3.

Although in the present embodiment the excavator 100 uses an internal-combustion engine, e.g., a diesel engine, as the engine 36 serving as a power generating apparatus, the power generating apparatus is not limited thereto. The power generating apparatus of the excavator 100 may be, for example, a so-called hybrid apparatus where an internal-combustion engine, a generator motor, and a storage apparatus are combined together.

The upper swing body 3 has an operator cab 4. The operator cab 4 is placed on the other end side of the upper swing body 3. Namely, the operator cab 4 is placed on the opposite side of the side where the engine room 3EG is placed. In the operator cab 4, a first display apparatus 28 and an operating apparatus 30 which are illustrated in FIG. 2 are disposed. These apparatuses will be described later. Handrails 19 are mounted at the top of the upper swing body 3.

The traveling apparatus 5 has the upper swing body 3 mounted thereon. The traveling apparatus 5 has tracks 5a and 5b. The traveling apparatus 5 allows the excavator 100 to travel by rotating the tracks 5a and 5b by driving one or both of hydraulic motors 5c provided on the left and right sides. The work implement 2 is mounted on the lateral side of the operator cab 4 of the upper swing body 3.

The excavator 100 may include a traveling apparatus that includes tires instead of the tracks 5a and 5b and that can travel by transmitting a driving force of the engine 36 illustrated in FIG. 2 to the tires through a transmission. The excavator 100 of such a mode is, for example, a wheel type excavator. In addition, the excavator 100 may be, for example, a backhoe loader having a structure in which a traveling apparatus having tires such as that described above is provided and a work implement is further mounted on a vehicle main body (main body unit), but an upper swing body 3 such as that illustrated in FIG. 1 and a swing mechanism thereof are not provided. Namely, the backhoe loader is such that the work implement is mounted on the vehicle main body and the traveling apparatus constituting a part of the vehicle main body is provided.

The side of the upper swing body 3 where the work implement 2 and the operator cab 4 are disposed is the front, and the side of the upper swing body 3 where the engine room 3EG is disposed is the rear. The left side toward the front is the left of the upper swing body 3, and the right side toward the front is the right of the upper swing body 3. In addition, in the excavator 100 or the vehicle main body 1, its traveling apparatus 5's side with reference to the upper swing body 3 is the bottom, and its upper swing body 3's side with reference to the traveling apparatus 5 is the top. When the excavator 100 is placed on a horizontal plane, the bottom is the vertical direction side, i.e., the gravity action direction side, and the top is the opposite side of the vertical direction.

The work implement 2 has a boom 6, an arm 7, a bucket 8, a boom cylinder 10, an arm cylinder 11, and a bucket cylinder 12. A base end of the boom 6 is rotatably mounted on a front portion of the vehicle main body 1 through a boom pin 13. A base end of the arm 7 is rotatably mounted on a tip of the boom 6 through an arm pin 14. The bucket 8 is mounted on a tip of the arm 7 through a bucket pin 15. The bucket 8 rotates about the bucket pin 15. The bucket 8 has a plurality of teeth 8B mounted on the opposite side of the bucket pin 15. Tooth edges 8T are the tips of the teeth 8B.

The bucket 8 does not need to have the plurality of teeth 8B. That is, the bucket 8 may be a bucket which does not have teeth 8B such as those illustrated in FIG. 1 and whose tooth edge is formed in a straight shape using a steel sheet. The work implement 2 may include, for example, a tilt bucket having a single tooth. The tilt bucket is a bucket that has bucket tilt cylinders and can shape and level a slope or flat land in a free shape by the bucket tilting left and right even if the excavator is on sloping land, and can also perform rolling compaction work by a base plate. In addition to this, the work implement 2 may include a slope bucket, rock drilling attachments having rock drilling tips, or the like, instead of the bucket 8.

The boom cylinder 10, the arm cylinder 11, and the bucket cylinder 12 illustrated in FIG. 1A each are a hydraulic cylinder driven by the pressure of hydraulic oil (hereinafter, referred to as oil pressure, as appropriate). The boom cylinder 10 drives the boom 6 to move up and down. The arm cylinder 11 drives the arm 7 to rotate about the arm pin 14. The bucket cylinder 12 drives the bucket 8 to rotate about the bucket pin 15.

An oil pressure control valve 38 illustrated in FIG. 2 is provided between the hydraulic cylinders, such as the boom cylinder 10, the arm cylinder 11, and the bucket cylinder 12, and the hydraulic pump 37 illustrated in FIG. 2. The oil pressure control valve 38 includes traveling control valves for driving the hydraulic motors 5c; and work implement control valves for controlling the boom cylinder 10, the arm cylinder 11, the bucket cylinder 12, and a swing motor that allows the upper swing body 3 to swing. The flow rate of hydraulic oil supplied to the boom cylinder 10, the arm cylinder 11, the bucket cylinder 12, the swing motor, or the hydraulic motors 5c is controlled by a work implement control apparatus 25 illustrated in FIG. 2 controlling the oil pressure control valve 38. As a result, the operation of the boom cylinder 10, the arm cylinder 11, the bucket cylinder 12, and the like, is controlled.

Antennas 20 and 21 are mounted at the top of the upper swing body 3. The antennas 20 and 21 are used to detect the current position of the excavator 100. The antennas 20 and 21 are electrically connected to a global coordinate computing unit 23 for detecting the current position of the excavator 100, which is illustrated in FIG. 2. The global coordinate computing unit 23 detects the current position of the excavator 100 using RTK-GNSS (Real Time Kinematic-Global Navigation Satellite Systems, GNSS is referred to as global navigation satellite system). In the following description, the antennas 20 and 21 are referred to as the GNSS antennas 20 and 21, as appropriate.

Signals according to GNSS radio waves received by the GNSS antennas 20 and 21 are inputted to the global coordinate computing unit 23. The global coordinate computing unit 23 detects the placement positions of the GNSS antennas 20 and 21. The placement positions of the GNSS antennas 20 and 21 are the position information of the excavator 100.

It is preferred that the GNSS antennas 20 and 21 be placed on the upper swing body 3 and at both end positions distanced from each other in the left-right direction of the excavator 100. In the present embodiment, the GNSS antennas 20 and 21 are mounted on the handrails 19 which are mounted on both sides in the width direction of the upper swing body 3. The positions at which the GNSS antennas 20 and 21 are mounted on the upper swing body 3 are not limited to the handrails 19; however, it is preferred to place the GNSS antennas 20 and 21 at positions as far distanced from each other as possible because such positions improve the detection accuracy of the current position of the excavator 100. In addition, it is preferred to place the GNSS antennas 20 and 21 at positions where operator's visibility is not hindered as much as possible.

Figure 3A:
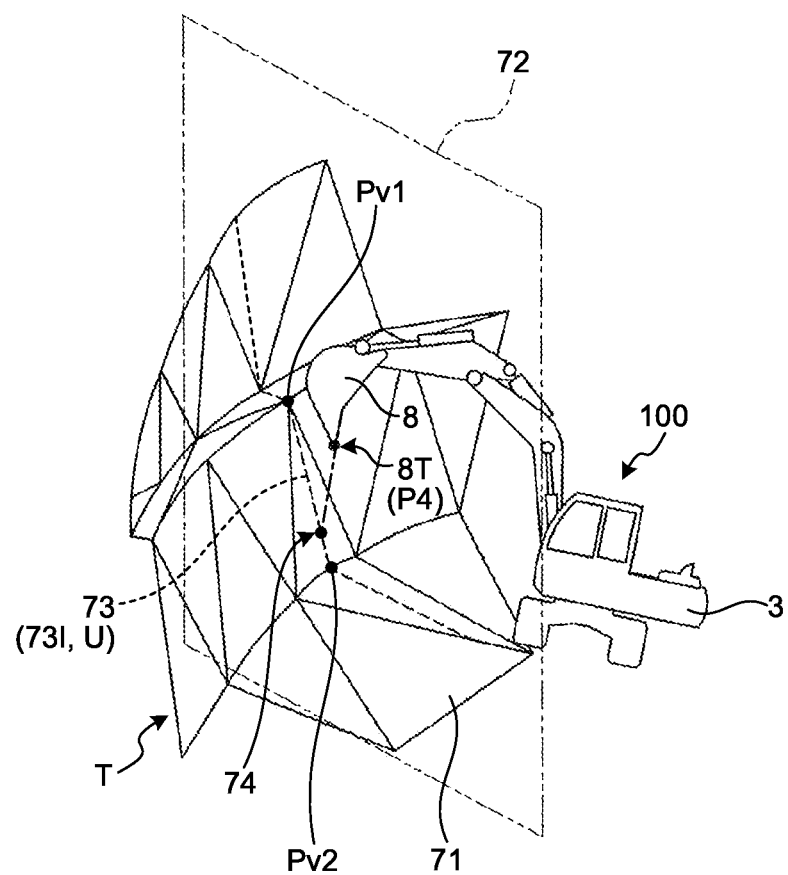
FIG. 3A is a schematic diagram illustrating an example of target working planes.

Using FIG. 1B, a global coordinate system and a local coordinate system of the excavator 100 will be described. The global coordinate system is a three-dimensional coordinate system represented by (X, Y, Z) with reference to, for example, a reference position PG of a reference stake 80 which is placed in a work area GA of the excavator 100 and which serves as a reference position. As illustrated in FIG. 3A, the reference position PG is located, for example, at a tip 80T of the reference stake 80 placed in the work area GA. In the present embodiment, the global coordinate system is, for example, a coordinate system of GNSS.

The local coordinate system of the excavator 100 is a three-dimensional coordinate system represented by (x, y, z) with reference to the excavator 100. In the local coordinate system, the axis orthogonal to the z-axis and orthogonal to an axis about which the boom 6 and the arm 7 of the work implement 2 rotate is the x-axis, and the axis orthogonal to the x-axis is the y-axis. The x-axis is an axis parallel to the front-rear direction of the upper swing body 3, and the y-axis is an axis parallel to the width direction (transverse direction) of the upper swing body 3. In the present embodiment, a reference position PL of the local coordinate system is located, for example, on a swing circle where the upper swing body 3 swings.

An angle $\alpha 1$ illustrated in FIG. 1B is the tilt angle of the boom 6, an angle $\alpha 2$ is the tilt angle of the arm 7, an angle $\alpha 3$ is the tilt angle of the bucket 8, and an angle $\theta 5$ is the posture angle of the vehicle main body 1 with respect to the front-rear direction. The tilt angle $\theta 5$ is the pitch angle of the excavator 100. The tilt angle $\theta 5$, i.e., the pitch angle $\theta 5$ of the excavator 100, is an angle indicating a tilt in local coordinates with respect to global coordinates.

(Control System of the Excavator)

The control system of the excavator 100 will be described using FIG. 2. The excavator 100 includes, as a control system, a sensor control apparatus 24 serving as a posture computing apparatus for the work machine, the work implement control apparatus 25, an engine control apparatus 26, a pump control apparatus 27, the first display apparatus 28, an IMU (Inertial Measurement Unit) 29 that detects angular velocity and acceleration, and a second display apparatus 39. They are placed inside the upper swing body 3. In the present embodiment, the IMU 29 is mounted on a high-stiffness frame at the bottom of the operator cab 4 and at the top of the upper swing body 3. Other apparatuses are placed in the operator cab 4. As illustrated in FIG. 1B, the IMU 29 is placed at a position away from the z-axis which is the center of rotation of the upper swing body 3.

The sensor control apparatus 24, the work implement control apparatus 25, the engine control apparatus 26, the pump control apparatus 27, and the first display apparatus 28 are electrically connected to an in-vehicle signal line 41 placed in the excavator 100. The sensor control apparatus 24, the work implement control apparatus 25, the engine control apparatus 26, the pump control apparatus 27, and the first display apparatus 28 can communicate with each other through the in-vehicle signal line 41. The sensor control apparatus 24, the IMU 29, and the second display apparatus 39 are electrically connected to an in-vehicle signal line 42 different than the in-vehicle signal line 41. The sensor control apparatus 24, the IMU 29, and the second display apparatus 39 can communicate with each other through the in-vehicle signal line 42. The global coordinate computing unit 23 and the second display apparatus 39 are electrically connected to each other by an in-vehicle signal line 43, and can communicate with each other through the in-vehicle signal line 43. The IMU 29 may be electrically connected to the in-vehicle signal line 41 instead of the in-vehicle signal line 42, so that the IMU 29 can communicate with other electronic devices electrically connected to the in-vehicle signal line 41.

Various types of sensors 35 such as sensors that detect the strokes of the boom cylinder 10, the arm cylinder 11, and the bucket cylinder 12 illustrated in FIG. 1 and a sensor that detects the swing angle of the upper swing body 3 are electrically connected to the sensor control apparatus 24. The angle of the boom 6 and the angle of the arm 7 are detected by, for example, sensors that detect changes in the strokes of the boom cylinder 10, etc. The sensor control apparatus 24 performs various types of signal processing, such as a filtering process or A/D (Analog/Digital) conversion, on signals detected by the various types of sensors 35, and then, outputs the signals to the in-vehicle signal line 41.

The sensor control apparatus 24 obtains, through the in-vehicle signal line 42, signals outputted from the IMU 29. The signals outputted from the IMU 29 are, for example, acceleration and angular velocity. In the present embodiment, the IMU 29 finds a posture angle from acceleration and angular velocity which are detected thereby, and outputs the posture angle. Thus, the posture angle is also a signal outputted from the IMU 29. The posture angle outputted from the IMU 29 is the posture angle of the IMU 29 itself, and is also the posture angle of the excavator 100 serving as a work machine where the IMU 29 is placed. The sensor control apparatus 24 obtains detected values which are detected by stroke sensors provided to the boom cylinder 10, the arm cylinder 11, and the bucket cylinder 12, respectively, and calculates the detected values as the tilt angle $\alpha 1$ of the boom 6, the tilt angle $\alpha 2$ of the arm 7, and the tilt angle $\alpha 3$ of the bucket 8.

The sensor control apparatus 24 outputs a first posture angle having passed through a low-pass filter and a second posture angle that does not pass through the low-pass filter, in a switching manner based on information about a change in the angle of the excavator 100. The information about a change in the angle includes, for example, information about a swing which includes a change in the swing angle of the excavator 100, and information about a change in pitch angle. In the present embodiment, the sensor control apparatus 24 allows a posture angle found by the IMU 29 to pass through the low-pass filter and then outputs the posture angle as a first posture angle, and finds a posture angle using acceleration and angular velocity which are obtained from the IMU 29, and performs a filtering process on the found posture angle to remove noise, and then, outputs the posture angle as a second posture angle without allowing the posture angle to pass through the above-described low-pass filter. Then, the sensor control apparatus 24 outputs the first posture angle and the second posture angle in a switching manner, according to information about a swing of the excavator 100, e.g., the magnitude of the swing speed of the upper swing body 3 illustrated in FIG. 1. The swing speed is a speed obtained by differentiating the swing angle with respect to time, and thus, corresponds to a change in swing angle. The posture angle found by the IMU 29, the posture angle found using the acceleration and angular velocity detected by the IMU 29, the first posture angle, and the second posture angle are all information about the tilt of the excavator 100. The details of the process of the sensor control apparatus 24 will be described later.

The work implement control apparatus 25 controls the operation of the work implement 2 illustrated in FIG. 1, based on an input from the operating apparatus 30. The operating apparatus 30 has work implement operating members 31L and 31R and travel operating members 33L and 33R which serve as operating units. In the present embodiment, the work implement operating members 31L and 31R and the travel operating members 33L and 33R are pilot pressure operated levers, but are not limited thereto. The work implement operating members 31L and 31R and the travel operating members 33L and 33R may be, for example, electric operated levers.

For example, the operating apparatus 30 has the left operating lever 31L placed on the left side of the operator, and the right operating lever 31R disposed on the right side of the operator. The frontward, rearward, leftward, and rightward operation of the left operating lever 31L and the right operating lever 31R corresponds to 2-axis operation. An operation in the front-rear direction of the right operating lever 31R corresponds to an operation of the boom 6. When the right operating lever 31R is operated frontward, the boom 6 moves down. When the right operating lever 31R is operated rearward, the boom 6 moves up. The move-down/up operation of the boom 6 is performed according to an operation in the front-rear direction of the right operating lever 31R. An operation in the left-right direction of the right operating lever 31R corresponds to an operation of the bucket 8. When the right operating lever 31R is operated leftward, the bucket 8 excavates. When the right operating lever 31R is operated rightward, the bucket 8 dumps. The excavation or opening operation of the bucket 8 is performed according to an operation in the left-right direction of the right operating lever 31R. An operation in the front-rear direction of the left operating lever 31L corresponds to a swing of the arm 7. When the left operating lever 31L is operated forward, the arm 7 dumps. When the left operating lever 31L is operated rearward, the arm 7 excavates. An operation in the left-right direction of the left operating lever 31L corresponds to a swing of the upper swing body 3. When the left operating lever 31L is operated leftward, a left swing is performed. When the left operating lever 31L is operated rightward, a right swing is performed.

In the present embodiment, the move-up operation of the boom 6 corresponds to dump operation. The move-down operation of the boom 6 corresponds to excavation operation. The excavation operation of the arm 7 corresponds to move-down operation. The dump operation of the arm 7 corresponds to move-up operation. The excavation operation of the bucket 8 corresponds to move-down operation. The dump operation of the bucket 8 corresponds to move-up operation. Note that the move-down operation of the arm 7 may be referred to as bending operation. The move-up operation of the arm 7 may be referred to as extension operation.

The work implement operating members 31L and 31R are members used by the operator of the excavator 100 to operate the work implement 2, and are, for example, operating levers having a grip portion and a rod member, such as joysticks. The work implement operating members 31L and 31R of such a structure can be tilted back and forth and left and right by grabbing the grip portion. For example, by operating the work implement operating member 31L placed on the left, the arm 7 and the upper swing body 3 can be operated, and by operating the work implement operating member 31R placed on the right, the bucket 8 and the boom 6 can be operated.

The operating apparatus 30 generates pilot pressure, according to an input, i.e., the details of an operation, to the work implement operating member 31L, 31R and supplies the generated hydraulic oil pilot pressure to a corresponding work control valve included in the oil pressure control valve 38. At this time, pilot pressure is generated by an input from the operating apparatus corresponding to each operation of the work implement. The work implement control apparatus 25 detects the generated pilot pressure and can thereby know the amount of input to, i.e., the amount of operation of, the work implement operating member 31L, 31R. In the present embodiment, the amount of operation obtained based on pilot pressure which is detected for an operation performed on the work implement operating member 31R when the boom 6 is driven is represented as MB. Likewise, the amount of operation obtained based on pilot pressure which is detected for an operation performed on the work implement operating member 31L when the arm 7 is driven is represented as MA, and the amount of operation obtained based on pilot pressure which is detected for an operation performed on the work implement operating member 31R when the bucket 8 is driven is represented as MT.

The travel operating members 33L and 33R are members used by the operator to operate travel of the excavator 100. The travel operating members 33L and 33R are, for example, operating levers having a grip portion and a rod member (hereinafter, referred to as traveling levers, as appropriate). Such travel operating members 33L and 33R can be tilted back and forth by the operator grabbing the grip portion. The travel operating members 33L and 33R are such that by simultaneously tilting the two operating levers forward, the excavator 100 moves forward, and by tilting backward, the excavator 100 moves backward.

The travel operating members 33L and 33R are pedals (not illustrated) operable by the operator stepping thereon with his/her feet, and are, for example, seesaw pedals. By stepping on either the front side or rear side of the pedals, pilot pressure is generated in the same manner as the above-described operating levers, by which the traveling control valves are controlled and the hydraulic motors 5c are driven, and the excavator 100 can move forward or backward. By simultaneously stepping on the front side of the two pedals, the excavator 100 moves forward, and by stepping on the rear side, the excavator 100 moves backward. By stepping on the front or rear side of one pedal, only one side of the tracks 5a and 5b rotates, by which the excavator 100 can swing.

As such, when the operator wants the excavator 100 to travel, by performing either operation, tilting the operating levers back and forth with his/her hands or stepping on the front or rear side of the pedals with his/her feet, the hydraulic motors 5c of the traveling apparatus 5 can be driven. As illustrated in FIG. 2, there are two travel operating members 33L and 33R. By operating the travel operating member 33L on the left side, the hydraulic motor 5c on the left side is driven, by which the track 5b on the left side can be operated. By operating the travel operating member 33R on the right side, the hydraulic motor 5c on the right side is driven, by which the track 5a on the right side can be operated.

The operating apparatus 30 generates pilot pressure, according to an input, i.e., the details of an operation, to the travel operating member 33L, 33R and supplies the generated pilot pressure to the traveling control valves included in the oil pressure control valve 38. The traveling control valves operate according to the magnitude of the pilot pressure, by which hydraulic oil is supplied to the traveling hydraulic motors 5c. When the travel operating member 33L, 33R is an electric operated lever, an input, i.e., the details of an operation, to the travel operating member 33L, 33R is detected using, for example, a potentiometer, and the input is converted into an electrical signal (detection signal) and then the electrical signal is sent to the work implement control apparatus 25. The work implement control apparatus 25 controls the traveling control valves, based on the detection signal.

The engine control apparatus 26 controls the engine 36. The engine 36 drives the hydraulic pump 37 to supply hydraulic oil to hydraulic devices such as the boom cylinder 10, the arm cylinder 11, and the bucket cylinder 12 included in the excavator 100. A rotational speed detection sensor 36R and a fuel adjustment dial 26D are electrically connected to the engine control apparatus 26. The engine control apparatus 26 controls the amount of fuel supplied to the engine 36, based on the rotational speed of a crankshaft of the engine 36 detected by the rotational speed detection sensor 36R, the setting of the fuel adjustment dial 26D, and the like. In this manner, the engine control apparatus 26 controls the engine 36.

The pump control apparatus 27 controls the hydraulic pump 37 included in the excavator 100. The hydraulic pump 37 is, for example, a swash plate hydraulic pump that changes the amount of hydraulic oil discharge, etc., by changing the tilt angle of a swash plate. The pump control apparatus 27 obtains, for example, pilot pressure detected by an oil pressure sensor 38C of the oil pressure control valve 38, from the work implement control apparatus 25 through the in-vehicle signal line 41. The pump control apparatus 27 controls the tilt angle of the swash plate of the hydraulic pump 37 based on the obtained pilot pressure, and thereby controls the flow rate of hydraulic oil discharged from the hydraulic pump 37. The hydraulic oil discharged from the hydraulic pump 37 is supplied to at least one of the boom cylinder 10, the arm cylinder 11, the bucket cylinder 12, and the hydraulic motors 5c through a corresponding work control valve or a corresponding traveling control valve included in the oil pressure control valve 38, to drive at least one of them.

The first display apparatus 28 is an apparatus that displays images. The first display apparatus 28 includes a display unit 28M and a control unit 28C. The first display apparatus 28 is placed in the operator cab 4 of the excavator 100 illustrated in FIG. 1 and near an operator's seat. In the present embodiment, the first display apparatus 28 displays, for example, operating information of the excavator 100 on the display unit 28M. The operating information includes, for example, the cumulative operating hours of the excavator 100, the remaining amount of fuel, or the cooling water temperature of the engine 36. When the excavator 100 has a camera for periphery monitoring or for a rear view monitor, etc., the first display apparatus 28 may display an image captured by the camera.

In the present embodiment, the first display apparatus 28 also functions as an input apparatus, in addition to displaying of various types of images on the display unit 28M. Hence, the first display apparatus 28 has an input apparatus 28I below the display unit 28M. In the present embodiment, in the input apparatus 28I, a plurality of push button switches are arranged in parallel to a lateral direction of the display unit 28M. By operating the input apparatus 28I, an image displayed on the display unit 28M can be switched to another or various types of settings for the operation of the excavator 100 can be performed. Note that the first display apparatus 28 may be composed of a touch panel where the input apparatus 28I is incorporated into the display unit 28M. Note also that the input apparatus 28I may be placed on a console near the operator's seat, as a separate unit from the first display apparatus 28.

The second display apparatus 39 is an apparatus that displays images. The second display apparatus 39 includes a display unit 39M and a control unit 39C. The second display apparatus 39 is placed near the operator's seat in the operator cab 4 of the excavator 100 illustrated in FIG. 1. In the present embodiment, the second display apparatus 39 displays, as an image, for example, position information of the tooth edges 8T of the bucket 8 included in the excavator 100 with respect to the topography of a working site, on the display unit 39M. At this time, the second display apparatus 39 may display information about the topography of the working site where the tooth edges 8T attempt to excavate, together with the position information of the tooth edges 8T.

In the present embodiment, the display unit 39M of the second display apparatus 39 is, for example, a liquid crystal display apparatus, but is not limited thereto. The control unit 39C controls the operation of the display unit 39M or obtains position information of the tooth edges 8T. In addition, the control unit 39C displays a guidance image representing the relative positional relationship between the position of the tooth edges 8T and the topography of the working site, on the display unit 39M. To do so, the control unit 39C stores global coordinate position information about the topography of the working site.

In the present embodiment, the second display apparatus 39 has an input apparatus 39I below the display unit 39M. In the present embodiment, for example, a touch panel is provided to the display unit 39M, etc., and using the touch panel as the input apparatus 39I, a guidance image displayed on the display unit 39M is switched to another, or the content of guidance is changed, or various types of settings are inputted. In the input apparatus 39I, a plurality of push button switches are arranged in parallel to a lateral direction of the display unit 39M. By operating the input apparatus 39I, a guidance image displayed on the display unit 39M may be switched to another or the content of guidance may be changed. In the present embodiment, the function of the second display apparatus 39 may be implemented by the first display apparatus 28.

The IMU 29 detects the angular velocity and acceleration of the excavator 100. Although various acceleration, such as acceleration occurring during traveling and angular acceleration and gravitational acceleration occurring during swinging, occurs along with the operation of the excavator 100, the IMU 29 detects acceleration including at least gravitational acceleration, and outputs the detected acceleration without distinguishing between the types of acceleration. It is desirable, though details will be described later, that the IMU 29 be provided, for example, on the central swing axis of the upper swing body 3 of the excavator 100 in order to detect acceleration with higher accuracy; however, as described above, the IMU 29 may be placed at the bottom of the operator cab 4. In that case, acceleration which is determined from centrifugal force (hereinafter, referred to as centrifugal acceleration, as appropriate) and angular acceleration are determined, with a distance from the position of the central swing axis of the upper swing body 3 to the placement position of the IMU 29 being a swing radius. Then, the components of the centrifugal acceleration and the angular acceleration are subtracted from the acceleration outputted from the IMU 29. By this, the influence on the acceleration due to the placement position of the IMU 29 is modified. The details of the components of centrifugal acceleration and angular acceleration will be described later.

The IMU 29 detects acceleration in the x-axis direction, the y-axis direction, and the z-axis direction and angular velocity (rotational angular velocity) about the x-axis, the y-axis, and the z-axis in the local coordinate system (x, y, z) illustrated in FIGS. 1A and 1B. In the example illustrated in FIG. 1, the x-axis is an axis parallel to the front-rear direction of the excavator 100, the y-axis is an axis parallel to the width direction of the excavator 100, and the z-axis is an axis orthogonal to both of the x-axis and the y-axis. Next, an example of excavation control performed by the work implement control apparatus 25 will be described.

(Example of Excavation Control)

Figure 3B:
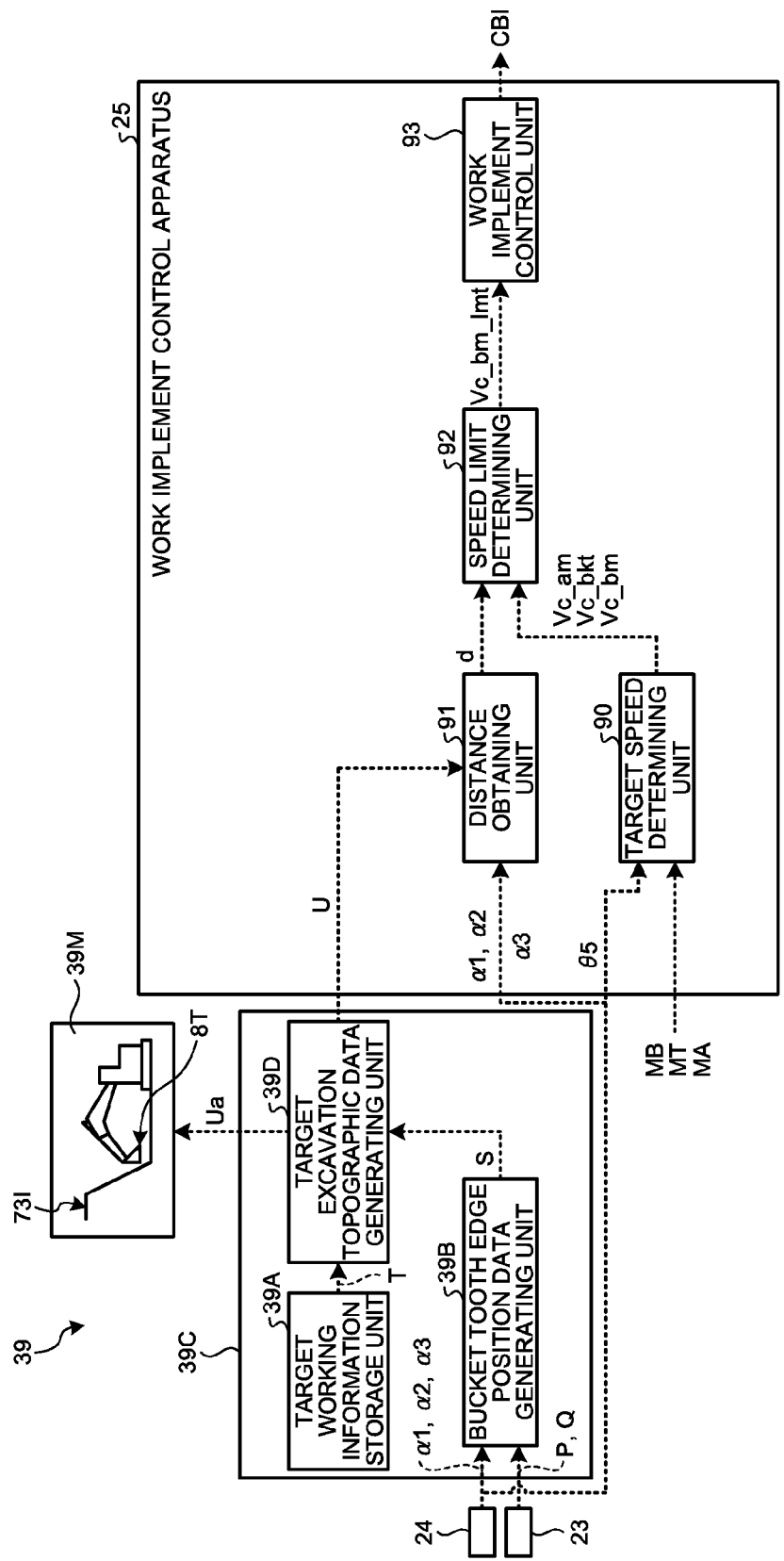
FIG. 3B is a block diagram illustrating a work implement control apparatus and a second display apparatus.
Figure 4:
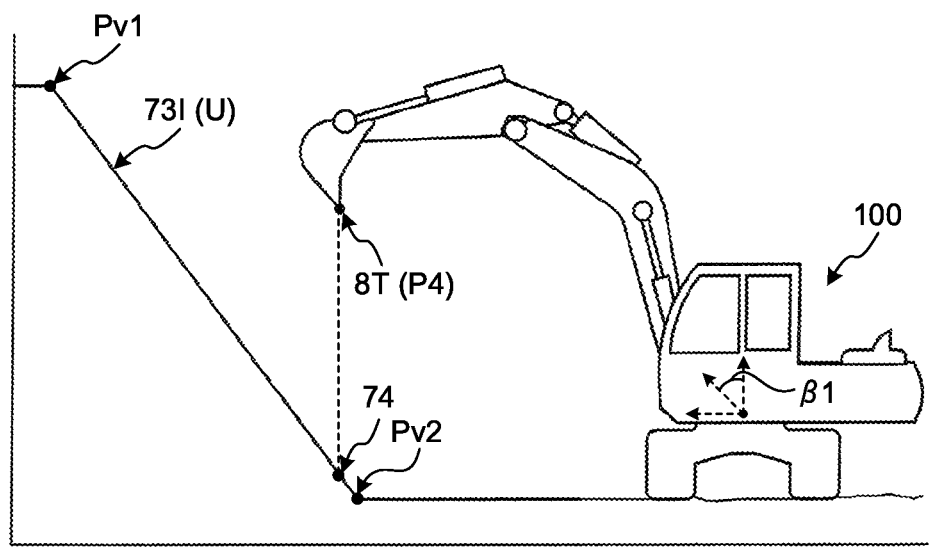
FIG. 4 is a diagram illustrating an example of the relationship between a target excavation topography and the tooth edges of a bucket.
Figure 5:
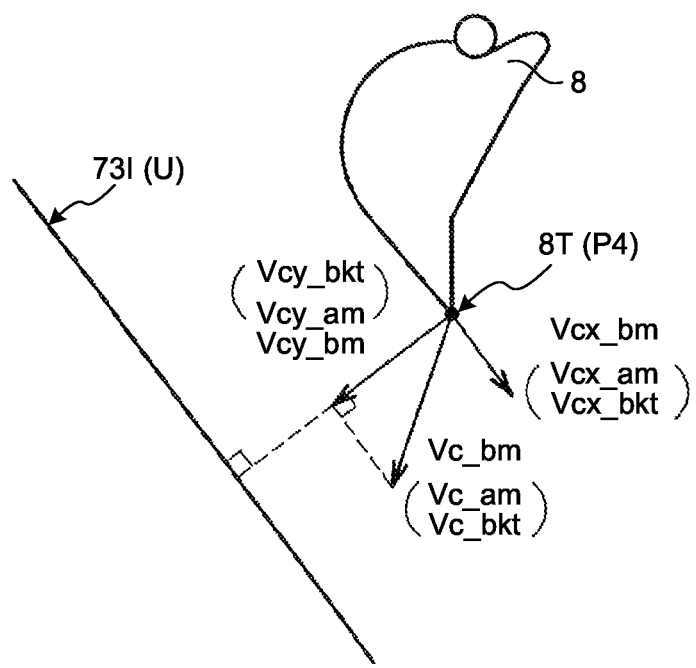
FIG. 5 is a schematic diagram illustrating the relationship between a target speed, a vertical speed component, and a horizontal speed component.
Figure 6:
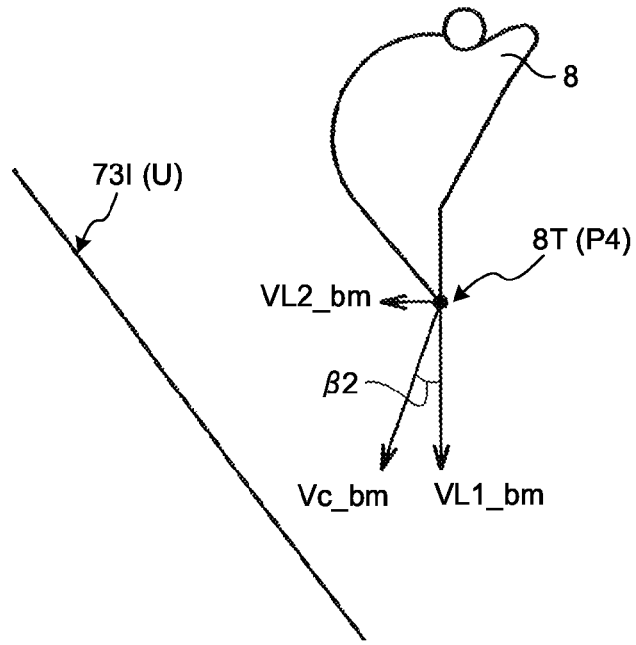
FIG. 6 is a diagram illustrating calculation methods for the vertical speed component and the horizontal speed component.
Figure 7:
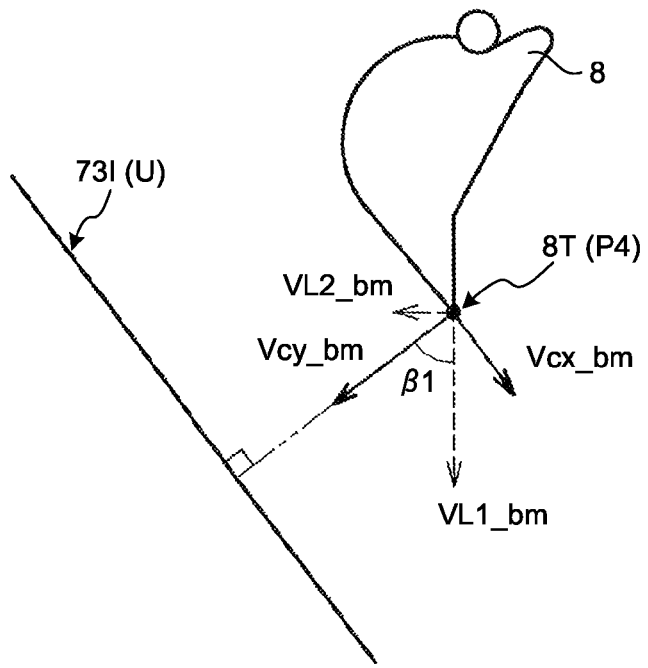
FIG. 7 is a diagram illustrating calculation methods for the vertical speed component and the horizontal speed component.
Figure 8:
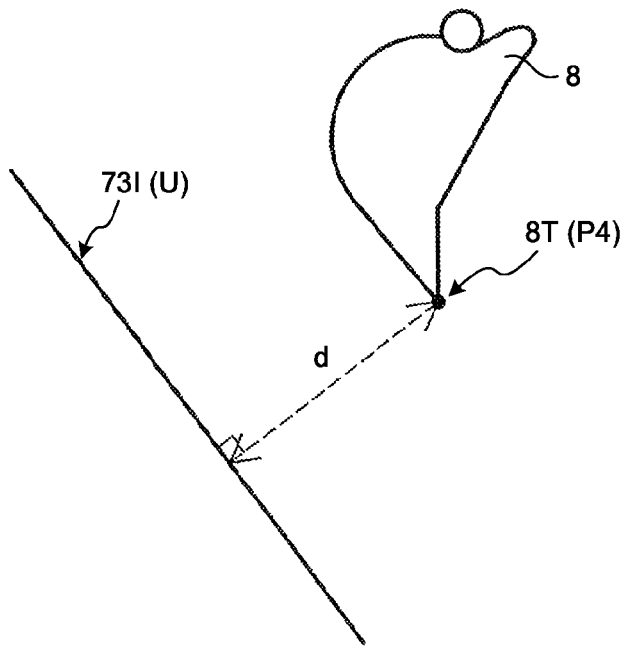
FIG. 8 is a schematic diagram illustrating a distance between the tooth edges and the target excavation topography.
Figure 9:
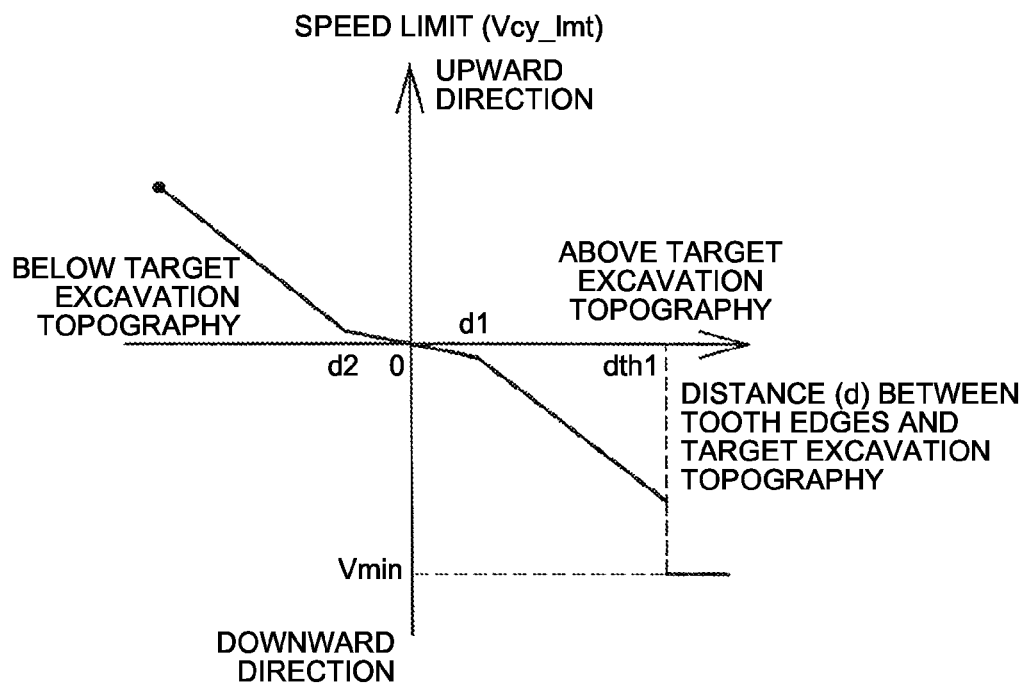
FIG. 9 is a graph illustrating an example of speed limit information.
Figure 10:
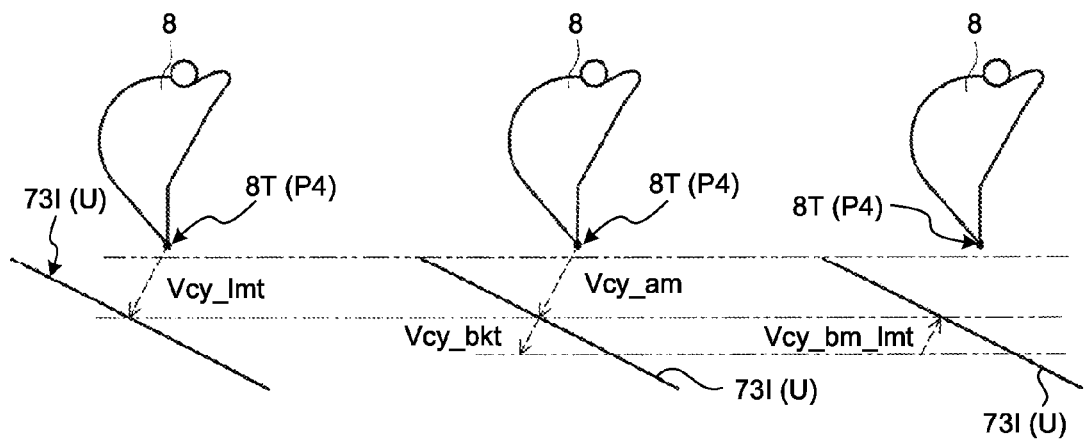
FIG. 10 is a schematic diagram illustrating a calculation method for the vertical speed component of the speed limit of a boom.
Figure 11:
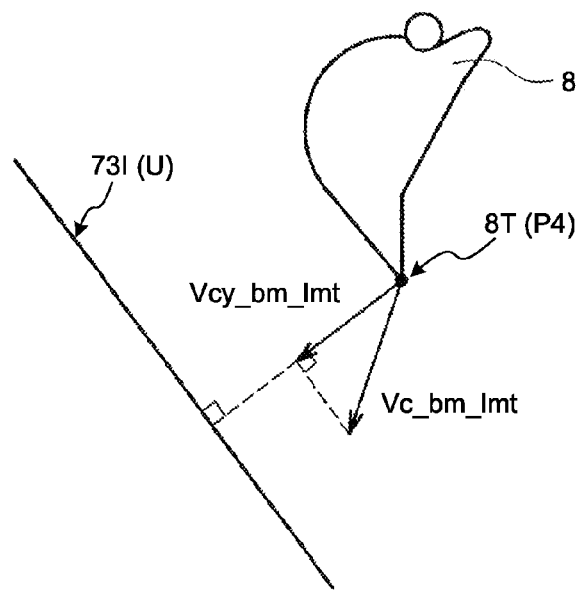
FIG. 11 is a schematic diagram illustrating the relationship between the vertical speed component of the speed limit of the boom and the speed limit of the boom.
Figure 12:
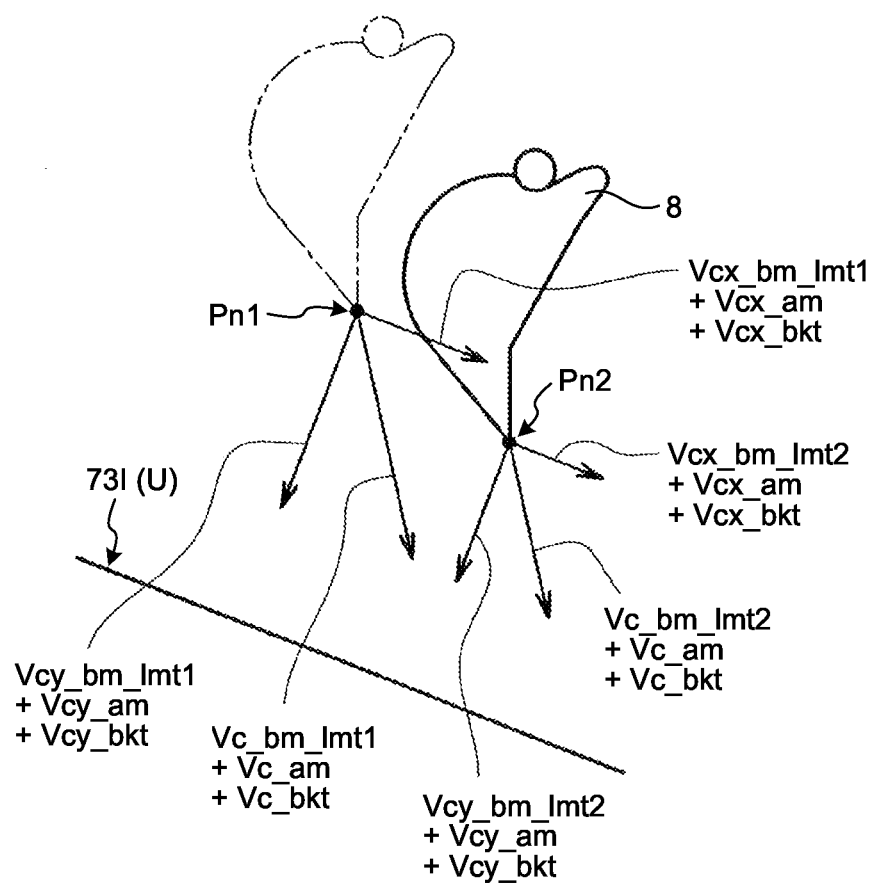
FIG. 12 is a diagram illustrating an example of a change in the speed limit of the boom caused by the movement of the tooth edges.

FIG. 3A is a schematic diagram illustrating an example of target working planes. FIG. 3B is a block diagram illustrating the work implement control apparatus 25 and the second display apparatus 39. FIG. 4 is a diagram illustrating an example of the relationship between a target excavation topography 73I and the tooth edges 8T of the bucket 8. FIG. 5 is a schematic diagram illustrating the relationship between a target speed, a vertical speed component, and a horizontal speed component. FIG. 6 is a diagram illustrating calculation methods for the vertical speed component and the horizontal speed component. FIG. 7 is a diagram illustrating calculation methods for the vertical speed component and the horizontal speed component. FIG. 8 is a schematic diagram illustrating a distance between the tooth edges and the target excavation topography 73I. FIG. 9 is a graph illustrating an example of speed limit information. FIG. 10 is a schematic diagram illustrating a calculation method for the vertical speed component of the speed limit of the boom. FIG. 11 is a schematic diagram illustrating the relationship between the vertical speed component of the speed limit of the boom and the speed limit of the boom. FIG. 12 is a diagram illustrating an example of a change in the speed limit of the boom caused by the movement of the tooth edges.

As illustrated in FIG. 3B, the second display apparatus 39 generates target excavation topographic data U and outputs the target excavation topographic data U to the work implement control apparatus 25. Excavation control is performed when, for example, the operator of the excavator 100 selects performing of excavation control, using the input apparatus 39I illustrated in FIG. 2. Upon performing excavation control, the work implement control apparatus 25 generates a boom intervention instruction CBI required for excavation control and, if necessary, an arm instruction signal and a bucket instruction signal, using the amount of boom operation MB, the amount of arm operation MA, and the amount of bucket operation MT, the target excavation topographic data U obtained from the second display apparatus 39, and tilt angles $\alpha 1$, $\alpha 2$, and $\alpha 3$ obtained from the sensor control apparatus 24, and drives control valves and an intervention valve, and thereby controls the work implement 2.

First, the second display apparatus 39 will be described. The second display apparatus 39 includes a target working information storage unit 39A, a bucket tooth edge position data generating unit 39B, and a target excavation topographic data generating unit 39D. The functions of the target working information storage unit 39A, the bucket tooth edge position data generating unit 39B, and the target excavation topographic data generating unit 39D are implemented by the control unit 39C.

The target working information storage unit 39A is a part of a storage unit of the second display apparatus 39, and stores target working information T serving as information indicating a target shape in a work area. The target working information T includes coordinate data and angle data which are required to generate target excavation topographic data U serving as information indicating the target shape of an excavation object. The target working information T includes position information of a plurality of target working planes 71.

The target working information T required to control the work implement 2 by the work implement control apparatus 25 or to display target excavation topographic data Ua on the display unit 39M is, for example, downloaded to the target working information storage unit 39A from a management server of a management center by wireless communication. Alternatively, the target working information T may be downloaded to the target working information storage unit 39A by connecting a terminal apparatus saving the target working information T to the second display apparatus 39, or may be transferred to the target working information storage unit 39A by connecting a portable storage apparatus to the second display apparatus 39.

The bucket tooth edge position data generating unit 39B generates central swing position data indicating the position of the center of the swing of the excavator 100 passing through the swing axis z of the upper swing body 3, based on reference position data P and swing body azimuth data Q which are obtained from the global coordinate computing unit 23. In the central swing position data, a reference position PL and xy coordinates in the local coordinate system match each other.

The bucket tooth edge position data generating unit 39B generates bucket tooth edge position data S indicating the current position of the tooth edges 8T of the bucket 8, based on the central swing position data and the tilt angles $\alpha 1$, $\alpha 2$, and $\alpha 3$ of the work implement 2 obtained from the sensor control apparatus 24.

As described above, the bucket tooth edge position data generating unit 39B obtains reference position data P and swing body azimuth data Q from the global coordinate computing unit 23 at a frequency of, for example, 10 Hz. Therefore, the bucket tooth edge position data generating unit 39B can update the bucket tooth edge position data S at a frequency of, for example, 10 Hz. The bucket tooth edge position data generating unit 39B outputs the updated bucket tooth edge position data S to the target excavation topographic data generating unit 39D.

The target excavation topographic data generating unit 39D obtains the target working information T stored in the target working information storage unit 39A and the bucket tooth edge position data S outputted from the bucket tooth edge position data generating unit 39B. The target excavation topographic data generating unit 39D sets, as an excavation object position 74, an intersection point of a perpendicular line passing through a tooth edge position P4 at the present time of the tooth edges 8T in the local coordinate system and a target working plane 71. The excavation object position 74 is a point directly below the tooth edge position P4 of the bucket 8. As illustrated in FIG. 3A, the target excavation topographic data generating unit 39D obtains, as a candidate line for the target excavation topography 73I, a line of intersection 73 of a plane 72 of the work implement 2 defined by the front-rear direction of the upper swing body 3 and passing through the excavation object position 74, and the target working information T represented by the plurality of target working planes 71, based on the target working information T and the bucket tooth edge position data S. The excavation object position 74 is one point on the candidate line. The plane 72 is a plane where the work implement 2 operates (operating plane).

The operating plane of the work implement 2 is a plane parallel to the xz-plane of the excavator 100 when the boom 6 and the arm 7 do not rotate about an axis parallel to the z-axis of the local coordinate system of the excavator 100. When at least one of the boom 6 and the arm 7 rotates about the axis parallel to the z-axis of the local coordinate system of the excavator 100, the operating plane of the work implement 2 is a plane orthogonal to the axis about which the arm rotates, i.e., the axis of the arm pin 14 illustrated in FIG. 1. In the following, the operating plane of the work implement 2 is referred to as an arm operating plane.

The target excavation topographic data generating unit 39D determines a single or a plurality of inflection points before and after the excavation object position 74 of the target working information T and lines before and after the inflection point(s), as the target excavation topography 73I serving as an excavation object. In the example illustrated in FIG. 3A, two inflection points Pv1 and Pv2 and lines before and after the inflection points Pv1 and Pv2 are determined as the target excavation topography 73I. Then, the target excavation topographic data generating unit 39D generates position information of a single or a plurality of inflection points before and after the excavation object position 74 and angle information of lines before and after the inflection point(s), as the target excavation topographic data U which is information indicating the target shape of the excavation object. In the present embodiment, the target excavation topography 73I is defined by a line, but may be defined as, for example, a plane based on the width of the bucket 8, etc. The target excavation topographic data U thus generated has information on some of the plurality of target working planes 71. The target excavation topographic data generating unit 39D outputs the generated target excavation topographic data U to the work implement control apparatus 25. In the present embodiment, the second display apparatus 39 and the work implement control apparatus directly exchange signals, but may exchange signals through, for example, an in-vehicle signal line such as a CAN (Controller Area Network).

In the present embodiment, the target excavation topographic data U is information on an intersection portion of the plane 72 serving as an operating plane where the work implement 2 operates and at least one target working plane (first target working plane) 71 representing a target shape. The plane 72 is the xz-plane of the local coordinate system (x, y, z) illustrated in FIG. 1B. The target excavation topographic data U obtained by cutting the plurality of target working planes 71 by the plane 72 is referred to as front-rear direction target excavation topographic data U, as appropriate.

The second display apparatus 39 displays, if necessary, the target excavation topography 73I on the display unit 39M, based on the front-rear direction target excavation topographic data U serving as first target excavation topographic information. As display information, display target excavation topographic data Ua is used. Based on the display target excavation topographic data Ua, an image representing the positional relationship between the target excavation topography 73I set as the excavation object of the bucket 8 and the tooth edges 8T, such as that illustrated in FIG. 2, for example, is displayed on the display unit 39M. The second display apparatus 39 displays the target excavation topography (display target excavation topography) 73I on the display unit 39M, based on the display target excavation topographic data Ua. The front-rear direction target excavation topographic data U outputted to the work implement control apparatus 25 is used for excavation control. The target excavation topographic data U used for excavation control is referred to as work target excavation topographic data, as appropriate.

As described above, the target excavation topographic data generating unit 39D obtains bucket tooth edge position data S from the bucket tooth edge position data generating unit 39B at a frequency of, for example, 10 Hz. Therefore, the target excavation topographic data generating unit 39D can update the front-rear direction target excavation topographic data U at a frequency of, for example, 10 Hz and output the updated front-rear direction target excavation topographic data U to the work implement control apparatus 25. Next, the work implement control apparatus 25 will be described.

The work implement control apparatus 25 includes a target speed determining unit 90, a distance obtaining unit 91, a speed limit determining unit 92, and a work implement control unit 93. The work implement control apparatus 25 performs excavation control using a target excavation topography 73I obtained based on the above-described front-rear direction target excavation topographic data U. As such, in the present embodiment, there are a target excavation topography 73I used for display and a target excavation topography 73I used for excavation control. The former is referred to as a display target excavation topography and the latter is referred to as an excavation control target excavation topography.

In the present embodiment, the functions of the target speed determining unit 90, the distance obtaining unit 91, the speed limit determining unit 92, and the work implement control unit 93 are implemented by a work implement processing unit 25P illustrated in FIG. 2. Next, excavation control performed by the work implement control apparatus 25 will be described.

The target speed determining unit 90 determines a boom target speed Vc_bm, an arm target speed Vc_am, and a bucket target speed Vc_bkt. The boom target speed Vc_bm is the speed of the tooth edges 8T for when only the boom cylinder 10 is driven. The arm target speed Vc_am is the speed of the tooth edges 8T for when only the arm cylinder 11 is driven. The bucket target speed Vc_bkt is the speed of the tooth edges 8T for when only the bucket cylinder 12 is driven. The boom target speed Vc_bm is calculated according to the amount of boom operation MB. The arm target speed Vc_am is calculated according to the amount of arm operation MA. The bucket target speed Vc_bkt is calculated according to the amount of bucket operation MT.

A work implement storage unit 25M stores target speed information defining the relationship between the amount of boom operation MB and the boom target speed Vc_bm. The target speed determining unit 90 determines a boom target speed Vc_bm corresponding to the amount of boom operation MB by referring to the target speed information. The target speed information is, for example, a map where the magnitudes of the boom target speed Vc_bm corresponding to the amounts of boom operation MB are described. The target speed information may be in the form of a table, a mathematical expression, or the like. The target speed information includes information defining the relationship between the amount of arm operation MA and the arm target speed Vc_am. The target speed information includes information defining the relationship between the amount of bucket operation MT and the bucket target speed Vc_bkt. The target speed determining unit 90 determines an arm target speed Vc_am corresponding to the amount of arm operation MA by referring to the target speed information. The target speed determining unit 90 determines a bucket target speed Vc_bkt corresponding to the amount of bucket operation MT by referring to the target speed information. As illustrated in FIG. 7, the target speed determining unit 90 converts the boom target speed Vc_bm into a speed component in a direction vertical to a target excavation topography 73I (target excavation topographic data U) (hereinafter, referred to as a vertical speed component, as appropriate) Vcy_bm and a speed component in a direction parallel to the target excavation topography 73I (target excavation topographic data U) (hereinafter, referred to as a horizontal speed component, as appropriate) Vcx_bm.

For example, first, the target speed determining unit 90 obtains a tilt angle θ5 detected by the IMU 29, and finds tilts in directions orthogonal to a target excavation topography 73I with respect to the vertical axis of the global coordinate system. Then, the target speed determining unit 90 finds, from the tilts, an angle β2 (see FIG. 6) indicating a tilt between the vertical axis of the local coordinate system and the direction orthogonal to the target excavation topography 73I.

Then, as illustrated in FIG. 6, the target speed determining unit 90 converts, by trigonometric functions, a boom target speed Vc_bm into a speed component VL1_bm in the vertical-axis direction of the local coordinate system and a speed component VL2_bm in the horizontal-axis direction, from the angle β2 formed by the vertical axis of the local coordinate system and the direction of the boom target speed Vc_bm. Then, as illustrated in FIG. 7, the target speed determining unit 90 converts, by trigonometric functions, the speed component VL1_bm in the vertical-axis direction of the local coordinate system and the speed component VL2_bm in the horizontal-axis direction into the above-described vertical speed component Vcy_bm and horizontal speed component Vcx_bm with respect to the target excavation topography 73I, from the above-described tilt β1 between the vertical axis of the local coordinate system and the direction orthogonal to the target excavation topography 73I. Likewise, the target speed determining unit 90 converts an arm target speed Vc_am into a vertical speed component Vcy_am in the vertical-axis direction of the local coordinate system and a horizontal speed component Vcx_am. The target speed determining unit 90 converts a bucket target speed Vc_bkt into a vertical speed component Vcy_bkt in the vertical-axis direction of the local coordinate system and a horizontal speed component Vcx_bkt.

As illustrated in FIG. 8, the distance obtaining unit 91 obtains a distance d between the tooth edges 8T of the bucket 8 and the target excavation topography 73I. Specifically, the distance obtaining unit 91 calculates the shortest distance d between the tooth edges 8T of the bucket 8 and the target excavation topography 73I from the position information of the tooth edges 8T, the target excavation topographic data U representing the position of the target excavation topography 73I, and the like, which are obtained in the above-described manner. In the present embodiment, excavation control is performed based on the shortest distance d between the tooth edges 8T of the bucket 8 and the target excavation topography 73I.

The speed limit determining unit 92 calculates a speed limit Vcy_lmt of the entire work implement 2 illustrated in FIG. 1, based on the distance d between the tooth edges 8T of the bucket 8 and the target excavation topography 73I. The speed limit Vcy_lmt of the entire work implement 2 is an allowable moving speed of the tooth edges 8T in a direction in which the tooth edges 8T of the bucket 8 approach the target excavation topography 73I. The work implement storage unit 25M illustrated in FIG. 2 stores speed limit information defining the relationship between the distance d and the speed limit Vcy_lmt.

FIG. 9 illustrates an example of the speed limit information. The horizontal axis in FIG. 9 is the distance d and the vertical axis is the speed limit Vcy. In the present embodiment, the distance d for when the tooth edges 8T are located outwardly of the target excavation topography 73I, i.e., on the work implement 2's side of the excavator 100, has a positive value, and the distance d for when the tooth edges 8T are located inwardly of the target excavation topography 73I, i.e., on the inner side of the excavation object than the target excavation topography 73I, has a negative value. This can also be said that, for example, as illustrated in FIG. 8, the distance d for when the tooth edges 8T are located above the target excavation topography 73I has a positive value, and the distance d for when the tooth edges 8T are located below the target excavation topography 73I has a negative value. In addition, it can also be said that the distance d for when the tooth edges 8T are located at a position where the tooth edges 8T do not go beyond the target excavation topography 73I has a positive value, and the distance d for when the tooth edges 8T are located at a position where the tooth edges 8T go beyond the target excavation topography 73I has a negative value. The distance d for when the tooth edges 8T are located on the target excavation topography 73I, i.e., when the tooth edges 8T are in contact with the target excavation topography 73I, is 0.

In the present embodiment, the speed for when the tooth edges 8T move from inward to outward of the target excavation topography 73I has a positive value, and the speed for when the tooth edges 8T move from outward to inward of the target excavation topography 73I has a negative value. Namely, the speed for when the tooth edges 8T move upwardly of the target excavation topography 73I has a positive value, and the speed for when the tooth edges 8T move downwardly has a negative value.

In the speed limit information, the tilt of the speed limit Vcy_lmt for when the distance d is between d1 and d2 is smaller than the tilt for when the distance d is greater than or equal to d1 or smaller than or equal to d2. d1 is greater than 0. d2 is smaller than 0. In order to more minutely set the speed limit for an operation performed near the target excavation topography 73I, the tilt for when the distance d is between d1 and d2 is made smaller than the tilt for when the distance d is greater than or equal to d1 or smaller than or equal to d2. When the distance d is greater than or equal to d1, the speed limit Vcy_lmt has a negative value, and the greater the distance d, the smaller the speed limit Vcy_lmt. That is, when the distance d is greater than or equal to d1, the farther the tooth edges 8T from the target excavation topography 73I above the target excavation topography 73I, the higher the speed at which the tooth edges 8T move downwardly of the target excavation topography 73I and the greater the absolute value of the speed limit Vcy_lmt. When the distance d is smaller than or equal to 0, the speed limit Vcy_lmt has a positive value, and the smaller the distance d, the greater the speed limit Vcy_lmt. That is, when the distance d that the tooth edges 8T of the bucket 8 move away from the target excavation topography 73I is smaller than or equal to 0, the farther the tooth edges 8T from the target excavation topography 73I below the target excavation topography 73I, the higher the speed at which the tooth edges 8T move upwardly of the target excavation topography 73I and the greater the absolute value of the speed limit Vcy_lmt.

When the distance d is greater than or equal to a first predetermined value dth1, the speed limit Vcy_lmt is Vmin. The first predetermined value dth1 is a positive value and is greater than d1. Vmin is smaller than the minimum value of the target speed. That is, when the distance d is greater than or equal to the first predetermined value dth1, limitations on the operation of the work implement 2 are not performed. Therefore, when the tooth edges 8T is significantly distanced from the target excavation topography 73I above the target excavation topography 73I, limitations on the operation of the work implement 2, i.e., excavation control, are not performed. When the distance d is smaller than the first predetermined value dth1, limitations on the operation of the work implement 2 are performed. Specifically, as will be described later, when the distance d is smaller than the first predetermined value dth1, limitations on the operation of the boom 6 are performed.

The speed limit determining unit 92 calculates a vertical speed component of the speed limit of the boom 6 (hereinafter, referred to as a vertical speed limit component of the boom 6, as appropriate) Vcy_bm_lmt, from the speed limit Vcy_lmt of the entire work implement 2, the arm target speed Vc_am, and the bucket target speed Vc_bkt. As illustrated in FIG. 10, the speed limit determining unit 92 calculates the vertical speed limit component Vcy_bm_lmt of the boom 6 by subtracting the vertical speed component Vcy_am of the arm target speed and the vertical speed component Vcy_bkt of the bucket target speed from the speed limit Vcy_lmt of the entire work implement 2.

As illustrated in FIG. 11, the speed limit determining unit 92 converts the vertical speed limit component Vcy_bm_lmt of the boom 6 into a speed limit of the boom 6 (boom speed limit) Vc_bm_lmt. The speed limit determining unit 92 finds a relationship between the direction vertical to the target excavation topography 73I and the direction of the boom speed limit Vc_bm_lmt, from the above-described tilt angle α1 of the boom 6, tilt angle α2 of the arm 7, tilt angle α3 of the bucket 8, reference position data of the GNSS antennas 20 and 21, target excavation topographic data U, and the like, and converts the vertical speed limit component Vcy_bm_lmt of the boom 6 into the boom speed limit Vc_bm_lmt. Computation for this case is performed by a reversal procedure to the above-described computation for finding the vertical speed component Vcy_bm in the direction vertical to the target excavation topography 73I from the boom target speed Vc_bm.

A shuttle valve 151 (described later) selects a larger one of pilot pressure generated based on an operation of the boom 6 and pilot pressure generated by an intervention valve 127C (described later) based on a boom intervention instruction CBI, and supplies the selected pilot pressure to a directional control valve 164 (described later). When the pilot pressure generated based on the boom intervention instruction CBI is larger than the pilot pressure generated based on the operation of the boom 6, the directional control valve 164 (described later) for the boom cylinder 10 operates by the pilot pressure generated based on the boom intervention instruction CBI. As a result, the drive of the boom 6 based on the boom speed limit Vc_bm_lmt is implemented.

The work implement control unit 93 controls the work implement 2. The work implement control unit 93 controls the boom cylinder 10, the arm cylinder 11, and the bucket cylinder 12 by outputting an arm instruction signal, a boom instruction signal, a boom intervention instruction CBI, and a bucket instruction signal to control valves 127 (described later). The arm instruction signal, the boom instruction signal, the boom intervention instruction CBI, and the bucket instruction signal have electric current values according to a boom instruction speed, an arm instruction speed, and a bucket instruction speed.

When the pilot pressure generated based on the move-up operation of the boom 6 is larger than the pilot pressure generated based on the boom intervention instruction CBI, the shuttle valve 151 (described later) selects the pilot pressure generated based on the lever operation. The directional control valve 164 for the boom cylinder 10 operates by the pilot pressure selected by the shuttle valve 151 based on the operation of the boom 6. Namely, the boom 6 is driven based on the boom target speed Vc_bm and thus is not driven based on the boom speed limit Vc_bm_lmt.

When the pilot pressure generated based on the operation of the boom 6 is larger than the pilot pressure generated based on the boom intervention instruction CBI, the work implement control unit 93 selects the boom target speed Vc_bm, the arm target speed Vc_am, and the bucket target speed Vc_bkt as a boom instruction speed, an arm instruction speed, and a bucket instruction speed, respectively. The work implement control unit 93 determines the speeds (cylinder speeds) of the boom cylinder 10, the arm cylinder 11, and the bucket cylinder 12, according to the boom target speed Vc_bm, the arm target speed Vc_am, and the bucket target speed Vc_bkt. Then, the work implement control unit 93 controls the oil pressure control valve 38 illustrated in FIG. 2 based on the determined cylinder speeds to allow the boom cylinder 10, the arm cylinder 11, and the bucket cylinder 12 to operate.

As such, during normal operation, the work implement control unit 93 allows the boom cylinder 10, the arm cylinder 11, and the bucket cylinder 12 to operate, according to the amount of boom operation MB, the amount of arm operation MA, and the amount of bucket operation MT. Therefore, the boom cylinder 10 operates at the boom target speed Vc_bm, the arm cylinder 11 operates at the arm target speed Vc_am, and the bucket cylinder 12 operates at the bucket target speed Vc_bkt.

When the pilot pressure generated based on the boom intervention instruction CBI is larger than the pilot pressure generated based on the operation of the boom 6, the shuttle valve 151 selects the pilot pressure generated based on the intervention instruction and outputted from the intervention valve 127C. As a result, the boom 6 operates at the boom speed limit Vc_bm_lmt, and the arm 7 operates at the arm target speed Vc_am. In addition, the bucket 8 operates at the bucket target speed Vc_bkt.

As described above, the vertical speed limit component Vcy_bm_lmt of the boom 6 is calculated by subtracting the vertical speed component Vcy_am of the arm target speed and the vertical speed component Vcy_bkt of the bucket target speed from the speed limit Vcy_lmt of the entire work implement 2. Therefore, when the speed limit Vcy_lmt of the entire work implement 2 is smaller than the sum of the vertical speed component Vcy_am of the arm target speed and the vertical speed component Vcy_bkt of the bucket target speed, the vertical speed limit component Vcy_bm_lmt of the boom 6 has a negative value where the boom moves up.

Therefore, the boom speed limit Vc_bm_lmt has a negative value. In this case, the work implement control unit 93 allows the boom 6 to move down, and makes the speed lower than the boom target speed Vc_bm. Hence, the bucket 8 can be inhibited from going beyond the target excavation topography 73I while reducing the operator's feeling of strangeness.

When the speed limit Vcy_lmt of the entire work implement 2 is larger than the sum of the vertical speed component Vcy_am of the arm target speed and the vertical speed component Vcy_bkt of the bucket target speed, the vertical speed limit component Vcy_bm_lmt of the boom 6 has a positive value. Therefore, the boom speed limit Vc_bm_lmt has a positive value. In this case, even if the operating apparatus 30 is operated in a direction in which the boom 6 moves down, the boom 6 moves up based on an instruction signal from the intervention valve 127C. Hence, further going beyond of the target excavation topography 73I can be promptly inhibited.

When the tooth edges 8T are located above the target excavation topography 73I, the closer the tooth edges 8T get to the target excavation topography 73I, the smaller the absolute value of the vertical speed limit component Vcy_bm_lmt of the boom 6 becomes and the smaller the absolute value of a speed component of the speed limit of the boom 6 in the direction parallel to the target excavation topography 73I (hereinafter, referred to as a horizontal speed limit component, as appropriate) Vcx_bm_lmt also becomes. Therefore, when the tooth edges 8T are located above the target excavation topography 73I, the closer the tooth edges 8T get to the target excavation topography 73I, the lower the speed of the boom 6 in the direction vertical to the target excavation topography 73I and the speed of the boom 6 in the direction parallel to the target excavation topography 73I become. By the operator of the excavator 100 simultaneously operating a work implement operating member 25L on the left side and a work implement operating member 25R on the right side, the boom 6, the arm 7, and the bucket 8 simultaneously operate. Assuming that at this time the target speeds Vc_bm, Vc_am, and Vc_bkt of the boom 6, the arm 7, and the bucket 8 are inputted, the above-described control will be described below.

FIG. 12 illustrates an example of a change in the speed limit of the boom 6 for when the distance d between the target excavation topography 73I and the tooth edges 8T of the bucket 8 is smaller than the first predetermined value dth1 and the tooth edges of the bucket 8 move from a position Pn1 to a position Pn2. The distance between the tooth edges 8T and the target excavation topography 73I at the position Pn2 is smaller than the distance between the tooth edges 8T and the target excavation topography 73I at the position Pn1. Hence, a vertical speed limit component Vcy_bm_lmt2 of the boom 6 at the position Pn2 is smaller than a vertical speed limit component Vcy_bm_lmt1 of the boom 6 at the position Pn1. Therefore, a boom speed limit Vc_bm_lmt2 at the position Pn2 is smaller than a boom speed limit Vc_bm_lmt1 at the position Pn1. In addition, a horizontal speed limit component Vcx_bm_lmt2 of the boom 6 at the position Pn2 is smaller than a horizontal speed limit component Vcx_bm_lmt1 of the boom 6 at the position Pn1. Note, however, that at this time limitations are not performed on the arm target speed Vc_am and the bucket target speed Vc_bkt. Hence, limitations are not performed on the vertical speed component Vcy_am and horizontal speed component Vcx_am of the arm target speed and the vertical speed component Vcy_bkt and horizontal speed component Vcx_bkt of the bucket target speed.

As described above, by not performing limitations on the arm 7, a change in the amount of arm operation corresponding to the operator's intention to excavate is reflected as a change in the speed of the tooth edges 8T of the bucket 8. Hence, in the present embodiment, the operator's feeling of strangeness upon performing an operation during excavation can be reduced while inhibiting further going beyond of the target excavation topography 73I.

The tooth edge position P4 of the tooth edges 8T may be measured by other measuring means instead of GNSS. Thus, the distance d between the tooth edges 8T and the target excavation topography 73I may be measured by other measuring means instead of GNSS. The absolute value of the bucket speed limit is smaller than the absolute value of the bucket target speed. The bucket speed limit may be calculated by, for example, the same technique as the above-described technique for the arm speed limit. Note that limitations on the bucket 8 may be performed together with limitations on the arm 7. Next, the details of a hydraulic system included in the excavator 100 and the operation of the hydraulic system performed during excavation control will be described.

Figure 13:
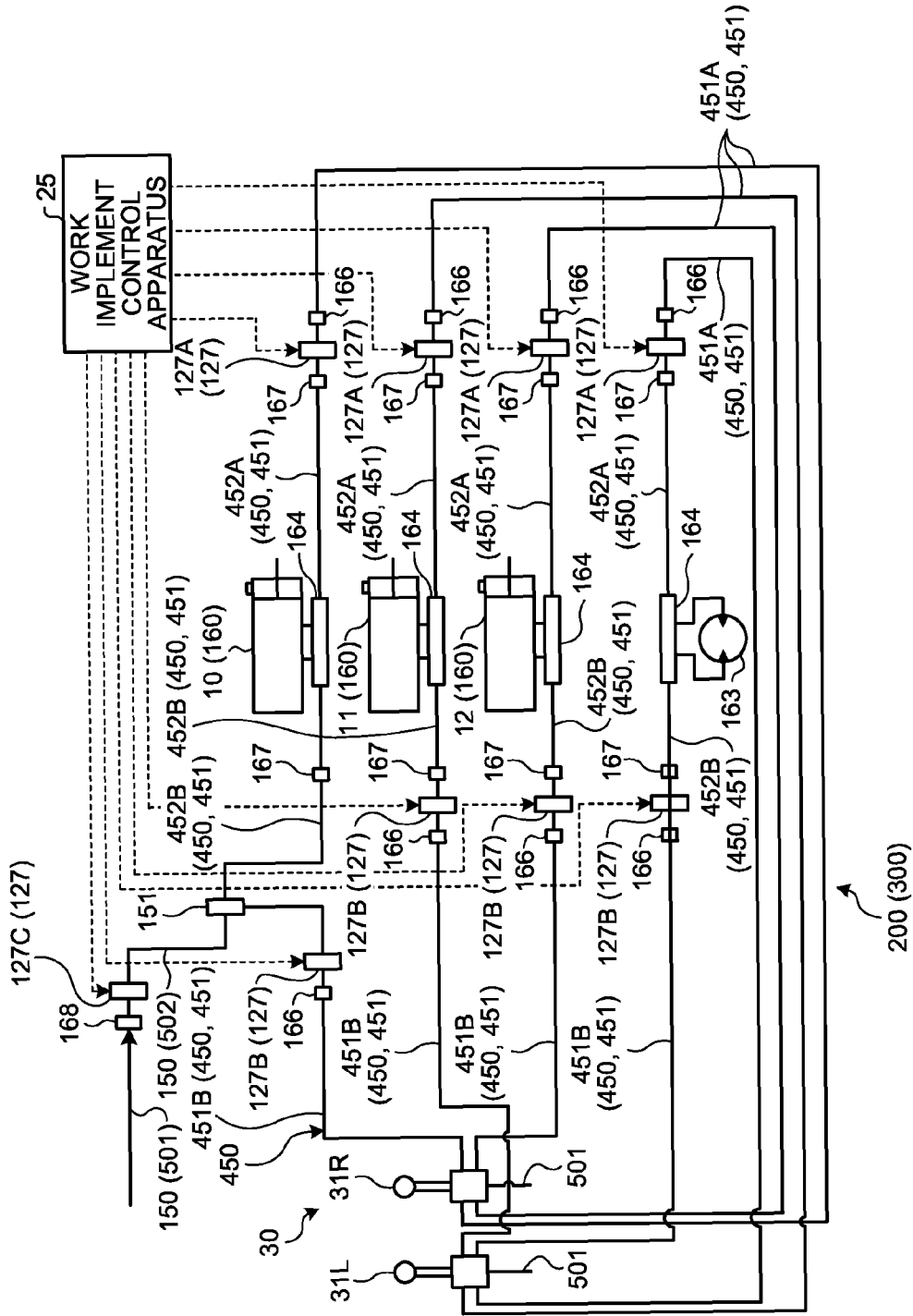
FIG. 13 is a schematic diagram illustrating an example of a control system and a hydraulic system according to the present embodiment.
Figure 14:
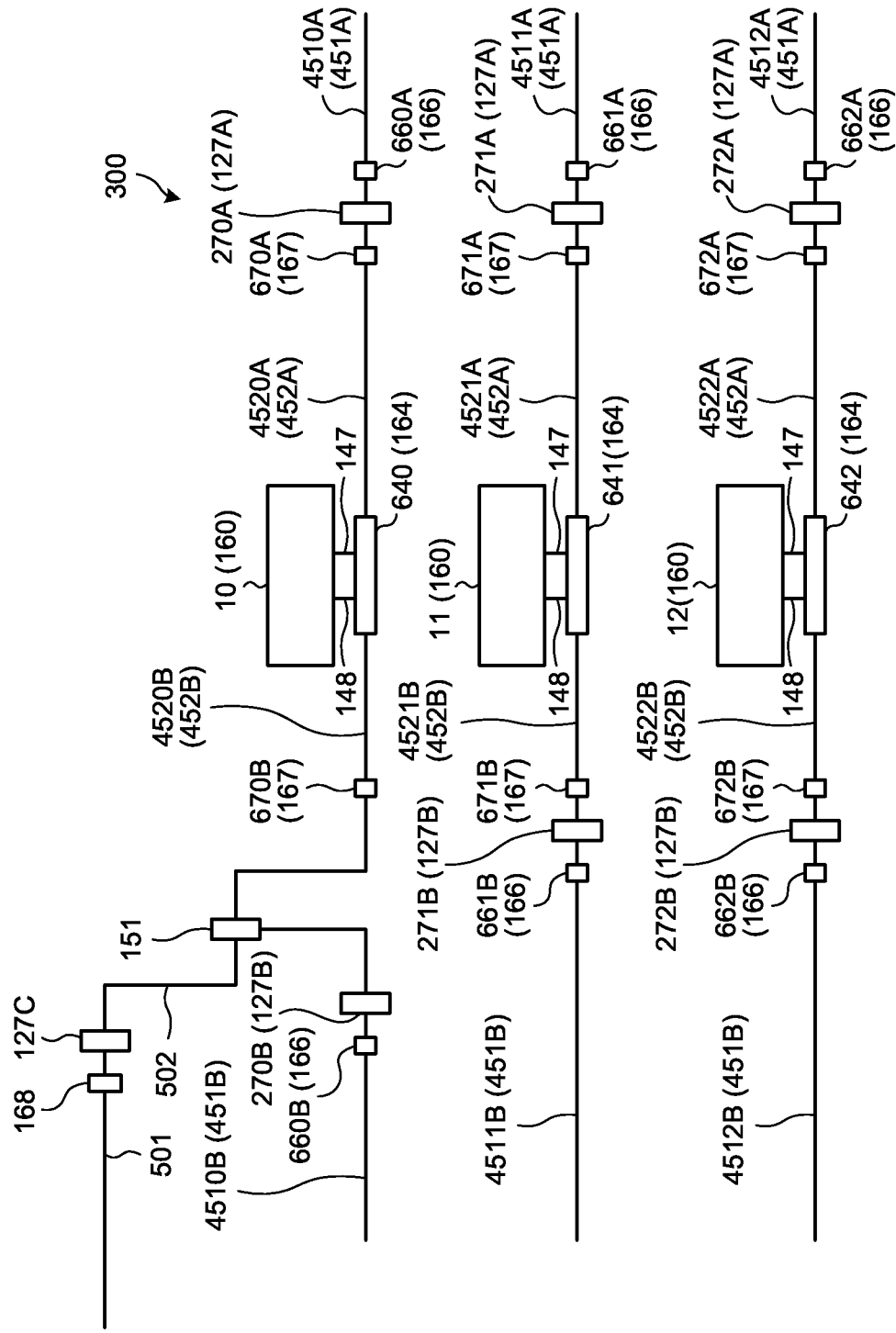
FIG. 14 is an enlarged view of a part of FIG. 13.

FIG. 13 is a schematic diagram illustrating an example of a control system 200 and a hydraulic system 300 according to the present embodiment. FIG. 14 is an enlarged view of a part of FIG. 13.

As illustrated in FIGS. 13 and 14, the hydraulic system 300 includes hydraulic cylinders 160 including the boom cylinder 10, the arm cylinder 11, and the bucket cylinder 12; and a swing motor 163 that allows the upper swing body 3 to swing. The hydraulic cylinders 160 work with hydraulic oil supplied from the hydraulic pump 37 illustrated in FIG. 2. The swing motor 163 is a hydraulic motor and works with hydraulic oil supplied from the hydraulic pump 37. The oil pressure control valve 38 illustrated in FIG. 2 includes directional control valves 164 and control valves 127, and the oil pressure sensor 38C includes pressure sensors 166 and pressure sensors 167.

In the present embodiment, the directional control valves 164 that control the direction of hydraulic oil flow are provided. The directional control valves 164 are disposed on the plurality of hydraulic cylinders 160 (the boom cylinder 10, the arm cylinder 11, and the bucket cylinder 12), respectively. The directional control valves 164 are of a spool type that changes the direction of hydraulic oil flow by moving a rod-like spool. The directional control valves 164 have a movable rod-like spool. The spool moves by pilot oil supplied thereto. Each directional control valve 164 supplies hydraulic oil to its corresponding hydraulic cylinder 160 by the movement of the spool, thereby allowing the hydraulic cylinder 160 to operate. Hydraulic oil supplied from the hydraulic pump 37 is supplied to the hydraulic cylinder 160 through the directional control valve 164. By the spool moving in an axial direction, switching between supply of hydraulic oil to a cap-side oil chamber and supply of hydraulic oil to a rod-side oil chamber is performed. In addition, by the spool moving in the axial direction, the amount of supply of hydraulic oil to the hydraulic cylinder 160 (the amount of supply per unit time) is regulated. By regulating the amount of supply of hydraulic oil to the hydraulic cylinder 160, the cylinder speed of the hydraulic cylinder 160 is regulated.

The drive of the directional control valves 164 is regulated by the operating apparatus 30. Hydraulic oil which is sent from the hydraulic pump 37 illustrated in FIG. 2 and whose pressure is reduced by a pressure reducing valve is supplied as pilot oil to the operating apparatus 30. Note that pilot oil sent from a different hydraulic pilot pump than the hydraulic pump 37 may be supplied to the operating apparatus 30. As illustrated in FIG. 2, the operating apparatus 30 includes pressure regulating valves 250 that can regulate pilot oil pressure. The pilot oil pressure is regulated based on the amount of operation of the operating apparatus 30. The directional control valves 164 are driven by the pilot oil pressure. By regulating the pilot oil pressure by the operating apparatus 30, the amount of movement and moving speed of the spool in the axial direction are regulated.

The directional control valves 164 are provided to the boom cylinder 10, the arm cylinder 11, the bucket cylinder 12, and the swing motor 163, respectively. In the following description, the directional control valve 164 connected to the boom cylinder 10 is referred to as the directional control valve 640, as appropriate. The directional control valve 164 connected to the arm cylinder 11 is referred to as the directional control valve 641, as appropriate. The directional control valve 164 connected to the bucket cylinder 12 is referred to as the directional control valve 642, as appropriate.

The operating apparatus 30 and the directional control valves 164 are connected to each other through pilot oil passages 450. Pilot oil for moving the spools of the directional control valves 164 flows through the pilot oil passages 450. In the present embodiment, the control valves 127, the pressure sensors 166, and the pressure sensors 167 are disposed in the pilot oil passages 450.

In the following description, of the pilot oil passages 450, the pilot oil passages 450 between the operating apparatus 30 and the control valves 127 are referred to as pilot oil passages 451, as appropriate, and the pilot oil passages 450 between the control valves 127 and the directional control valves 164 are referred to as pilot oil passages 452, as appropriate.

The pilot oil passages 452 are connected to the directional control valves 164. Pilot oil is supplied to the directional control valves 164 through the pilot oil passages 452. Each directional control valve 164 has a first pressure receiving chamber and a second pressure receiving chamber. Each pilot oil passage 452 includes a pilot oil passage 452A connected to the first pressure receiving chamber; and a pilot oil passage 452B connected to the second pressure receiving chamber.

When pilot oil is supplied to the first pressure receiving chamber of the directional control valve 164 through the pilot oil passage 452A, the spool moves according to the pilot oil pressure, and hydraulic oil is supplied to the rod-side oil chamber of the hydraulic cylinder 160 through the directional control valve 164. The amount of supply of hydraulic oil to the rod-side oil pressure chamber is regulated by the amount of operation of the operating apparatus 30 (the amount of movement of the spool).

When pilot oil is supplied to the second pressure receiving chamber of the directional control valve 164 through the pilot oil passage 452B, the spool moves according to the pilot oil pressure, and hydraulic oil is supplied to the cap-side oil chamber of the hydraulic cylinder 160 through the directional control valve 164. The amount of supply of hydraulic oil to the cap-side oil pressure chamber is regulated by the amount of operation of the operating apparatus 30 (the amount of movement of the spool).

Namely, by supplying pilot oil whose pilot oil pressure is regulated by the operating apparatus 30 to the directional control valve 164, the spool moves to one side in the axial direction. By supplying pilot oil whose pilot oil pressure is regulated by the operating apparatus 30 to the directional control valve 164, the spool moves to the other side in the axial direction. As a result, the position of the spool in the axial direction is regulated.

Each pilot oil passage 451 includes a pilot oil passage 451A connecting the pilot oil passage 452A to the operating apparatus 30; and a pilot oil passage 451B connecting the pilot oil passage 452B to the operating apparatus 30.

In the following description, the pilot oil passage 452A connected to the directional control valve 640 that supplies hydraulic oil to the boom cylinder 10 is referred to as a boom regulation oil passage 4520A, as appropriate, and the pilot oil passage 452B connected to the directional control valve 640 is referred to as a boom regulation oil passage 4520B, as appropriate.

In the following description, the pilot oil passage 452A connected to the directional control valve 641 that supplies hydraulic oil to the arm cylinder 11 is referred to as an arm regulation oil passage 4521A, as appropriate, and the pilot oil passage 452B connected to the directional control valve 641 is referred to as an arm regulation oil passage 4521B, as appropriate.

In the following description, the pilot oil passage 452A connected to the directional control valve 642 that supplies hydraulic oil to the bucket cylinder 12 is referred to as a bucket regulation oil passage 4522A, as appropriate, and the pilot oil passage 452B connected to the directional control valve 642 is referred to as a bucket regulation oil passage 4522B, as appropriate.

In the following description, the pilot oil passage 451A connected to the boom regulation oil passage 4520A is referred to as a boom operation oil passage 4510A, as appropriate, and the pilot oil passage 451B connected to the boom regulation oil passage 4520B is referred to as a boom operation oil passage 4510B, as appropriate.

In the following description, the pilot oil passage 451A connected to the arm regulation oil passage 4521A is referred to as an arm operation oil passage 4511A, as appropriate, and the pilot oil passage 451B connected to the arm regulation oil passage 4521B is referred to as an arm operation oil passage 4511B, as appropriate.

In the following description, the pilot oil passage 451A connected to the bucket regulation oil passage 4522A is referred to as a bucket operation oil passage 4512A, as appropriate, and the pilot oil passage 451B connected to the bucket regulation oil passage 4522B is referred to as a bucket operation oil passage 4512B, as appropriate.

The boom operation oil passages (4510A and 4510B) and the boom regulation oil passages (4520A and 4520B) are connected to the pilot oil pressure type operating apparatus 30. Pilot oil whose pressure is regulated according to the amount of operation of the operating apparatus 30 flows through the boom operation oil passages (4510A and 4510B).

The arm operation oil passages (4511A and 4511B) and the arm regulation oil passages (4521A and 4521B) are connected to the pilot oil pressure type operating apparatus 30. Pilot oil whose pressure is regulated according to the amount of operation of the operating apparatus 30 flows through the arm operation oil passages (4511A and 4511B).

The bucket operation oil passages (4512A and 4512B) and the bucket regulation oil passages (4522A and 4522B) are connected to the pilot oil pressure type operating apparatus 30. Pilot oil whose pressure is regulated according to the amount of operation of the operating apparatus 30 flows through the bucket operation oil passages (4512A and 4512B).

The boom operation oil passage 4510A, the boom operation oil passage 4510B, the boom regulation oil passage 4520A, and the boom regulation oil passage 4520B are boom oil passages through which pilot oil for allowing the boom 6 to operate flows.

The arm operation oil passage 4511A, the arm operation oil passage 4511B, the arm regulation oil passage 4521A, and the arm regulation oil passage 4521B are arm oil passages through which pilot oil for allowing the arm 7 to operate flows.

The bucket operation oil passage 4512A, the bucket operation oil passage 4512B, the bucket regulation oil passage 4522A, and the bucket regulation oil passage 4522B are bucket oil passages through which pilot oil for allowing the bucket 8 to operate flows.

As described above, the boom 6 performs two types of operation, move-down operation and move-up operation, by an operation of the operating apparatus 30. By operating the operating apparatus 30 to perform move-down operation of the boom 6, pilot oil is supplied to the directional control valve 640 connected to the boom cylinder 10, through the boom operation oil passage 4510A and the boom regulation oil passage 4520A. The directional control valve 640 works based on pilot oil pressure. By this, hydraulic oil from the hydraulic pump 37 is supplied to the boom cylinder 10 to perform move-down operation of the boom 6.

By operating the operating apparatus 30 to perform move-up operation of the boom 6, pilot oil is supplied to the directional control valve 640 connected to the boom cylinder 10, through the boom operation oil passage 4510B and the boom regulation oil passage 4520B. The directional control valve 640 works based on pilot oil pressure. As a result, hydraulic oil from the hydraulic pump 37 is supplied to the boom cylinder 10 to perform move-up operation of the boom 6.

Namely, in the present embodiment, the boom operation oil passage 4510A and the boom regulation oil passage 4520A are boom move-down oil passages which are connected to the first pressure receiving chamber of the directional control valve 640, and through which pilot oil for allowing the boom 6 to perform move-down operation flows. The boom operation oil passage 4510B and the boom regulation oil passage 4520B are boom move-up oil passages which are connected to the second pressure receiving chamber of the directional control valve 640, and through which pilot oil for allowing the boom 6 to perform move-up operation flows.

In addition, the arm 7 performs two types of operation, move-down operation and move-up operation, by an operation of the operating apparatus 30. By operating the operating apparatus 30 to perform move-up operation of the arm 7, pilot oil is supplied to the directional control valve 641 connected to the arm cylinder 11, through the arm operation oil passage 4511A and the arm regulation oil passage 4521A. The directional control valve 641 works based on pilot oil pressure. As a result, hydraulic oil from the hydraulic pump 37 is supplied to the arm cylinder 11 to perform move-up operation of the arm 7.

By operating the operating apparatus 30 to perform move-down operation of the arm 7, pilot oil is supplied to the directional control valve 641 connected to the arm cylinder 11, through the arm operation oil passage 4511B and the arm regulation oil passage 4521B. The directional control valve 641 works based on pilot oil pressure. As a result, hydraulic oil from the hydraulic pump 37 is supplied to the arm cylinder 11 to perform move-down operation of the arm 7.

Namely, in the present embodiment, the arm operation oil passage 4511A and the arm regulation oil passage 4521A are arm move-up oil passages which are connected to the first pressure receiving chamber of the directional control valve 641, and through which pilot oil for allowing the arm 7 to perform move-up operation flows. The arm operation oil passage 4511B and the arm regulation oil passage 4521B are arm move-down oil passages which are connected to the second pressure receiving chamber of the directional control valve 641, and through which pilot oil for allowing the arm 7 to perform move-down operation flows.

The bucket 8 performs two types of operation, move-down operation and move-up operation, by an operation of the operating apparatus 30. By operating the operating apparatus 30 to perform move-up operation of the bucket 8, pilot oil is supplied to the directional control valve 642 connected to the bucket cylinder 12, through the bucket operation oil passage 4512A and the bucket regulation oil passage 4522A. The directional control valve 642 works based on pilot oil pressure. As a result, hydraulic oil from the hydraulic pump 37 is supplied to the bucket cylinder 12 to perform move-up operation of the bucket 8.

By operating the operating apparatus 30 to perform move-down operation of the bucket 8, pilot oil is supplied to the directional control valve 642 connected to the bucket cylinder 12, through the bucket operation oil passage 4512B and the bucket regulation oil passage 4522B. The directional control valve 642 works based on pilot oil pressure. As a result, hydraulic oil from the hydraulic pump 37 is supplied to the bucket cylinder 12 to perform move-down operation of the bucket 8.

Namely, in the present embodiment, the bucket operation oil passage 4512A and the bucket regulation oil passage 4522A are bucket move-up oil passages which are connected to the first pressure receiving chamber of the directional control valve 642, and through which pilot oil for allowing the bucket 8 to perform move-up operation flows. The bucket operation oil passage 4512B and the bucket regulation oil passage 4522B are bucket move-down oil passages which are connected to the second pressure receiving chamber of the directional control valve 642, and through which pilot oil for allowing the bucket 8 to perform move-down operation flows.

In addition, the upper swing body 3 performs two types of operation, right swing operation and left swing operation, by an operation of the operating apparatus 30. By operating the operating apparatus 30 to perform right swing operation of the upper swing body 3, hydraulic oil is supplied to the swing motor 163. By operating the operating apparatus 30 to perform left swing operation of the upper swing body 3, the directional control valve 164 is operated to supply hydraulic oil to the swing motor 163.

The control valves 127 regulate pilot oil pressure, based on control signals (current) from the work implement control apparatus 25. The control valves 127 are, for example, electromagnetic proportional control valves and are controlled based on control signals from the work implement control apparatus 25. The control valves 127 include control valves 127A and control valves 127B. Each control valve 127A regulates the pilot oil pressure of pilot oil supplied to the first pressure receiving chamber of its corresponding directional control valve 164, to regulate the amount of supply of hydraulic oil supplied to the rod-side oil chamber through the directional control valve 164. Each control valve 127B regulates the pilot oil pressure of pilot oil supplied to the second pressure receiving chamber of its corresponding directional control valve 164, to regulate the amount of supply of hydraulic oil supplied to the cap-side oil chamber through the directional control valve 164.

In the following description, the control valves 127A are referred to as the pressure reducing valves 127A, as appropriate, and the control valves 127B are referred to as the pressure reducing valves 127B, as appropriate. A pressure sensor 166 and a pressure sensor 167 that detect pilot oil pressure are provided on both sides of each control valve 127. In the present embodiment, the pressure sensor 166 is disposed between the operating apparatus 30 and the control valve 127 in the pilot oil passage 451. The pressure sensor 167 is disposed between the control valve 127 and the directional control valve 164 in the pilot oil passage 452. The pressure sensor 166 can detect pilot oil pressure which is before being regulated by the control valve 127. The pressure sensor 167 can detect pilot oil pressure having been regulated by the control valve 127. The pressure sensor 166 can detect pilot oil pressure which is regulated by an operation of the operating apparatus 30. The detection results of the pressure sensor 166 and the pressure sensor 167 are outputted to the work implement control apparatus 25.

In the following description, the control valves 127 that can regulate pilot oil pressure for the directional control valve 640 that supplies hydraulic oil to the boom cylinder 10 are referred to as boom pressure reducing valves 270, as appropriate. In addition, of the boom pressure reducing valves 270, one boom pressure reducing valve (corresponding to the pressure reducing valve 127A) is referred to as a boom pressure reducing valve 270A, as appropriate, and the other boom pressure reducing valve (corresponding to the pressure reducing valve 127B) is referred to as a boom pressure reducing valve 270B, as appropriate. The boom pressure reducing valves 270 (270A and 270B) are disposed in the boom operation oil passages.

In the following description, the control valves 127 that can regulate pilot oil pressure for the directional control valve 641 that supplies hydraulic oil to the arm cylinder 11 are referred to as arm pressure reducing valves 271, as appropriate. In addition, of the arm pressure reducing valves 271, one arm pressure reducing valve (corresponding to the pressure reducing valve 127A) is referred to as an arm pressure reducing valve 271A, as appropriate, and the other arm pressure reducing valve (corresponding to the pressure reducing valve 127B) is referred to as an arm pressure reducing valve 271B, as appropriate. The arm pressure reducing valves 271 (271A and 271B) are disposed in the arm operation oil passages.

In the following description, the control valves 127 that can regulate pilot oil pressure for the directional control valve 642 that supplies hydraulic oil to the bucket cylinder 12 are referred to as bucket pressure reducing valves 272, as appropriate. In addition, of the bucket pressure reducing valves 272, one bucket pressure reducing valve (corresponding to the pressure reducing valve 127A) is referred to as a bucket pressure reducing valve 272A, as appropriate, and the other bucket pressure reducing valve (corresponding to the pressure reducing valve 127B) is referred to as a bucket pressure reducing valve 272B, as appropriate. The bucket pressure reducing valves 272 (272A and 272B) are disposed in the bucket operation oil passages.

Pilot oil passages 451A, 451B, 452A, and 452B are connected to the directional control valve 640 that supplies hydraulic oil to the boom cylinder 10. In the following description, the boom pressure sensor 166 disposed in the boom operation oil passage 4510A is referred to as a boom pressure sensor 660A, as appropriate, and the boom pressure sensor 166 disposed in the boom operation oil passage 4510B is referred to as a boom pressure sensor 660B, as appropriate. In addition, the boom pressure sensor 167 disposed in the boom regulation oil passage 4520A is referred to as a boom pressure sensor 670A, as appropriate, and the boom pressure sensor 167 disposed in the boom regulation oil passage 4520B is referred to as a boom pressure sensor 670B, as appropriate.

In the following description, pilot oil passages 451A, 451B, 452A, and 452B are connected to the directional control valve 641 that supplies hydraulic oil to the arm cylinder 11. In the following description, the arm pressure sensor 166 disposed in the arm operation oil passage 4511A is referred to as an arm pressure sensor 661A, as appropriate, and the arm pressure sensor 166 disposed in the arm operation oil passage 4511B is referred to as an arm pressure sensor 661B, as appropriate. In addition, the arm pressure sensor 167 disposed in the arm regulation oil passage 4521A is referred to as an arm pressure sensor 671A, as appropriate, and the arm pressure sensor 167 disposed in the arm regulation oil passage 4521B is referred to as an arm pressure sensor 671B, as appropriate.

In the following description, pilot oil passages 451A, 451B, 452A, and 452B are connected to the directional control valve 642 that supplies hydraulic oil to the bucket cylinder 12. In the following description, the bucket pressure sensor 166 disposed in the bucket operation oil passage 4512A is referred to as a bucket pressure sensor 662A, as appropriate, and the bucket pressure sensor 166 disposed in the bucket operation oil passage 4512B is referred to as a bucket pressure sensor 662B, as appropriate. In addition, the bucket pressure sensor 167 disposed in the bucket regulation oil passage 4522A is referred to as a bucket pressure sensor 672A, as appropriate, and the bucket pressure sensor 167 disposed in the bucket regulation oil passage 4522B is referred to as a bucket pressure sensor 672B, as appropriate.

When excavation control is not performed, the work implement control apparatus 25 controls the control valves 127 to open (fully open) the pilot oil passages 450 illustrated in FIG. 13. By opening the pilot oil passages 450, the pilot oil pressure in the pilot oil passages 451 becomes equal to the pilot oil pressure in the pilot oil passages 452. With the pilot oil passages 450 opened by the control valves 127, the pilot oil pressure is regulated based on the amount of operation of the operating apparatus 30.

When the pilot oil passages 450 is fully opened by the control valves 127, the pilot oil pressure acting on the pressure sensors 166 is equal to the pilot oil pressure acting on the pressure sensors 167. By the degree of opening of the control valves 127 becoming smaller, the pilot oil pressure acting on the pressure sensors 166 differs from the pilot oil pressure acting on the pressure sensors 167.

When the work implement 2 is controlled by the work implement control apparatus 25 like excavation control, etc., the work implement control apparatus 25 outputs control signals to the control valves 127. The pilot oil passages 451 have predetermined pressure (pilot oil pressure) by, for example, the action of pilot operated relief valves. When a control signal is outputted to a control valve 127 from the work implement control apparatus 25, the control valve 127 works based on the control signal. Pilot oil in a pilot oil passage 451 is supplied to a pilot oil passage 452 through a control valve 127. The pilot oil pressure in the pilot oil passage 452 is regulated (pressure-reduced) by the control valve 127. The pilot oil pressure in the pilot oil passage 452 acts on a directional control valve 164. By this, the directional control valve 164 works based on the pilot oil pressure controlled by the control valve 127. In the present embodiment, a pressure sensor 166 detects pilot oil pressure which is before being regulated by the control valve 127. A pressure sensor 167 detects pilot oil pressure which is after being regulated by the control valve 127.

By supplying pilot oil whose pressure is regulated by a pressure reducing valve 127A to a directional control valve 164, the spool moves to one side in the axial direction. By supplying pilot oil whose pressure is regulated by a pressure reducing valve 127B to the directional control valve 164, the spool moves to the other side in the axial direction. As a result, the position of the spool in the axial direction is regulated.

For example, the work implement control apparatus 25 can regulate pilot oil pressure for the directional control valve 640 connected to the boom cylinder 10, by outputting a control signal to at least one of the boom pressure reducing valve 270A and the boom pressure reducing valve 270B.

In addition, the work implement control apparatus 25 can regulate pilot oil pressure for the directional control valve 641 connected to the arm cylinder 11, by outputting a control signal to at least one of the arm pressure reducing valve 271A and the arm pressure reducing valve 271B.

In addition, the work implement control apparatus 25 can regulate pilot oil pressure for the directional control valve 642 connected to the bucket cylinder 12, by outputting a control signal to at least one of the bucket pressure reducing valve 272A and the bucket pressure reducing valve 272B.

In excavation control, as described above, the work implement control apparatus 25 limits, based on a target excavation topography 73I representing a design topography which is an excavation object's target shape (target excavation topographic data U) and bucket tooth edge position data S representing the position of the bucket 8, the speed of the boom 6 such that the speed at which the bucket 8 approaches the target excavation topography 73I decreases according to the distance d between the target excavation topography 73I and the bucket 8.

In the present embodiment, the work implement control apparatus 25 has a boom limiting unit that outputs a control signal for limiting the speed of the boom 6. In the present embodiment, when the work implement 2 is driven based on an operation of the operating apparatus 30, in order that the tooth edges 8T of the bucket 8 do not invade the target excavation topography 73I, the movement of the boom 6 is controlled (boom intervention control) based on a control signal outputted from the boom limiting unit of the work implement control apparatus 25. Specifically, in excavation control, in order that the tooth edges 8T do not invade the target excavation topography 73I, the boom 6 is allowed to perform move-up operation by the work implement control apparatus 25.

In the present embodiment, in order to implement boom intervention control, a control valve 127C that works based on a control signal for boom intervention control which is outputted from the work implement control apparatus 25 is provided to a pilot oil passage 150. In boom intervention control, pilot oil whose pressure (pilot oil pressure) is regulated flows through the pilot oil passage 150. The control valve 127C is disposed in the pilot oil passage 150 and can regulate pilot oil pressure in the pilot oil passage 150.

In the following description, the pilot oil passage 150 through which pilot oil whose pressure is regulated flows in boom intervention control is referred to as an intervention oil passage 501, 502, as appropriate, and the control valve 127C connected to the intervention oil passage 501 is referred to as an intervention valve 127C, as appropriate.

Pilot oil to be supplied to the directional control valve 640 connected to the boom cylinder 10 flows through the intervention oil passage 502. The intervention oil passage 502 is connected through a shuttle valve 151 to the boom operation oil passage 4510B and the boom regulation oil passage 4520B which are connected to the directional control valve 640.

The shuttle valve 151 has two inlets and one outlet. One of the inlets is connected to the intervention oil passage 502. The other inlet is connected to the boom operation oil passage 4510B. The outlet is connected to the boom regulation oil passage 4520B. The shuttle valve 151 connects one of the intervention oil passage 501 and the boom operation oil passage 4510B that has higher pilot oil pressure, to the boom regulation oil passage 4520B. For example, when the pilot oil pressure in the intervention oil passage 502 is higher than the pilot oil pressure in the boom operation oil passage 4510B, the shuttle valve 151 works to connect the intervention oil passage 502 to the boom regulation oil passage 4520B, and not to connect the boom operation oil passage 4510B to the boom regulation oil passage 4520B. By this, pilot oil in the intervention oil passage 502 is supplied to the boom regulation oil passage 4520B through the shuttle valve 151. When the pilot oil pressure in the boom operation oil passage 4510B is higher than the pilot oil pressure in the intervention oil passage 502, the shuttle valve 151 works to connect the boom operation oil passage 4510B to the boom regulation oil passage 4520B, and not to connect the intervention oil passage 502 to the boom regulation oil passage 4520B. By this, pilot oil in the boom operation oil passage 4510B is supplied to the boom regulation oil passage 4520B through the shuttle valve 151.

A pressure sensor 168 that detects the pilot oil pressure of pilot oil in the intervention oil passage 501 is provided to the intervention oil passage 501. The intervention oil passage 501 includes the intervention oil passage 501 through which pilot oil which is before passing through the control valve 127C flows; and the intervention oil passage 502 through which pilot oil which is after passing through the intervention valve 127C flows. The intervention valve 127C is controlled based on a control signal which is outputted from the work implement control apparatus 25 to perform boom intervention control.

When boom intervention control is not performed, the directional control valves 164 are driven based on pilot oil pressure regulated by an operation of the operating apparatus 30. Hence, the work implement control apparatus 25 does not output control signals to the control valves 127. For example, the work implement control apparatus 25 opens (fully opens) the boom operation oil passage 4510B by the boom pressure reducing valve 270B, and closes the intervention oil passage 501 by the intervention valve 127C, so that the directional control valve 640 can be driven based on pilot oil pressure regulated by an operation of the operating apparatus 30.

When boom intervention control is performed, the work implement control apparatus 25 controls each control valve 127 so that the directional control valves 164 can be driven based on pilot oil pressure regulated by the intervention valve 127C. For example, when performing boom intervention control where the movement of the boom 6 is limited in excavation control, the work implement control apparatus 25 controls the intervention valve 127C such that the pilot oil pressure in the intervention oil passage 502 regulated by the intervention valve 127C is higher than the pilot oil pressure in the boom operation oil passage 4510B regulated by the operating apparatus 30. By doing so, pilot oil from the intervention valve 127C is supplied to the directional control valve 640 through the shuttle valve 151.

When the boom 6 is allowed to perform move-up operation at high speed by the operating apparatus 30 so that the bucket 8 does not invade the target excavation topography 73I, boom intervention control is not performed. By operating the operating apparatus 30 such that the boom 6 performs move-up operation at high speed, and regulating the pilot oil pressure based on the amount of the operation of the operating apparatus 30, the pilot oil pressure in the boom operation oil passage 4510B regulated by the operation of the operating apparatus 30 is higher than the pilot oil pressure in the intervention oil passage 502 regulated by the intervention valve 127C. By this, pilot oil in the boom operation oil passage 4510B whose pilot oil pressure is regulated by the operation of the operating apparatus 30 is supplied to the directional control valve 640 through the shuttle valve 151.

In boom intervention control, the work implement control apparatus 25 determines whether limitation conditions are satisfied. The limitation conditions include that: the distance d is smaller than the above-described first predetermined value dth1; and the boom speed limit Vc_bm_lmt is larger than the boom target speed Vc_bm. For example, in the case of allowing the boom 6 to move down, when the magnitude of downward boom speed limit Vc_bm_lmt of the boom 6 is smaller than the magnitude of downward boom target speed Vc_bm, the work implement control apparatus 25 determines that the limitation conditions are satisfied. In addition, in the case of allowing the boom 6 to move up, when the magnitude of upward boom speed limit Vc_bm_lmt of the boom 6 is larger than the magnitude of upward boom target speed Vc_bm, the work implement control apparatus 25 determines that the limitation conditions are satisfied.

When the limitation conditions are satisfied, the work implement control apparatus 25 generates a boom intervention instruction CBI so that the boom moves up at the boom speed limit Vc_bm_lmt, and controls the control valve 27 of the boom cylinder 10. By doing so, the directional control valve 640 of the boom cylinder 10 supplies hydraulic oil to the boom cylinder 10 so that the boom moves up at the boom speed limit Vc_bm_lmt. Thus, the boom cylinder 10 moves up the boom 6 at the boom speed limit Vc_bm_lmt.

In a first embodiment, the limitation conditions may include that the absolute value of arm speed limit Vc_am_lmt is smaller than the absolute value of arm target speed Vc_am. The limitation conditions may further include other conditions. For example, the limitation conditions may further include that the amount of arm operation is 0. The limitation conditions may not include that the distance d is smaller than the first predetermined value dth1. For example, the limitation conditions may only include that the speed limit of the boom 6 is larger than the boom target speed.

A second predetermined value dth2 may be larger than 0 provided that the second predetermined value dth2 is smaller than the first predetermined value dth1. In this case, before the tooth edges 8T of the boom 6 reach the target excavation topography 73I, both of limitations on the boom 6 and limitations on the arm 7 are performed. Hence, even before the tooth edges 8T of the boom 6 reach the target excavation topography 73I, when the tooth edges 8T of the boom 6 are going to go beyond the target excavation topography 73I, both of limitations on the boom 6 and limitations on the arm 7 can be performed.

(When the Operating Levers are of an Electric Operated Type)

When the work implement operating member 31L on the left side and the work implement operating member 31R on the right side are of an electric operated type, the work implement control apparatus 25 obtains an electrical signal from a potentiometer, etc., provided for the work implement operating member 31L, 31R. The electrical signal is referred to as an operation instruction current value. The work implement control apparatus 25 outputs an open/close instruction based on the operation instruction current value to a corresponding control value 127. Hydraulic oil with pressure according to the open/close instruction is supplied to the spool of a directional control valve from the control valve 127 to move the spool. Thus, hydraulic oil is supplied to the boom cylinder 10, the arm cylinder 11, or the bucket cylinder 12 through the directional control valve, by which the cylinder extends or retracts.

In excavation control, the work implement control apparatus 25 outputs an instruction value for excavation control and an open/close instruction which is based on an operation instruction current value, to a control valve 127. The instruction value for excavation control is an instruction value for performing boom intervention control in excavation control. The control valve 127 to which the open/close instruction has been inputted supplies hydraulic oil with pressure determined according to the open/close instruction, to the spool of a directional control valve to move the spool. Since hydraulic oil with pressure determined according to the instruction value for excavation control is supplied to the spool of the directional control valve of the boom cylinder 10, the boom cylinder 10 extends to move up the boom 6.

(Display of Guidance)

In guidance, the bucket tooth edge position data generating unit 39B of the second display apparatus 39 illustrated in FIG. 3B generates central swing position data, based on reference position data P and swing body azimuth data Q which are obtained from the global coordinate computing unit 23. Then, the bucket tooth edge position data generating unit 39B generates bucket tooth edge position data S, based on the central swing position data and the tilt angles α1, α2, and α3 of the work implement 2. In addition, the target excavation topographic data generating unit 39D generates display target excavation topographic data Ua from target working information T and the bucket tooth edge position data S. The display unit 39M displays a target excavation topography 73I using the display target excavation topographic data Ua.

The display unit 39M sequentially (e.g., a 100 msec cycle) determines, as an excavation object position 74 illustrated in FIG. 3A, a point included in information on the target excavation topography 73I that is present directly below the bucket 8, from the target excavation topography 73I and the bucket tooth edge position data S. The display unit 39M determines and displays a display target excavation topography 73I by extending in the front-rear direction of the work implement 2 from the excavation object position 74.

The target excavation topographic data generating unit 39D transmits to the work implement control apparatus 25 angle information of an excavation object position 74 in the local coordinates of the excavator 100, two points before and after the excavation object position 74, and points after the two points before and after the excavation object position 74, as information on the target excavation topography 73I for excavation control, i.e., target excavation topographic data U. In guidance and excavation control, the second display apparatus 39 generates target excavation topographic data U (target excavation topography 73I) in, for example, a 100 msec cycle, based on position information of the excavator 100 obtained from the global coordinate computing unit 23 and target working information T, and transmits the target excavation topographic data U to the work implement control apparatus 25.

The target excavation topographic data U (target excavation topography 73I) is inputted to the work implement control apparatus 25 from the target excavation topographic data generating unit 39D of the second display apparatus 39 in, for example, a 100 msec cycle. A tilt angle (hereinafter, referred to as a pitch angle, as appropriate) $\theta 5$ detected by the IMU 29 is inputted to the work implement control apparatus 25 and the second display apparatus 39 every 10 msec, for example. The work implement control apparatus 25 and the second display apparatus 39 keeps updating the pitch angle $\theta 5$ of the target excavation topographic data U (target excavation topography 73I), based on the amount of increase or decrease between the values of the pitch angle $\theta 5$ obtained last time and this time which are detected by the IMU 29 and inputted from the sensor control apparatus 24. The work implement control apparatus 25 calculates a tooth edge position P4 using the pitch angle $\theta 5$, and performs excavation control. The second display apparatus 39 calculates bucket tooth edge position data S using the pitch angle $\theta 5$, and uses the bucket tooth edge position data S as the tooth edge position in a guidance image. After a lapse of 100 msec, new target excavation topographic data U (target excavation topography 73I) is inputted to the work implement control apparatus 25 from the second display apparatus 39 and updated.

Figure 15:
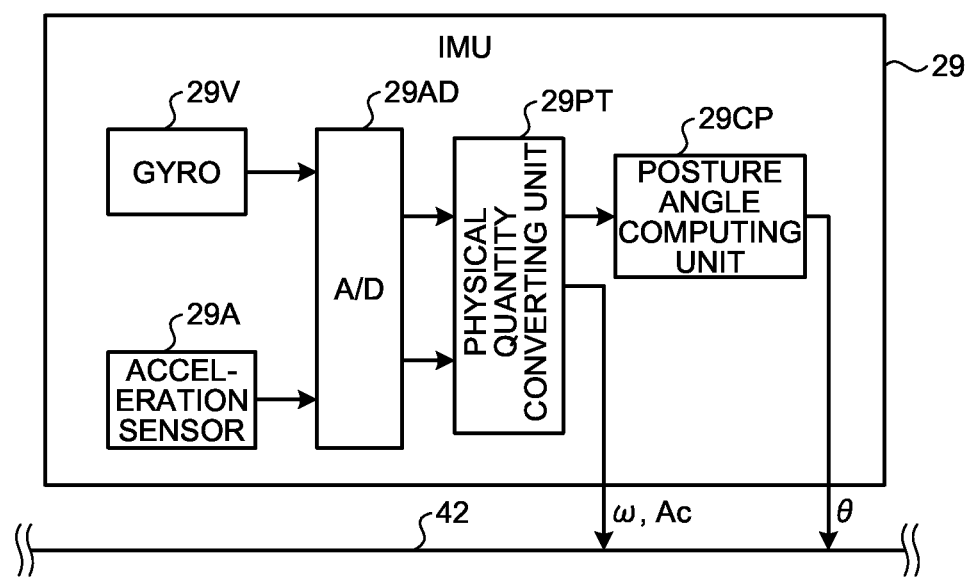
FIG. 15 is a block diagram illustrating an example of an IMU.

FIG. 15 is a block diagram illustrating an example of the IMU 29. The IMU 29 includes a gyro 29V, an acceleration sensor 29A, an AD converting unit 29AD, and a physical quantity converting unit 29PT. The gyro 29V detects the angular velocity of the excavator 100. The acceleration sensor 29A detects the acceleration of the excavator. Both of the angular velocity detected by the gyro 29V and the acceleration detected by the acceleration sensor 29A are analog quantities. The AD converting unit 29AD converts the analog quantities into digital quantities. The physical quantity converting unit 29PT converts the outputs from the AD converting unit 29AD into physical quantities. Specifically, the physical quantity converting unit 29PT converts the output from the AD converting unit 29AD corresponding to the detected value of the gyro 29V into angular velocity $\omega$, and converts the output from the AD converting unit 29AD corresponding to the detected value of the acceleration sensor 29A into acceleration Ac. The physical quantity converting unit 29PT outputs the angular velocity $\omega$ and the acceleration Ac to the in-vehicle signal line 42.

The AD converting unit 29AD converts the analog quantities into digital quantities. The physical quantity converting unit 29PT converts the outputs from the AD converting unit 29AD into physical quantities. Specifically, the physical quantity converting unit 29PT converts the output from the AD converting unit 29AD corresponding to the detected value of the gyro 29V into angular velocity $\omega$, and converts the output from the AD converting unit 29AD corresponding to the detected value of the acceleration sensor 29A into acceleration Ac. The physical quantity converting unit 29PT outputs the angular velocity $\omega$ and the acceleration Ac to the in-vehicle signal line 42. A posture angle computing unit 29CP computes a posture angle $\theta$ from the angular velocity $\omega$ and the acceleration Ac which are obtained by the physical quantity converting unit 29PT, and outputs the obtained posture angle $\theta$ to the in-vehicle signal line 42. In the following, the posture angle is represented using the symbol $\theta$, as appropriate. As such, the IMU 29 is an apparatus that detects the posture angle of the excavator 100.

The tilt of the excavator 100 can be represented by pitch, roll, and yaw angles. The pitch angle is the angle of the excavator 100 when tilted about the y-axis. The roll angle is the angle of the excavator 100 when tilted about the x-axis. The yaw angle is the angle of the excavator 100 when tilted about the z-axis. In the present embodiment, the pitch angle and the roll angle are referred to as the posture angle of the excavator 100. In the present embodiment, the sensor control apparatus 24 obtains the angular velocity and acceleration of the excavator 100 detected by the IMU 29, through the in-vehicle signal line 42. The sensor control apparatus 24 finds a posture angle from the obtained angular velocity and acceleration of the excavator 100. In the following, the posture angle is represented using the symbol $\theta$, as appropriate.

Figure 16:
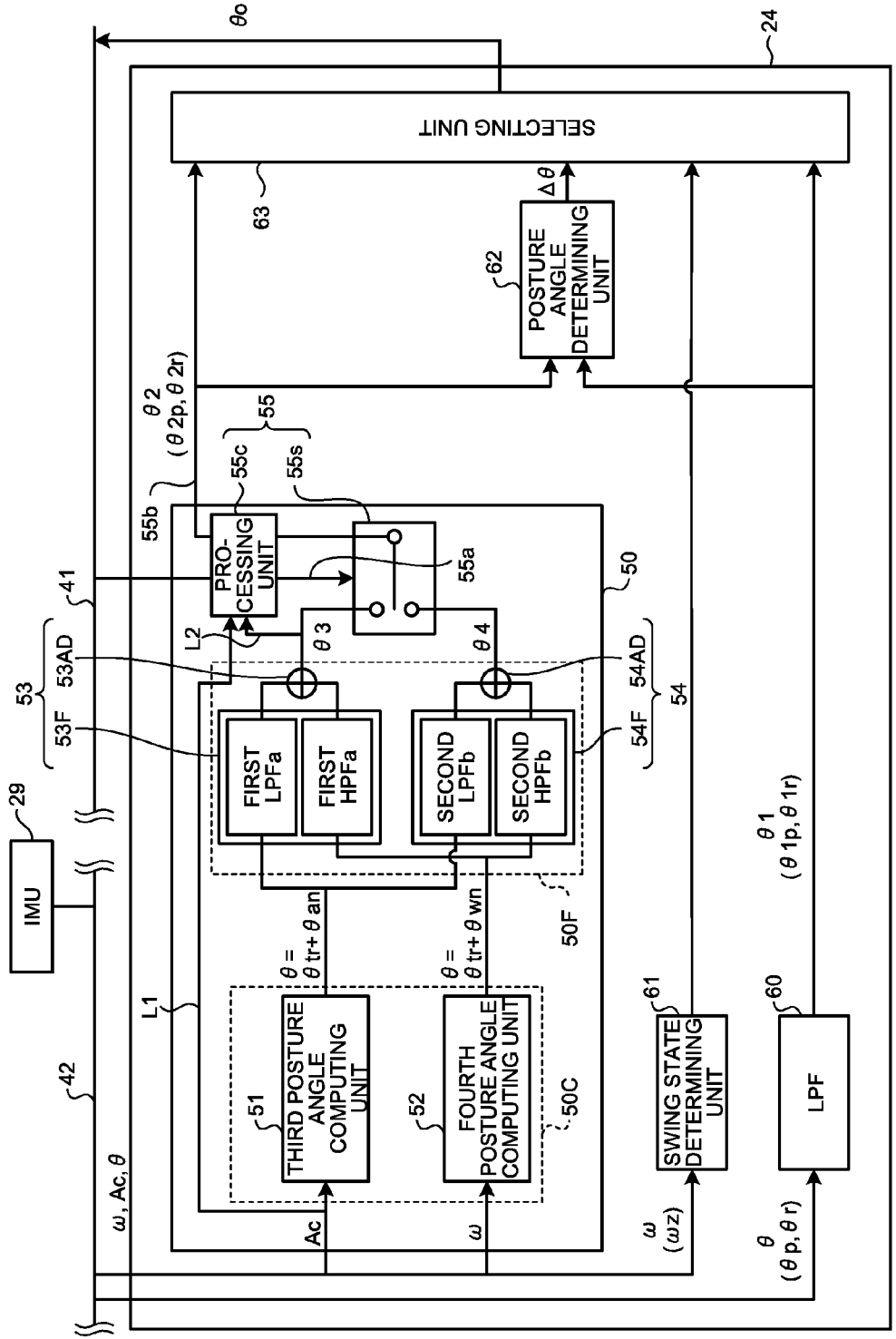
FIG. 16 is a control block diagram of a sensor control apparatus.
Figure 17:
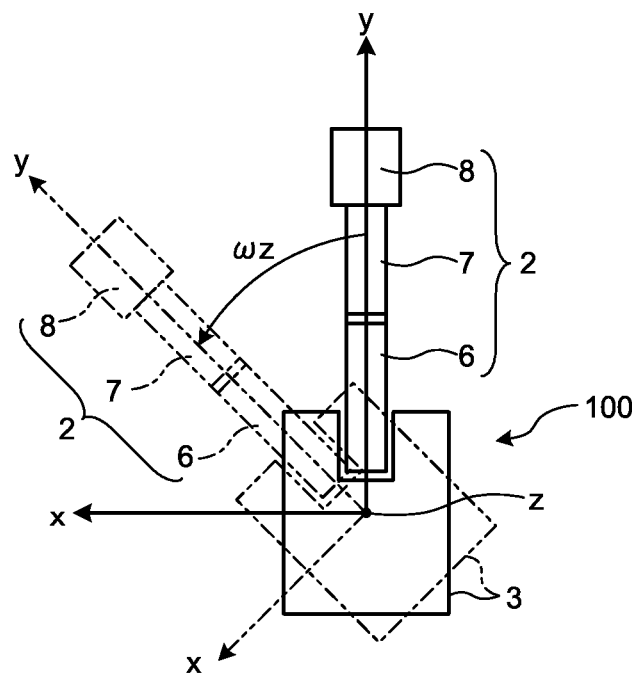
FIG. 17 is a diagram for describing the swing speed of an upper swing body.

FIG. 16 is a control block diagram of the sensor control apparatus 24. FIG. 17 is a diagram for describing the swing speed of the upper swing body 3. In the present embodiment, the posture angle computing unit 29CP of the IMU 29 illustrated in FIG. 15 functions as a first posture angle computing unit that finds a posture angle $\theta$ of the work machine from angular velocity $\omega$ and acceleration Ac which are detected by the gyro 29V and the acceleration sensor 29A serving as detection apparatuses, and outputs the posture angle $\theta$ to a low-pass filter 60. A second posture angle computing unit 50 finds and outputs a second posture angle $\theta 2$. The second posture angle $\theta 2$ outputted from the second posture angle computing unit 50 is inputted to a selecting unit 63 without passing through the low-pass filter 60. The details of the second posture angle computing unit 50 will be described later.

The detected values of the IMU 29 are inputted to the sensor control apparatus 24 through the in-vehicle signal line 42. Angular velocity $\omega$, acceleration Ac, and a posture angle $\theta$ are inputted to the sensor control apparatus 24 from the IMU 29. The sensor control apparatus 24 includes the second posture angle computing unit 50, the low-pass filter 60, and the selecting unit 63. In addition to them, the sensor control apparatus 24 includes a swing state determining unit 61 and a posture angle determining unit 62.

The low-pass filter 60 serving as a first filter allows the posture angle $\theta$ inputted from the IMU 29 to pass therethrough, and outputs the posture angle $\theta$ as a first posture angle $\theta 1$. In the present embodiment, as the posture angle $\theta$, a pitch angle $\theta p$ and a roll angle $\theta r$ are inputted to the low-pass filter 60, and as the first posture angle $\theta 1$, a first pitch angle $\theta 1p$ and a first roll angle $\theta 1r$ are outputted. The first posture angle $\theta 1$ outputted from the low-pass filter 60 is inputted to the selecting unit 63. By the posture angle θ passing through the low-pass filter 60, the first posture angle θ1 where high-frequency components are removed from the posture angle θ is outputted.

The selecting unit 63 outputs, as a posture angle θo of the excavator 100, the first posture angle θ1 having passed through the low-pass filter 60 or the second posture angle θ2 that does not pass through the low-pass filter 60, in a switching manner based on information about a change in the angle of the excavator 100 illustrated in FIGS. 1 and 2, to the in-vehicle signal line 41. The posture angle θo outputted from the selecting unit 63 is a pitch angle θpo and a roll angle θro.

In the present embodiment, the second posture angle θ2 not passing through the low-pass filter 60 indicates that the second posture angle θ2 is not an angle having passed through the low-pass filter 60 through which the first posture angle θ1 has passed. The second posture angle θ2 may be an angle having passed through a filter other than the low-pass filter 60 through which the first posture angle θ1 has passed, or may be, for example, the posture angle θ from the IMU 29 to be directly inputted to the selecting unit 63.

In the present embodiment, the selecting unit 63 switches as to which one of the first posture angle θ1 and the second posture angle θ2 to output, based on information about a swing of the excavator 100 illustrated in FIG. 1, more specifically, the angular velocity ωz of the upper swing body 3. For example, the selecting unit 63 outputs the first posture angle θ1 when the angular velocity (hereinafter, referred to as the swing speed, as appropriate) ωz is smaller than or equal to a predetermined threshold value, and outputs the second posture angle θ2 when the swing speed ωz exceeds the predetermined threshold value. As illustrated in FIG. 17, the swing speed ωz is angular velocity about the z-axis (central rotation axis) serving as the center of rotation of the upper swing body 3. The z-axis is an axis about which the upper swing body 3 swings in the local coordinate system (x, y, z) of the excavator 100.

The selecting unit 63 may output the first posture angle θ1 and the second posture angle θ2 in a switching manner, based on, for example, a change in the pitch angle of the excavator 100 as information about a change in the angle of the excavator 100. For example, the selecting unit 63 can output the first posture angle θ1 when the amount of change in the pitch angle of the excavator 100 is smaller than or equal to a predetermined threshold value, and can output the second posture angle θ2 when the amount of change in the pitch angle of the excavator 100 exceeds the predetermined threshold value.

The swing state determining unit 61 obtains a swing speed ωz from the IMU 29 through the in-vehicle signal line 42. The swing state determining unit 61 compares the obtained swing speed ωz with a predetermined threshold value, and outputs a first output to the selecting unit 63 when the swing speed ωz is smaller than or equal to the predetermined threshold value, and outputs a second output to the selecting unit 63 when the swing speed ωz exceeds the predetermined threshold value. When the selecting unit 63 obtains the first output, the selecting unit 63 outputs the first posture angle θ1. When the selecting unit 63 obtains the second output, the selecting unit 63 outputs the second posture angle θ2.

The posture angle determining unit 62 determines a difference Δθ between the first posture angle θ1 and the second posture angle θ2, and outputs the difference Δθ to the selecting unit 63. When the difference exceeds a predetermined threshold value, the selecting unit 63 outputs the second posture angle θ2 as the posture angle θo of the excavator 100 to the in-vehicle signal line 41.

(Example of the Second Posture Angle Computing Unit)

The second posture angle computing unit 50 includes an angle computing unit 50C, a filter unit 50F corresponding to a second filter, and a switching unit 55. The angle computing unit 50C includes a third posture angle computing unit 51 and a fourth posture angle computing unit 52. The filter unit 50F includes a first complementary filter 53 and a second complementary filter 54. The third posture angle computing unit 51 and the fourth posture angle computing unit 52 find the posture angles θ of the excavator 100 from the angular velocity ω and acceleration Ac of the excavator 100. In the present embodiment, the third posture angle computing unit 51 finds the posture angle θ from the acceleration Ac of the excavator 100 detected by the IMU 29. More specifically, the third posture angle computing unit 51 finds the posture angle θ from the direction of gravitational acceleration. The fourth posture angle computing unit 52 finds the posture angle θ from the angular velocity ω of the excavator 100 detected by the IMU 29. More specifically, the fourth posture angle computing unit 52 finds the posture angle θ by integrating the angular velocity ω.

The first complementary filter 53 is set with a first cutoff frequency, and reduces noise contained in the posture angles θ found by the third posture angle computing unit 51 and the fourth posture angle computing unit 52, and outputs a third posture angle θ3. The second complementary filter 54 is set with a second cutoff frequency different than the first cutoff frequency, and reduces noise contained in the posture angles θ found by the third posture angle computing unit 51 and the fourth posture angle computing unit 52, and outputs a fourth posture angle θ4. The first complementary filter 53 and the second complementary filter 54 only differ in their cutoff frequencies.

The first complementary filter 53 includes a filter unit 53F and an adding unit 53AD. The filter unit 53F includes a first LPF (Low Pass Filter)a and a first HPF (High Pass Filter)a. The adding unit 53AD adds an output from the first LPFa and an output from the first HPFa and outputs the resulting output. The output from the adding unit 53AD is an output from the first complementary filter 53. The output from the first complementary filter 53 is referred to as a third posture angle θ3, as appropriate.

The second complementary filter 54 includes a filter unit 54F and an adding unit 54AD. The filter unit 54F includes a second LPF (Low Pass Filter)b and a second HPF (High Pass Filter)b. The adding unit 54AD adds an output from the second LPFb and an output from the second HPFb and outputs the resulting output. The output from the adding unit 54AD is an output from the second complementary filter 54. The output from the second complementary filter 54 is referred to as a fourth posture angle θ4.

The switching unit 55 includes a processing unit 55c and a switcher 55s. The switching unit 55 outputs the third posture angle θ3 and the fourth posture angle θ4 in a switching manner, according to the state of the excavator 100. The processing unit 55c of the switching unit 55 determines which one of the third posture angle θ3 and the fourth posture angle θ4 to output, according to the state of the excavator 100, e.g., whether the excavator 100 is moving or static. The determination result of the processing unit 55c is outputted to the switcher 55S through a determination result output line 55a. The switcher 55s outputs, according to the determination result of the processing unit 55c, either one of the third posture angle θ3 and the fourth posture angle θ4 as the second posture angle θ2 found by the second posture angle computing unit 50, to the in-vehicle signal line 41 through a posture angle output line 55b.

Figure 18:
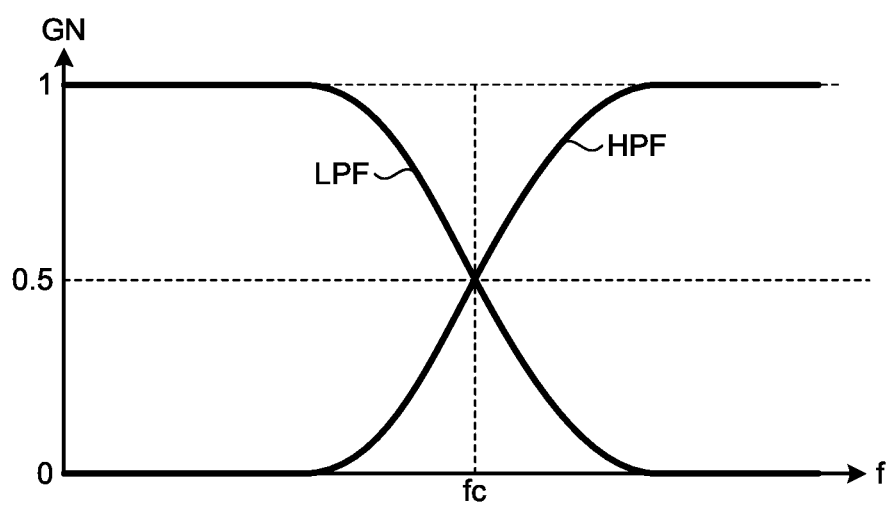
FIG. 18 is a diagram illustrating the characteristics of a complementary filter.

FIG. 18 is a diagram illustrating the characteristics of a complementary filter. The vertical axis in FIG. 18 is gain GN and the horizontal axis is frequency f. Curves (LPF and HPF) in FIG. 18 indicate the frequency characteristics of the complementary filter. The complementary filter includes an LPF (Low Pass Filter) and an HPF (High Pass Filter). As can be seen from FIG. 18, the complementary filter is a filter where the sum of the gain GN of the LPF and the gain GN of the HPF is 1. For example, when a posture angle θ is inputted to the complementary filter, the sum of an output LPF (θ) from the LPF and an output HPF (θ) from the HPF is 1. Namely, LPF (θ)+HPF (θ)=θ. The frequency at which both of the gain GN of the LPF and the gain GN of the HPF are 0.5 is referred to as a cutoff frequency fc. As described above, the first complementary filter 53 and the second complementary filter 54 included in the sensor control apparatus 24 only differ in their cutoff frequencies fc.

The posture angle θ found by the third posture angle computing unit 51 illustrated in FIG. 16 from the direction of gravitational acceleration is found by the sum of a true posture angle θtr and an error θan. The error θan occurs due to, for example, acceleration other than gravitational acceleration, such as impact acceleration. The error θan is noise consisting mainly of high-frequency components. The posture angle θ found by the fourth posture angle computing unit 52 illustrated in FIG. 16 by integrating the angular velocity ω is found by the sum of a true posture angle θtr and an error θwn. The error θwn occurs due to drift accumulated by integration. The error θwn is noise consisting mainly of low-frequency components.

As such, the posture angle θ found by the third posture angle computing unit 51 from the direction of gravitational acceleration contains the error θan consisting mainly of high-frequency components, and thus, is inputted to the first LPFa of the first complementary filter 53 and the second LPFb of the second complementary filter 54. The posture angle θ found by the fourth posture angle computing unit 52 by integrating the angular velocity ω contains the error θwn consisting mainly of low-frequency components, and thus, is inputted to the first HPFa of the first complementary filter 53 and the second HPFb of the second complementary filter 54.

The output from the first LPFa is LPFa (θtr+θan), and the output from the first HPFa is LPFa (θtr+θwn). The output from the second LPFb is LPFb (θtr+θan), and the output from the second HPFb is LPFb (θtr+θwn). All of LPFa (θtr+θan), LPFa (θtr+θwn), LPFb (θtr+θan), and LPFb (θtr+θwn) have linearity. Hence, equation (1) to equation (4) hold.

$$LPFa(\theta tr+\theta an)=LPFa(\theta tr)+LPFa(\theta an) \quad (1)$$

$$HPFa(\theta tr+\theta wn)=HPFa(\theta tr)+HPFa(\theta wn) \quad (2)$$

$$LPFb(\theta tr+\theta an)=LPFb(\theta tr)+LPFb(\theta an) \quad (3)$$

$$HPFb(\theta tr+\theta wn)=HPFb(\theta tr)+HPFb(\theta wn) \quad (4)$$

From the above-described characteristics of the complementary filter, LPFa (θ)+HPFa (θ)=θ and LPFb (θ)+HPFb (θ)=θ hold. In the first complementary filter 53, the outputs from the filter unit 53F, i.e., the output from the first LPFa and the output from the first HPFa, are added by the adding unit 53AD. The output from the adding unit 53AD, i.e., the third posture angle θ3, is θtr+LPFa (θan)+HPFa (θwn). In the second complementary filter 54, the outputs from the filter unit 54F, i.e., the output from the second LPFb and the output from the second HPFb, are added by the adding unit 54AD. The output from the adding unit 54AD, i.e., the fourth posture angle θ4, is θtr+LPFb (θan)+HPFb (θwn).

The error θan consists mainly of high-frequency components and thus is reduced by the first LPFa and the second LPFb. Hence, the values of LPFa (θan) and LPFb (θan) are reduced. The error θwn consists mainly of low-frequency components and thus is reduced by the first HPFa and the second HPFb. Hence, the values of LPFa (θan) and HPFa (θwn) and LPFb (θan) and HPFb (θwn) are reduced. Accordingly, the third posture angle θ3 which is an output from the adding unit 53AD and the fourth posture angle θ4 which is an output from the adding unit 54AD have values close to the true posture angle θtr.

Figure 19:
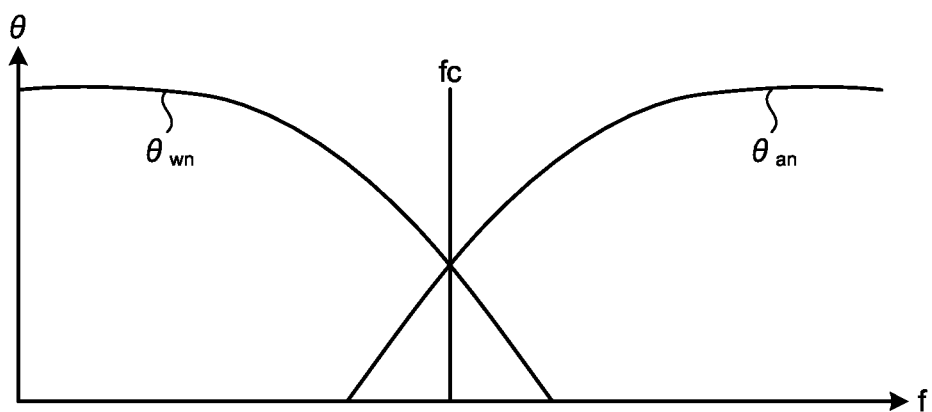
FIG. 19 is a diagram illustrating the frequency characteristics of errors.

FIG. 19 is a diagram illustrating the frequency characteristics of the error θan and the error θwn. The vertical axis in FIG. 19 is the spectrum of the error θan and the error θwn, and the horizontal axis is frequency f. If an IMU 29 with high performance can be used, since the accuracy of angular velocity ω and acceleration Ac detected by the IMU 29 is also high, an error θan of a posture angle θ found by the first posture angle computing unit 51 included in the sensor control apparatus 24 illustrated in FIG. 16 and an error θwn of a posture angle θ found by the second posture angle computing unit 52 are small. In the case of an IMU 29 with low performance, since the accuracy of angular velocity ω and acceleration Ac detected by the IMU 29 is low, an error θan of a posture angle θ found by the third posture angle computing unit 51 included in the second posture angle computing unit 50 illustrated in FIG. 16 and an error θwn of a posture angle θ found by the fourth posture angle computing unit 52 are large. As a result, as illustrated in FIG. 19, the error θwn and the error θan are present in spite of them exceeding the cutoff frequency fc of the complementary filter, and accordingly, overlap each other in a range of predetermined frequencies f including the cutoff frequency fc. The error θwn is present even at a higher frequency than the cutoff frequency fc, and the error θan is present even at a lower frequency than the cutoff frequency fc.

Therefore, in the case of the IMU 29 with low performance, the error θwn and the error θan which are noise cannot be sufficiently removed by one complementary filter, possibly causing a reduction in the accuracy of the posture angle θ. This may influence the accuracy of display of position information of the tooth edges 8T performed by the second display apparatus 39 illustrated in FIG. 2, and the accuracy of work implement control of the excavator 100. Since the IMU 29 with high performance is also high in price, it invites an increase in the manufacturing cost of the excavator 100. That is, to apply the IMU 29 with low performance to the excavator 100, the characteristics illustrated in FIG. 19 need to be considered. Hence, in order that a reduction in the accuracy of the posture angle θ can be suppressed even if an IMU 29 with relatively low performance is used, the second posture angle computing unit 50 uses the first complementary filter 53 and the second complementary filter 54 that have different cutoff frequencies fc.

Figure 20:
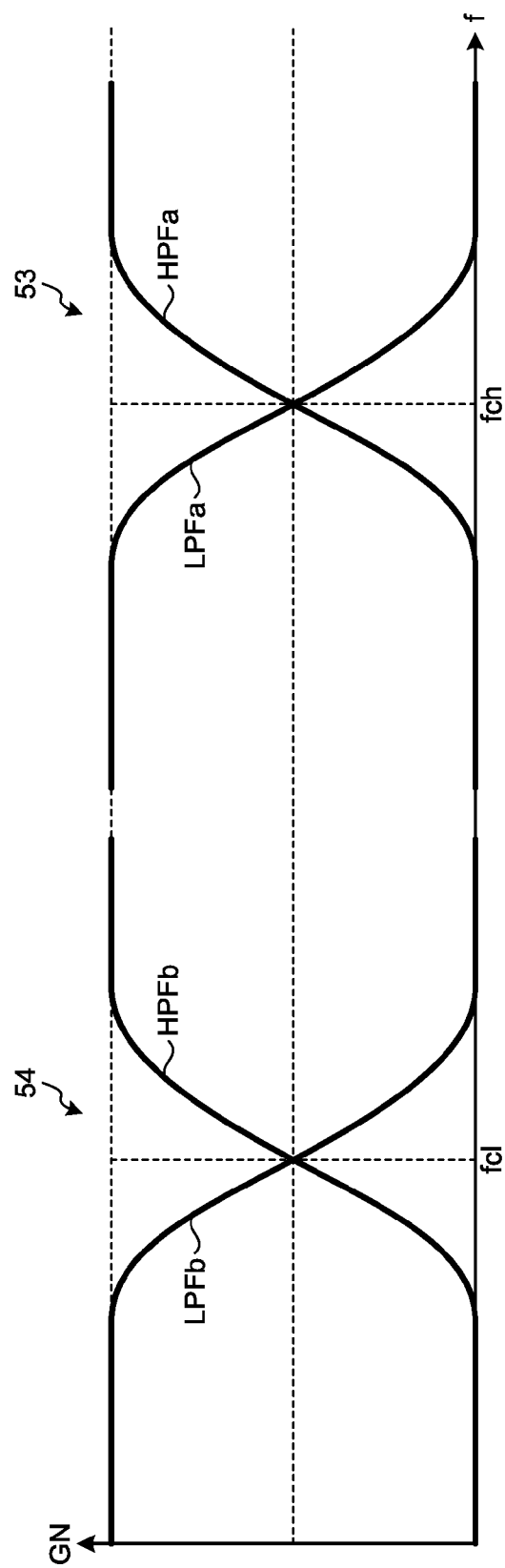
FIG. 20 is a diagram illustrating the relationship between the gain of a first complementary filter and the gain of a second complementary filter, and frequency.

FIG. 20 is a diagram illustrating the relationship between the gain GN of the first complementary filter 53 and the gain GN of the second complementary filter 54, and frequency f. The vertical axis in FIG. 20 is gain GN and the horizontal axis is frequency f. A frequency fch is the first cutoff frequency of the first complementary filter 53, and a frequency fcl is the second cutoff frequency of the second complementary filter 54. In the present embodiment, the first cutoff frequency fch is higher than the second cutoff frequency fcl. Namely, the second cutoff frequency fcl is lower than the first cutoff frequency fch.

The first cutoff frequency fch of the first complementary filter 53 is set to a frequency at which the integral error of angular velocity ω, i.e., the error θwn, can be sufficiently reduced. The second cutoff frequency fcl of the second complementary filter 54 is set to a frequency at which the error θan due to acceleration other than gravitational acceleration can be sufficiently reduced.

Although the first complementary filter 53 can effectively reduce the error θwn due to the integration of the angular velocity ω by the first HPFa, it is difficult to effectively reduce the error θan resulting from acceleration other than gravitational acceleration. Hence, the first complementary filter 53 can accurately find the posture angle θ when the excavator 100 is in a static state or a state close to a static state, i.e., in a state in which the excavator 100 is considered to be static (referred to as a quasi-static state, as appropriate), but when the excavator 100 is in a dynamic state which is not a quasi-static state, the accuracy of the posture angle θ is reduced. In the present embodiment, the dynamic state is a state in which the excavator 100 is considered to be moving.

Although the second complementary filter 54 can effectively reduce the error θan due to acceleration other than gravitation acceleration by the second LPFa, it is difficult to effectively reduce the error θwn due to the integration of the angular velocity ω. Hence, the second complementary filter 54 can accurately find the posture angle θ when the excavator 100 is in a dynamic state, but when the excavator 100 is in a quasi-static state, the accuracy of the posture angle θ is reduced compared to the posture angle θ calculated by the first complementary filter 53. Namely, the second complementary filter 54 is excellent in short-period dynamic characteristics, but in the quasi-static state, as in the dynamic state, the error θwn due to the integration of angular velocity ω is present.

The switching unit 55 included in the second posture angle computing unit 50 illustrated in FIG. 16 outputs the third posture angle θ3 and the fourth posture angle θ4 in a switching manner, according to whether the state of the excavator 100 is in a quasi-static state or a dynamic state. For example, when the excavator 100 is in a quasi-static state, the switching unit 55 outputs, as the second posture angle θ2, the third posture angle θ3 outputted from the first complementary filter 53, to the in-vehicle signal line 41. When the excavator 100 is in a dynamic state, the switching unit 55 outputs, as the second posture angle θ2, the fourth posture angle θ4 outputted from the second complementary filter 54, to the in-vehicle signal line 41.

As such, when the excavator 100 is in a quasi-static state, the second posture angle computing unit 50 uses the third posture angle θ3 outputted from the first complementary filter 53, as the second posture angle θ2. Thus, in the quasi-static state, a reduction in the accuracy of the second posture angle θ2 can be suppressed. When the excavator 100 is in a dynamic state, the second posture angle computing unit 50 uses the fourth posture angle θ4 outputted from the second complementary filter 54, as the second posture angle θ2. Thus, in the dynamic state, too, a reduction in the accuracy of the second posture angle θ2 can be suppressed. As a result, in both of the quasi-static state and dynamic state of the excavator 100, the second posture angle computing unit 50 can suppress a reduction in the accuracy of the second posture angle θ2.

When the excavator 100 is moving, the fourth posture angle θ4 outputted from the second complementary filter 54 is used to, for example, determine the position of the tooth edges 8T of the bucket 8 illustrated in FIG. 1. In addition, when the excavator 100 is static, the position of the tooth edges 8T of the bucket 8 is determined using the third posture angle θ3 outputted from the first complementary filter 53. Hence, a reduction in accuracy when the second display apparatus 39 illustrated in FIG. 2 determines the position of the work implement 2 represented by the position of the tooth edges 8T of the bucket 8, the position of the vehicle main body 1 of the excavator 100, or the like, is suppressed.

The processing unit 55c of the switching unit 55 determines whether it is a quasi-static state or a dynamic state, using, for example, the following condition A and condition B, and controls the switcher 55s based on the determination result.

Condition A: the standard deviation of the third posture angle θ3 is smaller than a preset threshold value during a predetermined period prior to making a switching determination.

Condition B: the magnitude of acceleration other than gravitational acceleration is smaller than a preset threshold value.

The third posture angle θ3 is found from angular velocity ω or acceleration Ac detected by the IMU 29, and acceleration including gravitational acceleration is detected by the IMU 29. Namely, the processing unit 55c determines whether it is a quasi-static state or a dynamic state, based on the state of the IMU 29 included in the excavator 100.

The above-described condition B will be described. As described above, the IMU 29 detects acceleration including at least gravitational acceleration, and outputs the detected acceleration without distinguishing between the types of the detected acceleration. Gravitational acceleration is known. Hence, the processing unit 55c computes acceleration in the x-axis direction or the y-axis direction from the acceleration outputted from the IMU 29. The processing unit 55c can find the magnitude of acceleration other than gravitational acceleration by subtracting gravitational acceleration corresponding to gravitational acceleration in the x-axis direction from the obtained acceleration in the x-axis direction. The processing unit 55c compares the magnitude of the acceleration other than gravitational acceleration with a preset threshold value. Note that the processing unit 55c may determine whether condition B holds by finding the magnitude of acceleration other than gravitational acceleration by subtracting gravitational acceleration corresponding to gravitational acceleration in the y-axis direction from the obtained acceleration in the y-axis direction, and then comparing the magnitude of the acceleration other than gravitational acceleration with a preset threshold value.

The processing unit 55c obtains the acceleration Ac obtained from the IMU 29 and the third posture angle θ3 which is an output from the first complementary filter 53, and determines whether condition A and condition B simultaneously hold. When both of condition A and condition B hold, it can be considered that it is a quasi-static state, i.e., the excavator 100 is static. In this case, the processing unit 55c allows the switcher 55s to operate such that the switcher 55s is connected to the adding unit 53AD of the first complementary filter 53. The switcher 55s outputs, as the second posture angle θ2, the third posture angle θ3 outputted from the first complementary filter 53, to the in-vehicle signal line 41.

The processing unit 55C obtains the acceleration Ac obtained from the IMU 29 and the third posture angle θ3 which is an output from the first complementary filter 53, through an acceleration transmitting line L1 or a first posture angle transmitting line L2 illustrated in FIG. 16, and determines whether condition A and condition B simultaneously hold. When both of condition A and condition B hold, it can be considered that it is a quasi-static state. In the present embodiment, the quasi-static state is a state in which the excavator 100 is completely static without performing traveling, a swing of the upper swing body 3, or the operation of the work implement 2, or a state in which only the work implement 2 is operating without performing traveling or a swing of the upper swing body 3 of the excavator 100. In this case, the processing unit 55c allows the switcher 55s to operate such that the switcher 55S is connected to the adding unit 53AD of the first complementary filter 53. The switcher 55s outputs, as the second posture angle θ2, the third posture angle θ3 outputted from the first complementary filter 53, to the in-vehicle signal line 41.

When condition A and condition B do not hold, i.e., when at least one of condition A and condition B does not hold, it can be considered that it is a dynamic state, i.e., the excavator 100 is moving. In this case, the processing unit 55c allows the switcher 55s to operate such that the switcher 55s is connected to the adding unit 54AD of the second complementary filter 54. The switcher 55s outputs, as the second posture angle θ2, the fourth posture angle θ4 outputted from the second complementary filter 54, to the in-vehicle signal line 41. By the switching unit 55 switching between the third posture angle θ3 and the fourth posture angle θ4 using condition A and condition B, the above-described switching can be implemented only by the detected values of the IMU 29.

In the present embodiment, the predetermined period in condition A is set to, for example, one second, but is not limited thereto. The threshold value with which the standard deviation is compared in condition A is not limited, but can be set to, for example, 0.1 degrees. Condition B holds when acceleration other than gravitational acceleration is smaller than the preset threshold value, and does not hold when acceleration other than gravitational acceleration that is greater than or equal to the preset threshold value is detected. The threshold value in condition B is not limited, but can be set, for example, in a range of a factor of 0.1 or more of gravitational acceleration, as appropriate.

Figure 21:
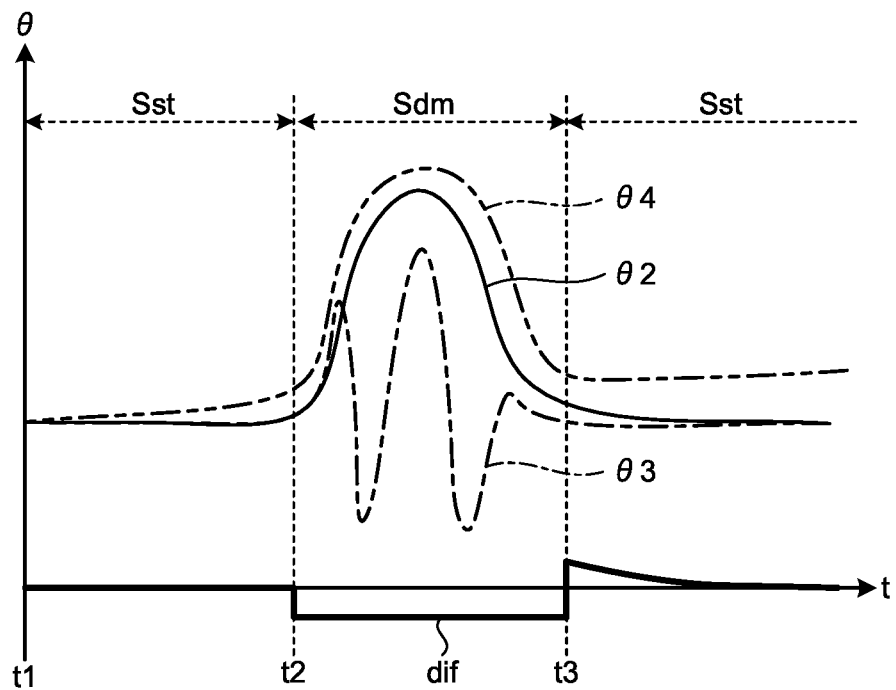
FIG. 21 is a diagram illustrating an example of changes over time of a second posture angle, a third posture angle, and a fourth posture angle which are outputted from a switching unit of a second posture angle computing unit.

FIG. 21 is a diagram illustrating an example of changes over time of the second posture angle θ2, the third posture angle θ3, and the fourth posture angle θ4 which are outputted from the switching unit 55 of the second posture angle computing unit 50. The vertical axis in FIG. 21 is posture angle θ and the horizontal axis is time t. A zone indicated by Sst in FIG. 21 is a quasi-static state, and the third posture angle θ3 is outputted as the second posture angle θ2. A zone indicated by Sdm in FIG. 21 is a dynamic state, and the fourth posture angle θ4 is outputted as the second posture angle θ2. In the example illustrated in FIG. 21, the period from time t1 to time t2 and the period after time t3 are a quasi-static state Sst, and the period from time t2 to time t3 is a dynamic state Sdm.

The second posture angle θ2 is switched from the third posture angle θ3 to the fourth posture angle θ4 at time t2, and is switched from the fourth posture angle θ4 to the third posture angle θ3 at time t3. In the fourth posture angle θ4, an error θwn due to the integration of angular velocity ω is accumulated. Thus, at time t2, the third posture angle θ3 and the fourth posture angle θ4 have different values. Likewise, at time t3, the fourth posture angle θ4 and the third posture angle θ3 have different values.

When the switching unit 55 switches the second posture angle θ2 outputted from the second posture angle computing unit 50, from the third posture angle θ3 to the fourth posture angle θ4 or from the fourth posture angle θ4 to the third posture angle θ3, if the switching is performed as they are, the second posture angle θ2 may become discontinuous at the switching. In addition, as described above, in the fourth posture angle θ4, an error Own due to the integration of angular velocity ω is accumulated. Thus, when the fourth posture angle θ4 is used as the second posture angle θ2, there is a need to reduce the error θwn due to the integration.

To reduce the discontinuity of the second posture angle θ2 occurring at the switching of the second posture angle θ2, and the error θwn due to the integration, in the present embodiment, the processing unit 55c of the switching unit 55 finds the second posture angle θ2 using equation (5) to equation (10), and outputs the second posture angle θ2.

$$\theta 2 = \theta 3 + \text{dif} \tag{5}$$

$$\theta 2 = \theta 4 + \text{dif} \tag{6}$$

$$\text{dif} = Ftr \times \text{dif\_prev} \tag{7}$$

$$\text{dif} = \text{dif\_prev} \tag{8}$$

$$\text{dif} = \text{dif\_prev} + \theta 3 - \theta 4 \tag{9}$$

$$\text{dif} = \text{dif\_prev} + \theta 4 - \theta 3 \tag{10}$$

Equation (5) is used when the second posture angle θ2 is found in a quasi-static state, and equation (6) is used when the second posture angle θ2 is found in a dynamic state. dif in equation (5) and equation (6) is the relaxation term. The relaxation term dif in equation (7) is used for a quasi-static state, and the relaxation term dif in equation (8) is used for a dynamic state. Ftr in equation (7) is the relaxation coefficient. The relaxation coefficient Ftr is greater than 0 and smaller than 1 (0<Ftr<1). The relaxation term dif in equation (9) is used at the timing of a transition from a quasi-static state to a dynamic state. The relaxation term dif in equation (10) is used at the timing of a transition from a dynamic state to a quasi-static state. dif_prev in equation (8) to equation (10) is the relaxation term dif for an immediately previous state of the IMU 29 (quasi-static state Sst or dynamic state Sdm). The initial value of dif_prev is 0.

As illustrated in FIG. 21, the third posture angle θ3 maintains high accuracy in the quasi-static state Sst, but has a large error in the dynamic state Sdm. The fourth posture angle θ4 has an error due to integral accumulation in both of the quasi-static state Sst and the dynamic state Sdm. Since the initial value of dif_prev is 0, the relaxation term dif=0 in the quasi-static state Sst from time t1 to time t2. As a result, from equation (5), the second posture angle θ2 in the quasi-static state Sst is the third posture angle θ3.

When the state is switched from the quasi-static state Sst to the dynamic state Sdm, i.e., when time t=t2, the processing unit 55c finds the relaxation term dif using equation (9). As described above, the relaxation term dif for when time t=t2 is 0, and thus, the relaxation term dif is the value of θ3−θ4 which is the difference between the third posture angle θ3 and the fourth posture angle θ4. As illustrated in FIG. 21, the relaxation term dif in this case has a negative value. At time t2, the second posture angle θ2 by equation (5) is θ3, and a value to be entered in the relaxation term dif in equation (6) is the value of θ3−θ4, and thus, the second posture angle θ2 by equation (6) is also θ3. Hence, when the state is switched from the quasi-static state Sst to the dynamic state Sdm, the second posture angle θ2 changes continuously.

In the dynamic state Sdm from time t2 to time t3, the value of the relaxation term dif holds the value of θ3−θ4 which is obtained at the switching, i.e., time t2, as it is. The second posture angle θ2 in the dynamic state Sdm is found from equation (6) by adding the relaxation term dif=θ3−θ4 which is obtained and held at time t2, to the fourth posture angle θ4 in the dynamic state Sdm. From equation (8), the relaxation term dif used at this time is dif_prev. Thus, the relaxation term dif used in the dynamic state Sdm uses the value of the relaxation term dif=θ3−θ4 which is obtained and held at time t2. As such, after switching the third posture angle θ3 to the fourth posture angle θ4, the processing unit 55c of the switching unit 55 corrects the found fourth posture angle θ4 using, as a correction value, a value at the switching obtained by subtracting the fourth posture angle θ4 from the third posture angle θ3, i.e., the relaxation term dif obtained at the switching, and thereby obtains the second posture angle θ2. By doing so, the influence exerted on the second posture angle θ2 by the error θwn due to the integral accumulation of the fourth posture angle θ4 which has occurred before switching to the dynamic state Sdm can be reduced.

When the state is switched to the quasi-static state Sst again from the dynamic state Sdm, i.e., at time t3, the processing unit 55c finds the relaxation term dif using equation (10). dif_prev in equation (10) is the relaxation term dif which is already obtained and held. That is, dif_prev in equation (10) is the relaxation term dif at time t2, i.e., the value of θ3−θ4 at time t2. From equation (10), the relaxation term dif at time t3 is a value obtained by adding the value of θ3−θ4 which is obtained and held at time t2 to the value of θ2−θ1 which is obtained at time t3. By using equation (10), when the state is switched from the dynamic state Sdm to the quasi-static state Sst, the second posture angle θ2 changes continuously.

In the quasi-static state Sst after time t3, the processing unit 55c finds the second posture angle θ2 using equation (5). The relaxation term dif at this time is determined by equation (7). dif_prev in equation (7) is the relaxation term dif at timing at which the state is switched to the quasi-static state Sst again from the dynamic state Sdm, i.e., at time t3. In the quasi-static state Sst after time t3, due to the effect of the relaxation coefficient Ftr, the value of the relaxation term dif gradually decreases, converging to 0. Namely, in the quasi-static state Sst after time t3, the second posture angle θ2 converges to the third posture angle θ3. As such, after switching the fourth posture angle θ4 to the third posture angle θ3, the processing unit 55c of the switching unit 55 corrects the third posture angle θ3 using, as a correction value, a value obtained by multiplying an error of the fourth posture angle θ4 obtained at the switching, i.e., the relaxation term dif obtained at the switching, by the relaxation coefficient Ftr which is a coefficient larger than 0 and smaller than 1. By doing so, after switching the state from the dynamic state Sdm to the quasi-static state Sst, the second posture angle θ2 changes continuously.

(Example of the Process of Finding the Second Posture Angle θ2)

Figure 22:
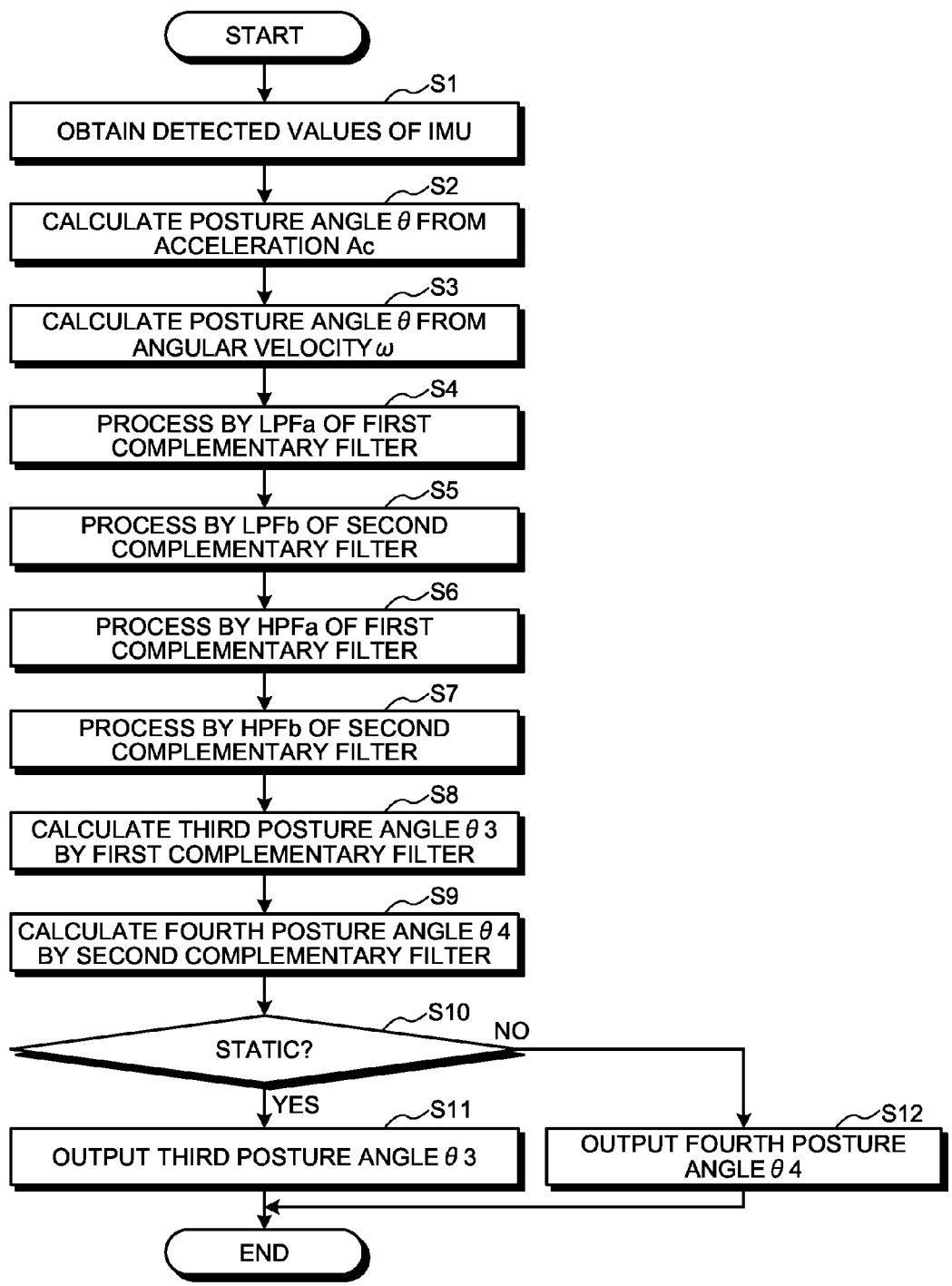
FIG. 22 is a flowchart illustrating an example of the process of finding the second posture angle.

FIG. 22 is a flowchart illustrating an example of the process of finding the second posture angle θ2. In finding the second posture angle θ2, at step S1, the second posture angle computing unit 50 illustrated in FIG. 16 obtains, through the in-vehicle signal line 42, the detected values of angular velocity ω and acceleration Ac obtained by the IMU 29. At step S2, the third posture angle computing unit 51 illustrated in FIG. 16 finds a posture angle θ from the acceleration Ac detected by the IMU 29. At step S3, the fourth posture angle computing unit 52 illustrated in FIG. 16 finds a posture angle θ from the angular velocity ω detected by the IMU 29. The order of step S2 and step S3 may be any.

At step S4, the first LPFa of the first complementary filter 53 illustrated in FIG. 16 performs a filtering process on the posture angle θ obtained from the acceleration Ac. At step S5, the second LPFb of the second complementary filter 54 illustrated in FIG. 16 performs a filtering process on the posture angle θ obtained from the acceleration Ac. At step S6, the first HPFa of the first complementary filter 53 illustrated in FIG. 16 performs a filtering process on the posture angle θ obtained from the angular velocity ω. At step S7, the second HPFb of the second complementary filter 54 illustrated in FIG. 16 performs a filtering process on the posture angle θ obtained from the angular velocity ω. The order of step S4, step S5, step S6, and step S7 may be any.

Then, processing proceeds to step S8, and the first complementary filter 53 finds a third posture angle θ3. Specifically, the third posture angle θ3 is found by the adding unit 53AD adding an output from the first LPFa to an output from the first HPFa. At step S9, the second complementary filter 54 finds a fourth posture angle θ4. Specifically, the fourth posture angle θ4 is found by the adding unit 54AD adding an output from the second LPFb to an output from the second HPFb. The order of step S8 and step S9 may be any.

Processing proceeds to step S10, and if the excavator 100 is in a quasi-static state (Yes at step S10), the processing unit 55c of the switching unit 55 illustrated in FIG. 16 moves the process to step S11. At step S11, the processing unit 55c controls the switcher 55s such that the second posture angle computing unit 50 outputs the third posture angle θ3 as the second posture angle θ2. If the excavator 100 is in a dynamic state (No at step S10), at step S12, the processing unit 55c controls the switcher 55s such that the second posture angle computing unit 50 outputs the fourth posture angle θ4 as the second posture angle θ2.

(Variant of the Determination as to Whether it is a Quasi-Static State or a Dynamic State)

In the present embodiment, the processing unit 55c of the switching unit 55 illustrated in FIG. 16 outputs, as the second posture angle θ2, the third posture angle θ3 or the fourth posture angle θ4 in a switching manner, based on the detected values of the IMU 29 illustrated in FIG. 15. The selection of the third posture angle θ3 or the fourth posture angle θ4 is not limited thereto, and the processing unit 55c may switch between the third posture angle θ3 and the fourth posture angle θ4 using, for example, information about the operation of the excavator 100 (hereinafter, referred to as operation information, as appropriate).

In the present embodiment, the operation information is information about the occurrence of some kind of movement in the excavator 100. For example, the operation information is information as to whether the upper swing body 3 illustrated in FIG. 1A is swinging, information as to whether the traveling apparatus 5 is operating, or information as to whether the work implement 2 is operating. The operation information uses, for example, a detected value outputted from a sensor that detects a swing of the upper swing body 3, a detected value outputted from an angle detector or a rotation sensor by providing a swing angle sensor such as a resolver to a swing motor for allowing the upper swing body 3 to swing, or a detected value outputted from an oil pressure sensor that detects pilot pressure generated by the operating apparatus 30 illustrated in FIG. 2. Namely, the operation information may be, for example, information as to whether the upper swing body 3, the work implement 2, or the like, is actually operating or information on an operation performed on an operating member for allowing the upper swing body 3, the work implement 2, or the like, to operate.

Figures 23, 24:
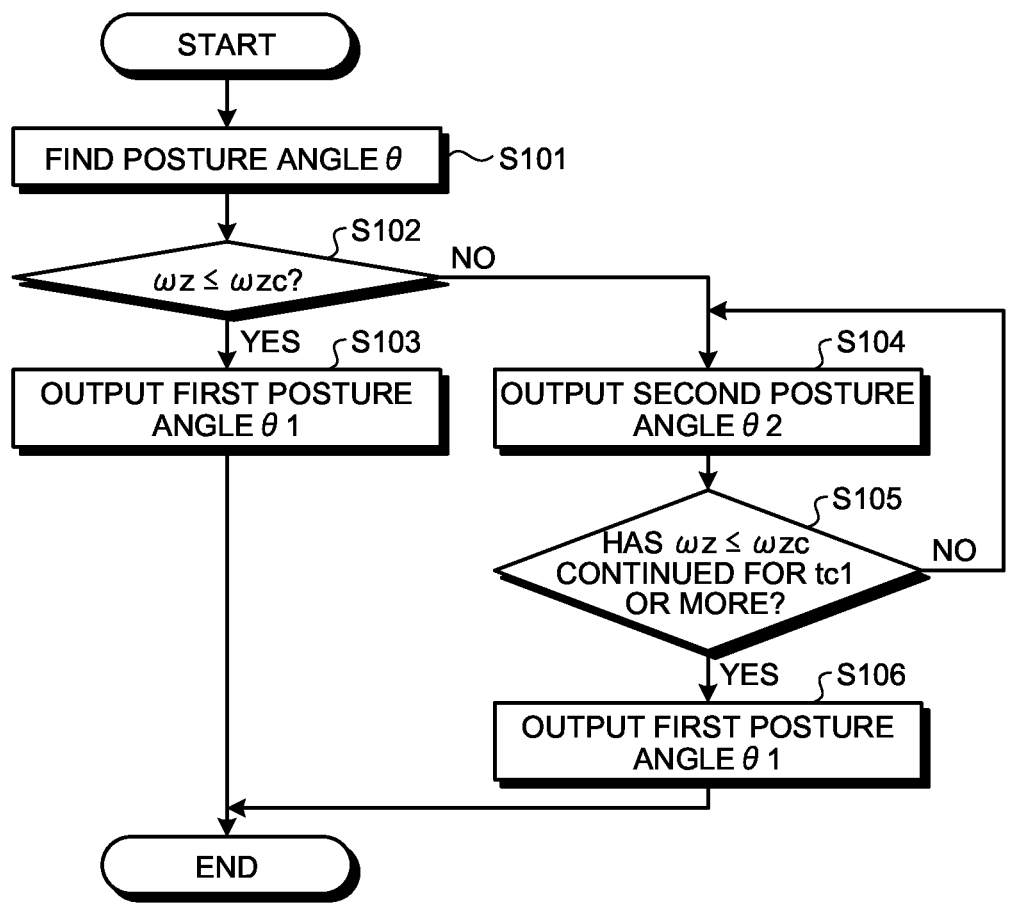
FIG. 23 is a diagram illustrating an example of a table used to switch between the third posture angle and the fourth posture angle in a variant of the present embodiment.
FIG. 24 is a flowchart illustrating a processing procedure of a first example of a posture angle calculation method according to the present embodiment.

FIG. 23 is a diagram illustrating an example of a table TB used to switch between the third posture angle θ3 and the fourth posture angle θ4 in a variant of the present embodiment. In the present variant, the processing unit 55c of the switching unit 55 switches between the third posture angle θ3 and the fourth posture angle θ4, based on a determination made based on the detected values of the IMU 29 as to whether it is a quasi-static state or a dynamic state, and a determination as to whether the upper swing body 3 is swinging. In the table TB, posture angles to be outputted as the second posture angle θ2 are described in relation to the state of the upper swing body 3, and condition A and condition B based on the detected values of the IMU 29. The state of the upper swing body 3 is indicated by ON or OFF. When the state is ON, the upper swing body 3 is swinging. When the state is OFF, the upper swing body 3 is stopped. Condition A and condition B are indicated by A & B or NOT (A & B). A & B indicates a quasi-static state, and NOT (A & B) indicates a dynamic state.

It is assumed that the determination result obtained based on the detected values of the IMU 29 is a quasi-static state and the upper swing body 3 is swinging (ON) which is determined from the operation information. In this case, the switching unit 55 outputs the fourth posture angle θ4 as the second posture angle θ2. Since the upper swing body 3 is actually moving, by using the fourth posture angle θ4 as the second posture angle θ2, the accuracy of the second posture angle θ2 can be ensured.

It is assumed that the determination result obtained based on the detected values of the IMU 29 is a quasi-static state and the upper swing body 3 is stopped (OFF) which is determined from the operation information. In this case, the switching unit 55 outputs the third posture angle θ3 as the second posture angle θ2. Since it is the quasi-static state and the upper swing body 3 is actually stopped, by using the third posture angle θ3 as the second posture angle θ2, an error due to the integration of angular velocity ω can be reduced.

It is assumed that the determination result obtained based on the detected values of the IMU 29 is a dynamic state and the upper swing body 3 is swinging (ON) which is determined from the operation information. In this case, the switching unit 55 outputs the fourth posture angle θ4 as the second posture angle θ2. Since it is the dynamic state and the upper swing body 3 is actually moving, by using the fourth posture angle θ4 as the second posture angle θ2, the accuracy of the second posture angle θ2 can be ensured.

It is assumed that the determination result obtained based on the detected values of the IMU 29 is a dynamic state and the upper swing body 3 is stopped (OFF) which is determined from the operation information. In this case, the switching unit 55 may output either the third posture angle θ3 or the fourth posture angle θ4 as the second posture angle θ2, but outputs the fourth posture angle θ4 in the present variant.

In the present variant, the switching unit 55 switches between the third posture angle θ3 and the fourth posture angle θ4, based on a determination made based on the detected values of the IMU 29 as to whether it is a quasi-static state or a dynamic state, and a determination as to whether the upper swing body 3 is swinging. By doing so, the switching unit 55 can more accurately determine the state of the excavator 100 and select an appropriate posture angle. In the present variant, the process is not limited to the above-described one, and the switching unit 55 may switch between the third posture angle θ3 and the fourth posture angle θ4, based on a determination as to whether the upper swing body 3 is swinging. For example, when the upper swing body 3 is swinging, the fourth posture angle θ4 may be used as the second posture angle θ2, and when the upper swing body 3 is stopped, the third posture angle θ3 may be used as the second posture angle θ2. Next, a first example of a posture angle calculation method according to the present embodiment will be described.

(First Example of a Posture Angle Calculation Method)

FIG. 24 is a flowchart illustrating a processing procedure of a first example of a posture angle calculation method according to the present embodiment. At step S101, the IMU 29 and the sensor control apparatus 24 illustrated in FIG. 16 find posture angles θ. The low-pass filter 60 of the sensor control apparatus 24 allows the posture angle θ obtained from the IMU 29 to pass therethrough, and outputs the posture angle θ as a first posture angle θ1 to the selecting unit 63. The angle computing unit 50C included in the second posture angle computing unit 50 finds a posture angle θ, and the filter unit 50F allows the posture angle θ to pass therethrough and outputs the posture angle θ as a second posture angle θ2.

At step S102, the swing state determining unit 61 compares a swing speed ωz obtained through the in-vehicle signal line 42 with a predetermined threshold value ωzc. If the swing speed ωz is less than or equal to the predetermined threshold value ωzc (Yes at step S102), the swing state determining unit 61 outputs a first output to the selecting unit 63. In this case, the upper swing body 3 is not swinging, or even if the upper swing body 3 is swinging, the upper swing body 3 is in a state close to a static state. The selecting unit 63 having obtained the first output outputs, at step S103, the first posture angle θ1 as a posture angle θo.

If the swing speed ωz is greater than the predetermined threshold value ωzc (No at step S102), the swing state determining unit 61 outputs a second output to the selecting unit 63. In this case, the upper swing body 3 is in a swinging state. The selecting unit 63 having obtained the second output outputs, at step S104, the second posture angle θ2 as the posture angle θo. Then, processing proceeds to step S105, and the swing state determining unit 61 determines whether the state in which the swing speed ωz is less than or equal to the predetermined threshold value ωzc has continued for time tc1 or more.

If the state in which the swing speed ωz is less than or equal to the predetermined threshold value ωzc has continued for time tc1 or more (Yes at step S105), the swing state determining unit 61 outputs the first output to the selecting unit 63. In this case, it can be determined that the upper swing body 3 is not swinging, or even if the upper swing body 3 is swinging, the upper swing body 3 has gone back to a state close to a static state. Hence, the selecting unit 63 having obtained the first output outputs, at step S106, the first posture angle θ1 as the posture angle θo. If the state in which the swing speed ωz is less than or equal to the predetermined threshold value does not continue for time tc1 or more (No at step S105), the swing state determining unit 61 outputs the second output to the selecting unit 63. In this case, the upper swing body 3 is in a swinging state. The selecting unit 63 having obtained the second output returns to step S104, and outputs the second posture angle θ2 as the posture angle θo.

The second display apparatus 39 determines, for example, the position of the tooth edges 8T of the bucket 8, using the posture angle θo outputted from the sensor control apparatus 24 through the in-vehicle signal line 41 illustrated in FIG. 2. In addition, the work implement control apparatus 25 performs, for example, the above-described excavation control, using the posture angle θo outputted from the sensor control apparatus 24 through the in-vehicle signal line 41 illustrated in FIG. 2.

Since the first posture angle θ1 is an angle obtained by allowing the posture angle θ found by the IMU 29 to pass through the low-pass filter 60, its high-frequency components are reduced. Hence, upon determining the position of the tooth edges 8T by the second display apparatus 39 and the work implement control apparatus 25, very small changes in the position of the tooth edges 8T are suppressed. As a result, in excavation control for when the excavator 100 is static, excavation of an excavation object beyond a target excavation topography 73I can be more securely inhibited.

In addition, during a swing of the upper swing body 3, since the second posture angle θ2 that does not pass through the low-pass filter 60 is used, the responsiveness of the second posture angle θ2 to a change in the posture of the excavator 100 is higher than that of the first posture angle θ1. Hence, a change in posture angle θ according to the movement of the excavator 100, e.g., the movement of the upper swing body 3, is reflected on the second posture angle θ2. Hence, during a swing of the upper swing body 3, a target excavation topography can be calculated such that a change in the position of the tooth edges 8T is reflected. As a result, in excavation control, excavation of an excavation object beyond a target excavation topography 73I can be more securely inhibited. As such, the sensor control apparatus 24 can control the work implement 2 such that excavation of the excavation object beyond the target excavation topography 73I can be inhibited, regardless of the operating state of the excavator 100.

In addition, when the excavator 100 is static, the second display apparatus 39 can display a guidance image where very small changes in the position of the tooth edges 8T are suppressed. As a result, changes in a display target excavation topography 73I and the tooth edges 8T which are displayed in the guidance image are suppressed. Hence, it becomes easier for the operator to operate the work implement 2 in accordance with the guidance image, improving operability and inhibiting over-excavation or under-excavation of the target excavation topography 73I. Furthermore, when the second display apparatus 39 displays a guidance image during a swing of the upper swing body 3, the second display apparatus 39 can display a guidance image where a change in the position of the tooth edges 8T is reflected. As a result, by the operator doing work as he/she views the guidance image, over-excavation or under-excavation of the target excavation topography 73I is inhibited.

(Second Example of a Posture Angle Calculation Method)

Figure 25:
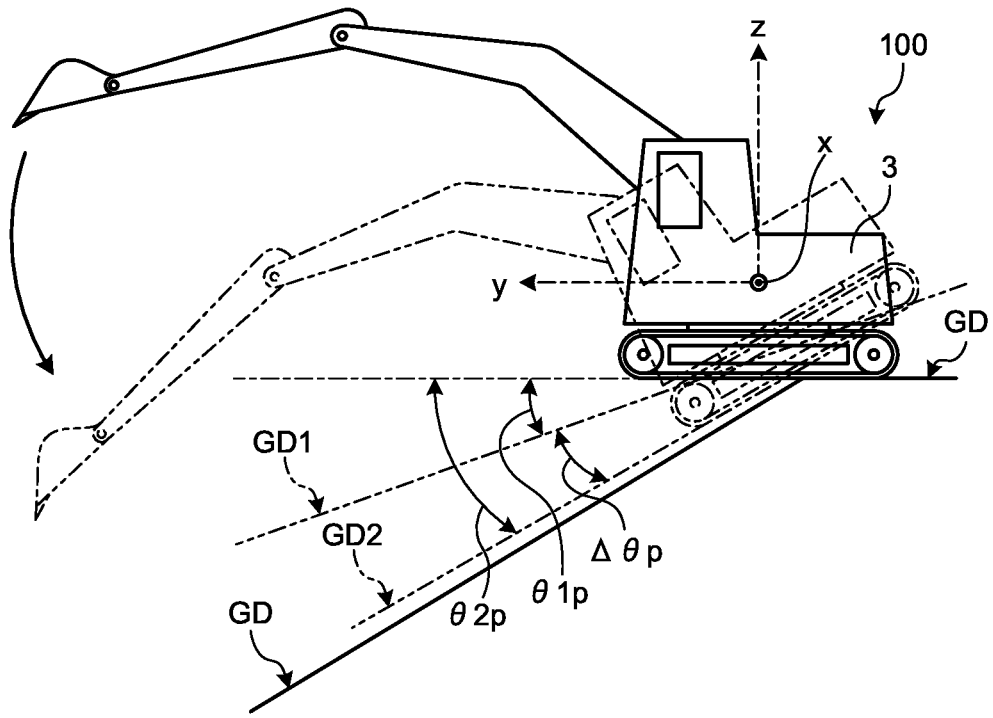
FIG. 25 is a diagram for describing changes in pitch angle.

FIG. 25 is a diagram for describing changes in pitch angle. The pitch angle θp is the angle of the excavator 100 for when tilted about the x-axis in the local coordinate system (x, y, z) of the excavator 100. For example, the pitch angle θp changes by the tilt state of the excavator 100. The posture angle determining unit 62 determines a difference Δθ between a first posture angle θ1 and a second posture angle θ2. A first pitch angle θ1p is used as the first posture angle θ1, and a second pitch angle θ2p as the second posture angle θ2. In the present embodiment, the first pitch angle θ1p having passed through the low-pass filter 60 is an angle formed by ground GD and a tilt GD1. The second pitch angle θ2p obtained from the second posture angle computing unit 50 is an angle formed by the ground GD and a tilt GD2. The difference is Δθp. The posture angle determining unit 62 outputs the determined difference Δθp to the selecting unit 63. When the difference Δθp is greater than or equal to a predetermined threshold value, the selecting unit 63 outputs the second posture angle θ2 as a posture angle θo of the excavator 100 to the in-vehicle signal line 41.

When the difference Δθp is greater than or equal to the predetermined threshold value, the tilt of the excavator 100 about the x-axis has suddenly increased. If, in this case, the first posture angle θ1 is used as the posture angle θo of the excavator 100, the sudden change in the posture of the excavator 100 may not be able to be reflected on the posture angle θo. Hence, when the difference Δθp is greater than or equal to the predetermined threshold value, the selecting unit 63 outputs the second posture angle θ2 as the posture angle θo of the excavator 100 to the in-vehicle signal line 41. By doing so, the sudden change in the posture of the excavator 100 can be reflected on the posture angle θo. Next, a second posture angle calculation method according to the present embodiment will be described.

Figure 26:
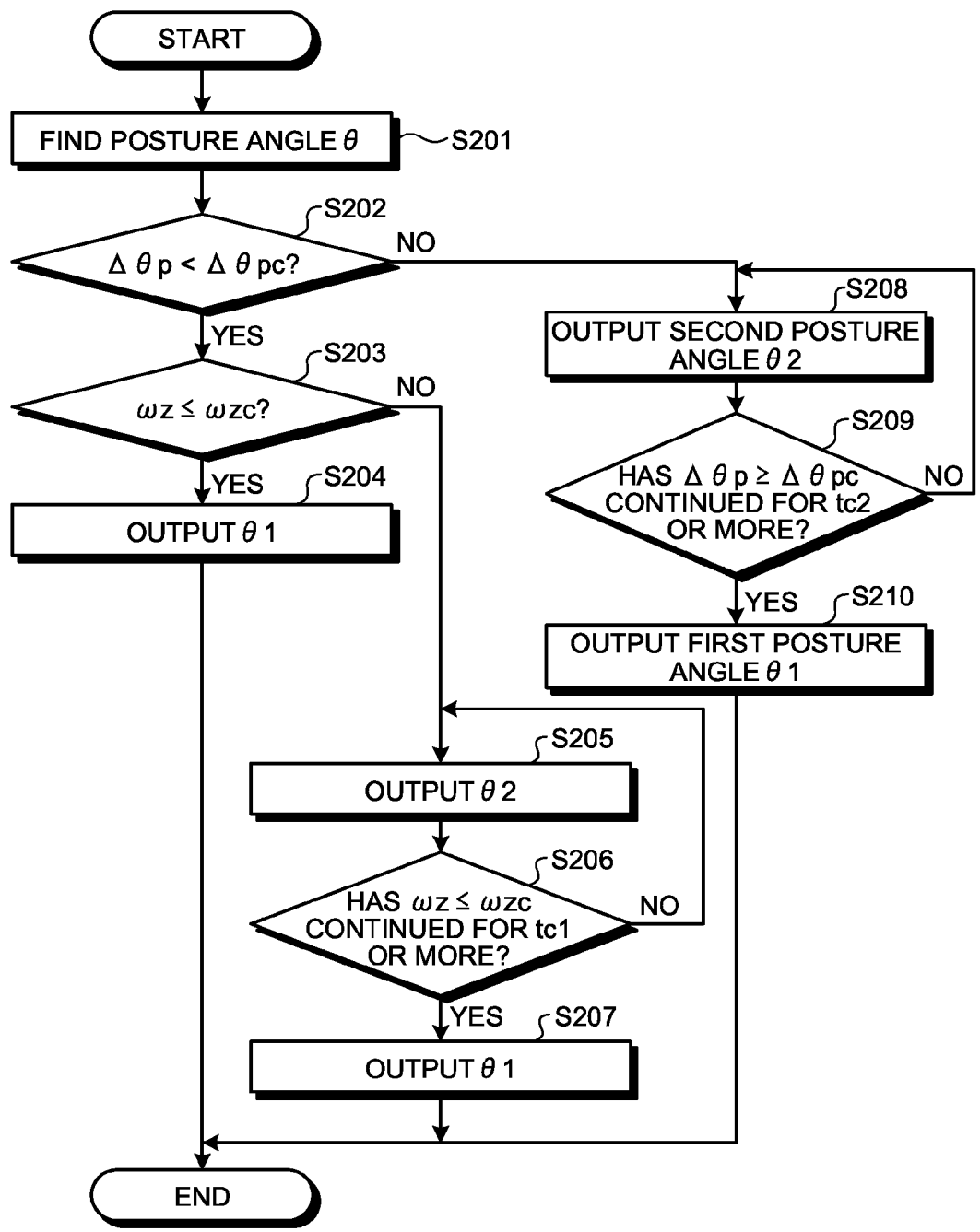
FIG. 26 is a flowchart illustrating a processing procedure of a second posture angle calculation processing method according to the present embodiment.

FIG. 26 is a flowchart illustrating a processing procedure of the second posture angle calculation processing method according to the present embodiment. At step S201, the IMU 29 and the sensor control apparatus 24 illustrated in FIG. 16 find posture angles θ. The low-pass filter 60 of the sensor control apparatus 24 allows the posture angle θ obtained from the IMU 29 to pass therethrough, and outputs the posture angle θ as a first posture angle θ1 to the selecting unit 63. The angle computing unit 50C included in the second posture angle computing unit 50 finds a posture angle θ, and the filter unit 50F allows the posture angle θ to pass therethrough and outputs the posture angle θ as a second posture angle θ2.

At step S202, the posture angle determining unit 62 determines a difference Δθp between a first pitch angle θ1p obtained from the low-pass filter 60 and a second pitch angle θ2p obtained from the second posture angle computing unit 50, and outputs the difference Δθp to the selecting unit 63. If the difference Δθp is smaller than a predetermined threshold value Δθpc (Yes at step S202), the selecting unit 63 performs processes at step S203 to step S207. The processes at step S203 to step S207 are the same as those at step S102 to step S160 in the first example of the posture angle calculation method, and thus, a description thereof is omitted.

If the difference Δθp is greater than or equal to the predetermined threshold value Δθpc (No at step S202), the selecting unit 63 outputs, at step S208, the second posture angle θ2 as a posture angle θo. Then, at step S209, the swing state determining unit 61 determines whether the state in which the difference Δθp is smaller than the predetermined threshold value Δθpc has continued for time tc2 or more. If the state in which the difference Δθp is smaller than the predetermined threshold value Δθpc has continued for time tc2 or more (Yes at step S209), it can be determined that a sudden change in the pitch angle θp of the excavator 100 is in an allowable range. Hence, the selecting unit 63 outputs, at step S210, the first posture angle θ1 as the posture angle θo. If the state in which the difference Δθp is smaller than the predetermined threshold value Δθpc does not continue for time tc2 or more (No at step S209), it can be determined that an unallowable sudden change in the pitch angle θp of the excavator 100 continues. In this case, the selecting unit 63 returns to step S208, and outputs the second posture angle θ2 as the posture angle θo.

For example, when the excavator 100 invades in a direction in which the ground GD where the excavator 100 is grounded is tilted, the pitch angle θp suddenly changes. In such a case, the operator of the excavator 100 attempts to suppress a sudden change in the posture of the excavator 100, by operating the work implement 2 to allow the work implement 2 to be grounded on the ground. Excavation control is control performed to prevent over-excavation of a target excavation topography 73I. However, when the operator suppresses a sudden change in the posture of the excavator 100 by performing an operation such that the work implement 2 significantly goes beyond the target excavation topography, the operator's operation needs to be given priority by canceling excavation control. In this case, the amount of operation of the work implement 2 is larger than that for excavation control.

Since the first posture angle $\theta 1$ is an angle obtained by allowing the posture angle $\theta$ found by the IMU 29 to pass through the low-pass filter 60, its high-frequency components are reduced. Hence, in the present embodiment, when the operator suppresses a sudden change in the posture of the excavator 100 by operating the work implement 2, the second posture angle $\theta 2$ that does not pass through the low-pass filter 60 is used to improve dynamic responsiveness so that the work implement control apparatus 25 can promptly cancel excavation control.

As described above, in the present embodiment, by selecting the first posture angle $\theta 1$ or the second posture angle $\theta 2$, a correct topography can be grasped. In addition, in the present embodiment, switching between the first posture angle $\theta 2$ and the second posture angle $\theta 2$ is performed based on the tilt state of the excavator 100. Specifically, when the difference $\Delta\theta p$ between the first pitch angle $\theta 1p$ and the second pitch angle $\theta 2p$ is greater than or equal to the predetermined threshold value, instead of the first posture angle $\theta 2$, the second posture angle $\theta 2$ is used as the posture angle $\theta o$ of the excavator 100. By doing so, when the posture of the excavator 100 is suddenly changed, since the second posture angle $\theta 2$ whose dynamic responsiveness is closer to true behavior than the first posture angle $\theta 1$ is used, control responsiveness is improved, enabling for the work implement control apparatus 25 to promptly cancel excavation control. Hence, the operator of the excavator 100 can promptly deal with a sudden change in the posture of the excavator 100, by operating the work implement 2.

In addition, in the present embodiment, when the excavator 100 is static, excavation control and display of a guidance image are performed using the first posture angle $\theta 1$ having passed through the low-pass filter 60. During a swing of the upper swing body 3, excavation control and display of a guidance image are performed using the second posture angle $\theta 2$ that does not pass through the low-pass filter 60. Hence, when the excavator 100 is static, a target excavation topography 73I is calculated with very small changes in the position of the tooth edges 8T suppressed. When the upper swing body 3 is swinging, a target excavation topography 73I is calculated such that a change in the position of the tooth edges 8T is reflected. As a result, in both of the case in which the excavator 100 is static and the case in which the upper swing body 3 is swinging, excavation of an excavation object beyond the target excavation topography 73I can be more securely inhibited.

Furthermore, in the present embodiment, the first complementary filter 53 set with the first cutoff frequency, and the second complementary filter 54 set with the second cutoff frequency different than the first cutoff frequency are used. The first complementary filter 53 reduces an error (noise) accumulated by the integration of angular velocity $\omega$, and the second complementary filter 54 reduces an error (noise) due to acceleration due to acceleration other than gravitational acceleration. In the present embodiment, switching between a tilt angle outputted from the first complementary filter 53 and a tilt angle outputted from the second complementary filter 54 is performed according to the state of the excavator 100. As a result, the second posture angle $\theta 2$ is found by an appropriate complementary filter selected according to the state of the excavator 100, and thus, a reduction in the accuracy of the second posture angle $\theta 2$ is suppressed in both of a dynamic state and a quasi-static state.

An IMU 29 with high accuracy is high in price, and a low-priced IMU 29 is relatively low in accuracy. In the present embodiment, even if an IMU 29 with low accuracy is used, a reduction in the accuracy of the second posture angle $\theta 2$ can be suppressed in both of a dynamic state and a quasi-static state. Hence, the manufacturing cost of the excavator 100 can be reduced while a reduction in the accuracy of the second posture angle $\theta 2$ is suppressed.

Although in the present embodiment the first complementary filter 53 and the second complementary filter 54 are used, a third complementary filter set with a third cutoff frequency different than the first cutoff frequency and the second cutoff frequency may be added, or a fourth complementary filter set with a fourth cutoff frequency different than the first cutoff frequency, the second cutoff frequency, and the third cutoff frequency may be added. Namely, the number of complementary filters with different cutoff frequencies is not limited to two.

(Example of a Sensor Control Apparatus Having the Function of Canceling Centrifugal Force)

Figure 27:
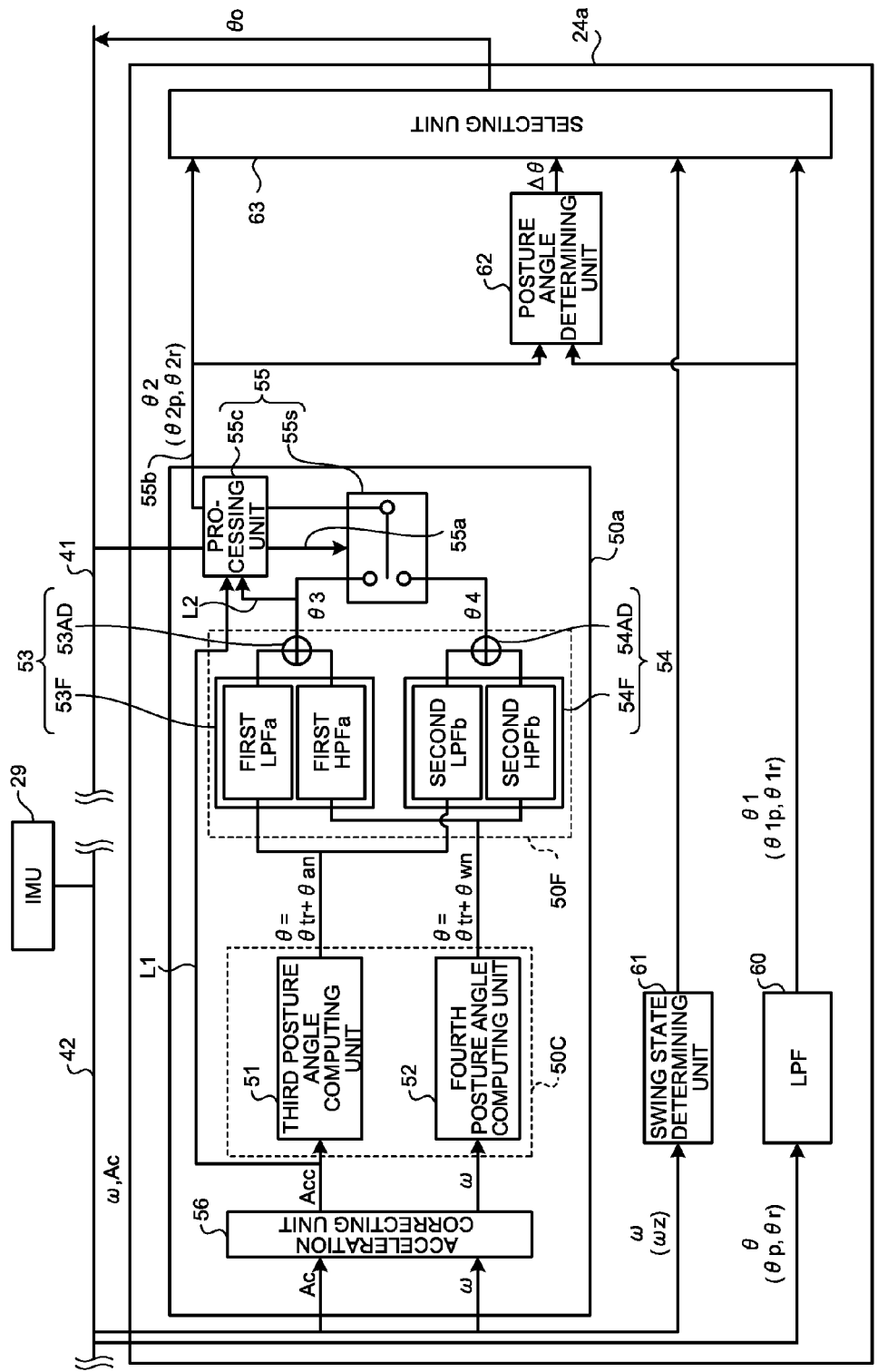
FIG. 27 is a control block diagram of a sensor control apparatus having the function of canceling centrifugal force.
Figure 28:
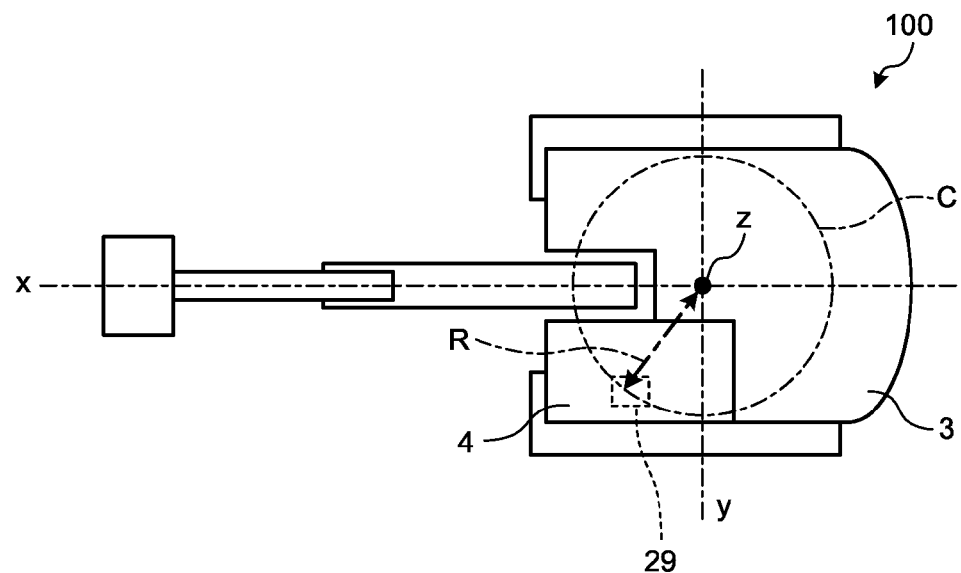
FIG. 28 is a diagram for describing an example of the mounting position of the IMU.
Figure 29:
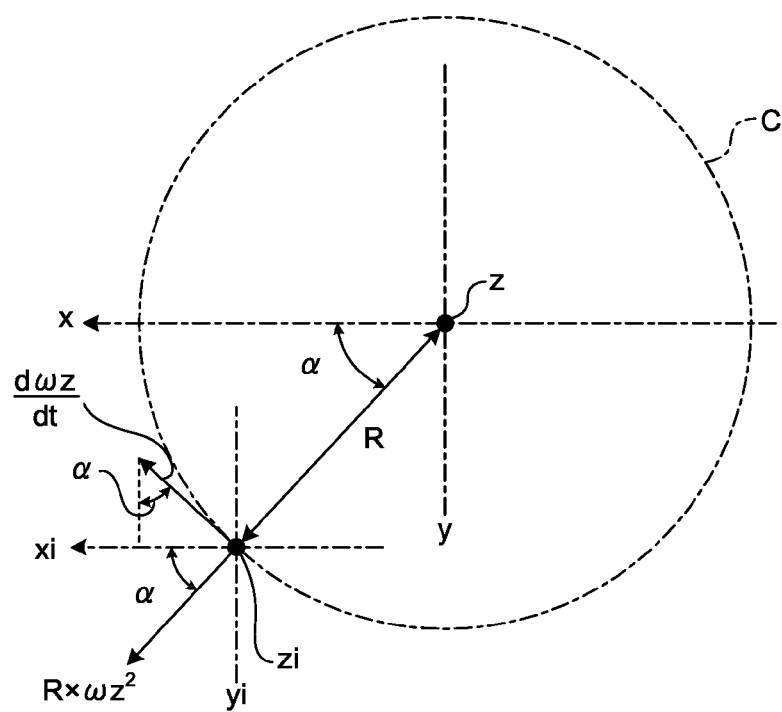
FIG. 29 is a diagram for describing a local coordinate system of an excavator and a local coordinate system of the IMU.

FIG. 27 is a control block diagram of a sensor control apparatus 24a having the function of canceling centrifugal force. FIG. 28 is a diagram for describing an example of the mounting position of the IMU 29. FIG. 29 is a diagram for describing a local coordinate system of the excavator 100 and a local coordinate system of the IMU 29.

The sensor control apparatus 24a is similar to the above-described sensor control apparatus 24, but takes into account the influence of acceleration other than gravitational acceleration acting on the IMU 29. That is, the difference is that, since acceleration outputted from the IMU 29 includes components other than gravitational acceleration in connection with the placement position of the IMU 29, acceleration that is corrected taking into account the components is outputted. The sensor control apparatus 24a implements obtaining higher accuracy posture angle by outputting a posture angle taking into account the influence of the placement position of the IMU 29. Hence, the sensor control apparatus 24a includes an acceleration correcting unit 56. The acceleration correcting unit 56 is provided in a second posture angle computing unit 50a. The acceleration correcting unit 56 corrects acceleration Ac of the excavator 100 detected by the IMU 29, and outputs corrected acceleration Acc. A third posture angle computing unit 51 finds a posture angle $\theta$ from the corrected acceleration Acc. The correction performed by the acceleration correcting unit 56 is, for example, to remove acceleration determined from centrifugal force (centrifugal acceleration) acting on the IMU 29 in connection with the placement position of the IMU 29, and acceleration other than gravitational acceleration acting on the IMU 29 such as angular acceleration, from the acceleration Ac detected by the IMU 29. Note that the acceleration determined from centrifugal acceleration and the angular acceleration which act on the IMU 29 in connection with the placement position of the IMU 29 may be detected by a detection apparatus other than the IMU 29, e.g., an accelerometer. In this case, the acceleration correcting unit 56 removes acceleration other than gravitational acceleration detected by the accelerometer, from the acceleration Ac of the excavator 100 detected by the IMU 29. Next, the necessity to perform a process taking into account the influence of acceleration in connection with the placement position of the IMU 29, in the above-described sensor control apparatus 24 will be described.

FIG. 28 illustrates a state of the excavator 100 viewed from the x-axis direction. As described above, the IMU 29 is placed at the bottom of the operator cab 4 of the upper swing body 3. The IMU 29 is placed at a position away by a predetermined distance in both of the x-axis direction and the y-axis direction from the z-axis with reference to the z-axis which is the central swing axis of the upper swing body 3. Specifically, as illustrated in FIG. 28, the IMU 29 is placed on the circumference of a circle C with a predetermined distance R from the z-axis being a radius. Since the IMU 29 is placed at such a position, when the upper swing body 3 swings about the z-axis, the IMU 29 is influenced by centrifugal acceleration and angular acceleration acting on the IMU 29 according to the magnitude of the predetermined distance R. As a result, the acceleration Ac outputted from the IMU 29 is influenced by the centrifugal acceleration and the angular acceleration. Due to this, a gap occurs between the acceleration Ac detected by the IMU 29 and actual acceleration acting on the excavator 100 which is required to find a posture angle. If space for placing the IMU 29 can be provided on the z-axis which is the central swing axis of the upper swing body 3, then such a gap does not occur and thus the gap does not need to be taken into account and the above-described sensor control apparatus 24 can be used. However, since a swing motor and the like are placed near the central swing axis of the actual excavator 100, sufficient space for placing the IMU 29 cannot be provided. Therefore, in the case of such an excavator 100, the IMU 29 needs to be placed at a position away from the z-axis. Hence, the sensor control apparatus 24a according to a variant, the details of which will be described next, is required.

As illustrated in FIG. 29, the local coordinate system (xi, yi, zi) of the IMU 29 is present at a position away by a predetermined distance in both of the x-axis direction and the y-axis direction from the z-axis of the local coordinate system (x, y, z) of the excavator 100, i.e., a position away by the distance R from the z-axis. In the present embodiment, the zi-axis (vertical axis) of the local coordinate system of the IMU 29 passes through, for example, the position of the center of gravity of the IMU 29. Acceleration other than gravitational acceleration received by the IMU 29 is the above-described centrifugal acceleration and angular acceleration. Thus, by removing these acceleration components from the acceleration Ac detected by the IMU 29, acceleration acting on the excavator 100 and required to compute a posture angle can be determined.

When the angular velocity (swing speed) about the z-axis of the local coordinate system of the excavator 100 is ωz, centrifugal acceleration acting on the IMU 29 is $R \times \omega z^2$. The angular velocity (swing speed) ωz is angular velocity in the Zi-axis direction outputted from the IMU 29. In addition, the angular acceleration acting on the IMU 29 can be determined by differentiating the angular velocity (swing speed) ωz with respect to time t. Namely, the angular acceleration=dωz/dt. For the acceleration Ac detected by the IMU 29, the acceleration in the xi-axis direction of the local coordinate system of the IMU 29 is Acx, and the acceleration in the yi-axis direction is Acy. The acceleration Acx and the acceleration Acy are acceleration acting on the excavator 100 and are acceleration required to compute a posture angle.

In addition, for the acceleration Ac detected by the IMU 29, when the acceleration component in the x-axis direction of the local coordinate system of the excavator 100 is Accx, and the acceleration component in the y-axis direction is Accy, they can be expressed by equation (11) and equation (12), respectively. Acceleration in the zi-axis direction detected by the IMU 29 does not change by whether there are acceleration determined from centrifugal force (centrifugal acceleration) and the like, acting on the IMU 29. Thus, the acceleration in the zi-axis direction detected by the IMU 29 is acceleration in the z-axis direction of the excavator 100.

$$\text{Acc}x = \text{Ac}x - R \times \omega z^2 \times \cos\alpha - R \times (d\omega z/dt) \times \sin\alpha \quad (11)$$

$$\text{Acc}y = \text{Ac}y - R \times \omega z^2 \times \sin\alpha + R \times (d\omega z/dt) \times \cos\alpha \quad (12)$$

In the right-hand side of equation (11), components other than the acceleration Acx are removal components. In the right-hand side of equation (12), components other than the acceleration Acy are removal components. The removal components are components related to acceleration determined from centrifugal force (centrifugal acceleration) and angular acceleration. Specifically, the component related to the acceleration determined from centrifugal force (centrifugal acceleration) is $R \times \omega z2 \times \cos\alpha$ in equation (11) and is $R \times \omega z2 \times \sin\alpha$ in equation (12). In addition, the component related to the angular acceleration is $R \times (d\omega z/dt) \times \sin\alpha$ in equation (11) and is $R \times (d\omega z/dt) \times \cos\alpha$ in equation (12).

α in equation (11) and equation (12) is an angle formed by the y-axis of the local coordinate system of the excavator 100 and a tangent at a point on the circumference of the circle C, which is the placement position of the IMU 29. This angle is a placement angle α. The placement angle α represents the tilt of the position where the IMU 29 is placed in the local coordinate system (x, y, z) of the excavator 100. As described above, the acceleration Acx and the acceleration Acy are acceleration acting on the excavator 100 and required to compute a posture angle. As can be seen from equation (11) or equation (12), the acceleration Acx and the acceleration Acy can be determined by performing a correction to remove the above-described removal components from the acceleration component Accx in the x-axis direction and the acceleration component Accy in the y-axis direction which are detected by the IMU 29.

The acceleration Acx and the acceleration Acy are acceleration in the xi-axis direction and acceleration in the yi-axis direction, respectively. When the gravitational acceleration is G, the acceleration Acx and the acceleration Acy are as shown in equation (13) and equation (14), respectively.

$$\text{Ac}x = G \times \sin(\gamma y) \quad (13)$$

$$\text{Ac}y = -G \times \sin(\gamma x) \times \cos(\gamma y) \quad (14)$$

Here, γx is the roll angle about the xi-axis and γy is the pitch angle about the yi-axis. The roll angle γx and the pitch angle γy are tilt angles about axes other than the z-axis of the local coordinate system (xi, yi, zi) of the IMU 29, i.e., the vertical axis. When the IMU 29 is not swinging, i.e., when acceleration other than gravitational acceleration is not acting on the IMU 29, the acceleration Acx and the acceleration Acy are identical to the acceleration component Accx and acceleration component Accy detected by the IMU 29. If the acceleration Acx and the acceleration Acy can be obtained, then the roll angle γx and the pitch angle γy are found from equation (13) and equation (14).

In the following, when the acceleration component Accx and acceleration component Accy outputted from the IMU 29 are not distinguished from each other, they are referred to as to-be-corrected acceleration Accd. When the acceleration Acx and the acceleration Acy which are acceleration acting on the excavator 100 and are required to compute a posture angle are not distinguished from each other, they are referred to as acceleration Ac.

As described above, the acceleration correcting unit 56 illustrated in FIG. 27 corrects the to-be-corrected acceleration Accd (acceleration Accx and Accy) detected by the IMU 29, based on information on the IMU 29. The information on the IMU 29 includes information on the position where the IMU 29 is placed, and is, for example, information contained in equation (11) and equation (12). In the present embodiment, the information on the IMU 29 includes the roll angle γx, the pitch angle γy, the placement angle α representing the position where the IMU 29 is placed, the distance R to the location where the IMU 29 is placed with reference to the z-axis of the local coordinate system (x, y, z) of the excavator 100, and the angular velocity ωz about the z-axis of the local coordinate system of the excavator 100, i.e., the vertical axis.

As described above, the acceleration correcting unit 56 illustrated in FIG. 27 corrects the acceleration Acc detected by the IMU 29, using equation (11) and equation (12) and thereby determines the acceleration Acx and Acy. The acceleration Acx and Acy do not contain the components of centrifugal acceleration and angular acceleration which occur by the IMU 29 swinging about the z-axis. Thus, the acceleration correcting unit 56 can output the same acceleration and angular velocity as those for when the IMU 29 is placed on the central swing axis. Hence, the accuracy of a posture angle θo outputted from the sensor control apparatus 24a improves. In addition, the sensor control apparatus 24a can calculate a correct swing angle, regardless of the operating state of the excavator 100. As a result, the work implement control apparatus 25 illustrated in FIG. 2 can calculate the position of the tooth edges 8T of the bucket 8 for when the upper swing body 3 swings, with higher accuracy.

Although the swing speed ωz uses angular velocity in an xi-yi-plane detected by the IMU 29, the one that detects the swing speed ωz is not limited to the IMU 29. For example, a detected value of a rotation angle detection apparatus that detects a rotation angle of the upper swing body 3 may be used as the swing speed ωz, or the swing speed ωz may be determined based on the engine speed of a swing motor that allows the upper swing body 3 to rotate.

Note that when the IMU 29 cannot be placed on the central swing axis of the excavator 100, in order to calculate the position of the tooth edges 8T of the bucket 8 included in the work implement 2, with higher accuracy, it is preferred to use the sensor control apparatus 24a described as the variant, rather than the sensor control apparatus 24 according to the embodiment which is described previously. This is because the sensor control apparatus 24a described as the variant performs a process taking into account the placement position of the IMU 29, as described above.

(First Variant of the Sensor Control Apparatus)

Figure 30:
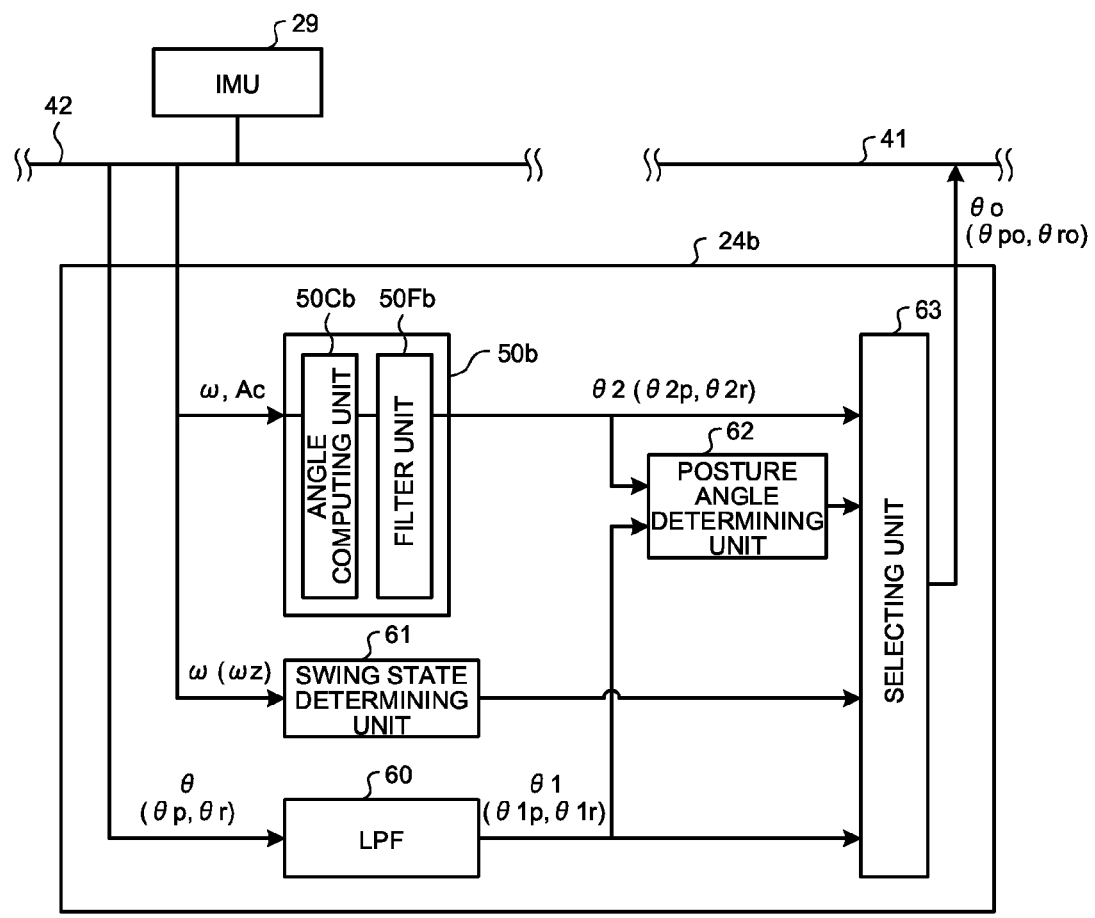
FIG. 30 is a control block diagram of a sensor control apparatus according to a first variant.

FIG. 30 is a control block diagram of a sensor control apparatus 24b according to a first variant. In the present variant, the posture angle computing unit 29CP of the IMU 29 illustrated in FIG. 15 functions as a first posture angle computing unit that finds a posture angle θ of the work machine from angular velocity ω and acceleration Ac detected by the gyro 29V and the acceleration sensor 29A which serve as detection apparatuses, and inputs the posture angle θ to a low-pass filter 60. The detected values of the IMU 29 are inputted to the sensor control apparatus 24b through the in-vehicle signal lines 42. The angular velocity ω, the acceleration Ac, and the posture angle θ are inputted to the sensor control apparatus 24b from the IMU 29. The sensor control apparatus 24b includes a second posture angle computing unit 50b, the low-pass filter 60, and a selecting unit 63. In addition to them, the sensor control apparatus 24b includes a swing state determining unit 61 and a posture angle determining unit 62.

The second posture angle computing unit 50b includes an angle computing unit 50Cb and a filter unit 50Fb. The angle computing unit 50Cb finds a posture angle θ from the angular velocity ω and acceleration Ac detected by the gyro 29V and the acceleration sensor 29A of the IMU 29 illustrated in FIG. 3. The sensor control apparatus 24b may have the acceleration correcting unit 56 included in the sensor control apparatus 24a of the second variant.

The filter unit 50Fb serving as a second filter allows the posture angle θ found by the angle computing unit 50Cb to pass therethrough to reduce noise, and then, outputs the posture angle θ as a second posture angle θ2. The filter unit 50Fb has a higher cutoff frequency than the low-pass filter 60. The second posture angle θ2 outputted from the second posture angle computing unit 50b is inputted to the selecting unit 63 without passing through the low-pass filter 60. Since the filter unit 50Fb included in the sensor control apparatus 24b has a simpler structure than the filter unit 50F included in the above-described sensor control apparatus 24, the sensor control apparatus 24b has an advantage in that the manufacturing cost is reduced.

In the present variant, the second posture angle computing unit 50b does not need to include the filter unit 50Fb. In this case, the posture angle θ found by the angle computing unit 50Cb is inputted as the second posture angle θ2 to the posture angle determining unit 62 and the selecting unit 63.

(Second Variant of the Sensor Control Apparatus)

Figure 31:
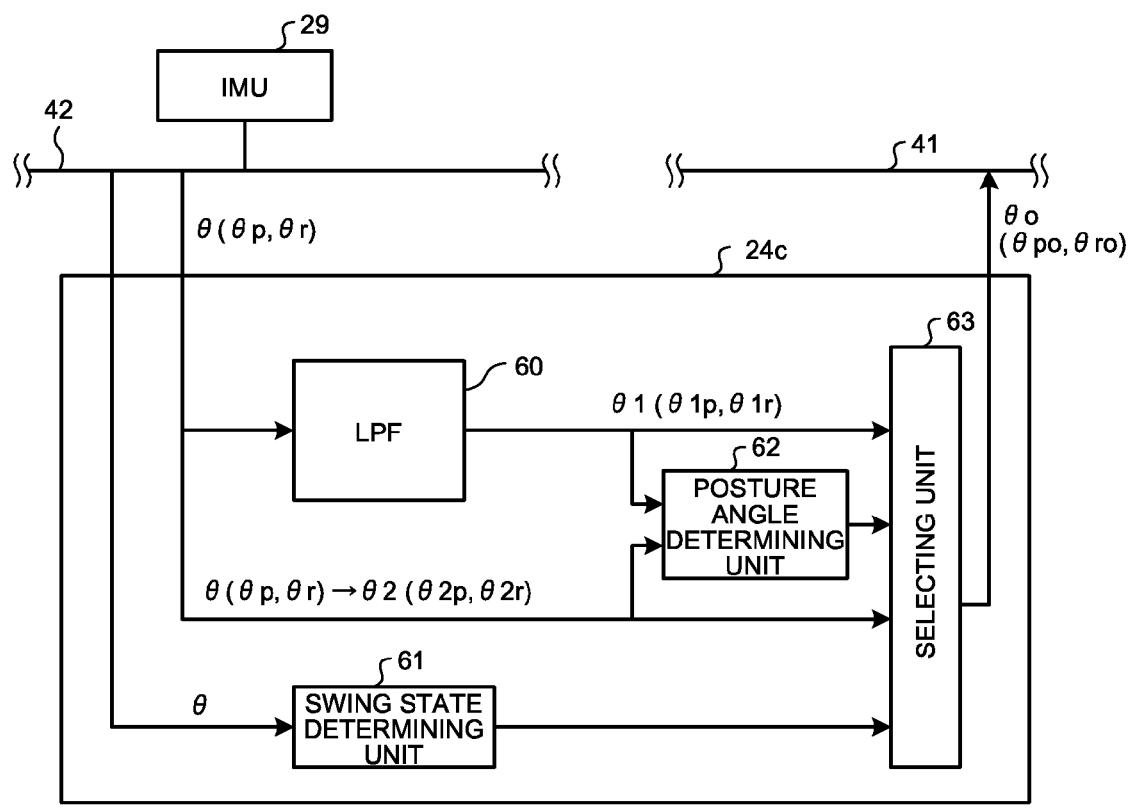
FIG. 31 is a block diagram of a sensor control apparatus according to a second variant.

FIG. 31 is a block diagram of a sensor control apparatus 24c according to a second variant. The sensor control apparatus 24c does not include the second posture angle computing unit 50b of the sensor control apparatus 24b illustrated in FIG. 30. The difference is that a posture angle θ found by the posture angle computing unit 29CP of the IMU 29 illustrated in FIG. 15 is directly inputted as a second posture angle θ2 to a selecting unit 63. A low-pass filter 60 of the sensor control apparatus 24c performs a filtering process on the posture angle θ found by the posture angle computing unit 29CP of the IMU 29, and thereby obtains a first posture angle θ1, and outputs the first posture angle θ1 to the selecting unit 63. In the posture angle computing unit 29CP of the IMU 29, the posture angle θ is a second posture angle θ2. The second posture angle θ2 is inputted to the selecting unit 63 without passing through the low-pass filter 60. The sensor control apparatus 24c does not include the second posture angle computing unit 50b, and accordingly, the structure is simplified and the manufacturing cost is reduced.

Although the present embodiment and the variants thereof are described above, the present embodiment and the variants thereof are not limited to the above-described content. In addition, the above-described components include those that can be easily assumed by those skilled in the art, substantially the same ones, and those in a so-called range of equivalency. Furthermore, the above-described components can be combined, as appropriate. Furthermore, at least one of various omissions, replacements, and changes can be made to the components without departing from the spirit and scope of the present embodiment and the variants thereof. For example, although the work implement 2 has the boom 6, the arm 7, and the bucket 8 which is a work tool, a work tool mounted on the work implement 2 is not limited thereto and is not limited to the bucket 8. The work machine is not limited to the excavator 100. For example, the work machine may be any as long as the work machine has a swing body on a lower traveling body. The processes performed by the sensor control apparatuses 24, 24a, 24b, and 24c may be processed by other controllers, e.g., the second display apparatus 39 or the work implement control apparatus 25. The filters through which posture angles pass are not limited to complementary filters, and may be filters of other types. Excavation control is not limited to the above-described one.

REFERENCE SIGNS LIST

1 VEHICLE MAIN BODY
2 WORK IMPLEMENT
3 UPPER SWING BODY
5 TRAVELING APPARATUS
6 BOOM
7 ARM
8 BUCKET
8T TOOTH EDGES
20 and 21 ANTENNA
23 GLOBAL COORDINATE COMPUTING UNIT
24, 24a, 24b, and 24c SENSOR CONTROL APPARATUS
25 WORK IMPLEMENT CONTROL APPARATUS
26 ENGINE CONTROL APPARATUS
27 PUMP CONTROL APPARATUS
28 FIRST DISPLAY APPARATUS
29 IMU
29V GYRO
29A ACCELERATION SENSOR
29CP POSTURE ANGLE COMPUTING UNIT
29PT PHYSICAL QUANTITY CONVERTING UNIT
39 SECOND DISPLAY APPARATUS
41 and 42 IN-VEHICLE SIGNAL LINE
50 and 50a SECOND POSTURE ANGLE COMPUTING UNIT
50C ANGLE COMPUTING UNIT
50F, 50Fa, and 50Fb FILTER UNIT
51 THIRD POSTURE ANGLE COMPUTING UNIT
52 FOURTH POSTURE ANGLE COMPUTING UNIT
53 FIRST COMPLEMENTARY FILTER
54 SECOND COMPLEMENTARY FILTER
55 SWITCHING UNIT
60 LOW-PASS FILTER
61 SWING STATE DETERMINING UNIT
62 POSTURE ANGLE DETERMINING UNIT
63 SELECTING UNIT
100 EXCAVATOR
θ1 FIRST POSTURE ANGLE
θ2 SECOND POSTURE ANGLE
θ3 THIRD POSTURE ANGLE
θ4 FOURTH POSTURE ANGLE

The invention claimed is:

1. A posture computing apparatus for a work machine, to obtain a posture angle of the work machine including a work implement, the posture computing apparatus comprising:
a detection apparatus that detects angular velocity and acceleration, the detection apparatus being provided to the work machine;
a first posture angle computing unit that obtains a posture angle of the work machine from the angular velocity and the acceleration detected by the detection apparatus, the first posture angle computing unit being provided to the detection apparatus;
a low-pass filter that allows the posture angle obtained by the first posture angle computing unit to pass therethrough to output the posture angle whose high-frequency components are reduced as a first posture angle;
a second posture angle computing unit that outputs, as a second posture angle, a posture angle obtained from the angular velocity and the acceleration detected by the detection apparatus, a responsiveness of the second posture angle to a change in the posture of the work machine being higher than that of the first posture angle; and
a selecting unit that obtains an amount of change in the posture angle of the work machine, and determines change in the posture of the work machine based on the amount of change in the posture angle, and outputs the first posture angle when the amount of change in the posture angle is smaller than or equal to a predetermined threshold value, and the second posture angle when the amount of change in the posture angle exceeds the predetermined threshold value, to control the work machine including the work implement.

2. A posture computing apparatus for a work machine, to obtain a posture angle of the work machine including a work implement, the posture computing apparatus comprising:
a detection apparatus that detects angular velocity and acceleration, the detection apparatus being provided to the work machine;
a posture angle computing unit that obtains a posture angle of the work machine from the angular velocity and the acceleration detected by the detection apparatus, the posture angle computing unit being provided to the detection apparatus;
a low-pass filter that performs a filtering process on the posture angle obtained by the posture angle computing unit, to obtain a first posture angle whose high-frequency components are reduced; and
a selecting unit that uses, as a second posture angle, the posture angle in the posture angle computing unit, a responsiveness of the second posture angle to a change in the posture of the work machine being higher than that of the first posture angle, and obtains an amount of change in the posture angle of the work machine, and determines change in the posture of the work machine based on the amount of change in the posture angle, and outputs the first posture angle when the amount of change in the posture angle is smaller than or equal to a predetermined threshold value, and the second posture angle when the amount of change in the posture angle exceeds the predetermined threshold value, to control the work machine including the work implement.

3. The posture computing apparatus for a work machine according to claim 1, wherein
the second posture angle computing unit includes:
a first complementary filter that includes a first Low Pass Filter, a first High Pass Filter, a first adding unit which adds an output from the first Low Pass Filter and an output from the first High Pass Filter to output the added output, wherein the first complementary filter is set with a first cutoff frequency at which a gain of the first Low Pass Filter and a gain of the first High Pass Filter are predetermined value, and the angular velocity detected by the detection apparatus is input to the first Low Pass Filter, and the posture angle obtained from the acceleration is input to the first High Pass Filter so that the first complementary filter reduces noise contained in the posture angle obtained from the angular velocity and the acceleration detected by the detection apparatus to output a third posture angle from the first adding unit;

a second complementary filter that includes a second Low Pass Filter, a second High Pass Filter, a second adding unit which adds an output from the second Low Pass Filter and an output from the second High Pass Filter to output the added output, wherein the second complementary filter is set with a second cutoff frequency at which a gain of the second Low Pass Filter and a gain of the second High Pass Filter are predetermined value, the second cutoff frequency being different from the first cutoff frequency, and the angular velocity detected by the detection apparatus is input to the second Low Pass Filter, and the posture angle obtained from the acceleration is input to the second High Pass Filter so that the second complementary filter reduces noise contained in the posture angle obtained from the angular velocity and the acceleration detected by the detection apparatus to output a fourth posture angle from the second adding unit; and a switching unit that outputs, as the second posture angle, the third posture angle or the fourth posture angle in a switching manner, according to a state of movement of the work machine.

4. The posture computing apparatus for a work machine according to claim 1, wherein the second posture angle is an angle obtained by allowing the posture angle of the work machine to pass through a filter with a higher cutoff frequency than that of the low-pass filter.

5. The posture computing apparatus for a work machine according to claim 1, wherein the information about the change in the posture angle is information about a swing of the work machine.

6. The posture computing apparatus for a work machine according to claim 5, wherein
the work machine includes a traveling body and a swing body provided on top of the traveling body, and
the information about a swing of the work machine is a swing speed of the swing body, and
the selecting unit outputs the first posture angle when the swing speed is less than or equal to a predetermined threshold value, and outputs the second posture angle when the swing speed exceeds the predetermined threshold value.

7. The posture computing apparatus for a work machine according to claim 1, wherein the selecting unit outputs the second posture angle when a difference between the first posture angle and the second posture angle exceeds a predetermined threshold value.

8. The posture computing apparatus for a work machine according to claim 6, wherein the selecting unit outputs the first posture angle when a swing speed of the swing body is less than or equal to a predetermined threshold value, outputs the second posture angle when the swing speed exceeds the predetermined threshold value, and outputs the second posture angle when a difference between the first posture angle and the second posture angle exceeds a predetermined threshold value.

9. The work machine comprising:
a posture computing apparatus for the work machine according to claim 1, wherein
at least some position information of the work machine is obtained using the first posture angle or the second posture angle outputted from the posture computing apparatus for the work machine.

10. The work machine according to claim 9, comprising:
a position detection apparatus that detects position information of the work machine; and
a target excavation topography generating apparatus that determines a position of a work implement based on the at least some position information of the work machine outputted from the posture computing apparatus for a work machine, and the position information detected by the position detection apparatus, and generates information about a target excavation topography representing a target shape of an excavation object of the work implement, from information on a target working plane representing the target shape.

11. The work machine according to claim 10, comprising a display apparatus that displays the target excavation topography, based on display information for displaying the target excavation topography.

12. The work machine according to claim 10, comprising a work implement control unit that performs excavation control such that a speed in a direction in which the work implement approaches the excavation object is less than or equal to a speed limit, based on the information about a target excavation topography obtained from the target excavation topography generating apparatus.

13. A posture computation method for a work machine, to obtain a posture angle of the work machine including a work implement, the posture computation method comprising:
allowing a posture angle of the work machine to pass through a low-pass filter to output the posture angle whose high-frequency components are reduced as a first posture angle, and outputting the posture angle of the work machine as a second posture angle without allowing the posture angle of the work machine to pass through the low-pass filter, a responsiveness of the second posture angle to a change in a posture of the work machine being higher than that of the first posture angle; and
obtaining an amount of change in the posture angle of the work machine, and determining change in the posture of the work machine based on the amount of change in the posture angle, and outputting the first posture angle when the amount of change in the posture angle is smaller than or equal to a predetermined threshold value, and the second posture angle when the amount of change in the posture angle exceeds the predetermined threshold value, to control the work machine including the work implement.

14. The posture computing apparatus for a work machine according to claim 2, wherein the information about the change in the posture angle is information about a swing of the work machine.

15. The posture computing apparatus for a work machine according to claim 14, wherein
the work machine includes a traveling body and a swing body provided on top of the traveling body, and
the information about a swing of the work machine is a swing speed of the swing body, and
the selecting unit outputs the first posture angle when the swing speed is less than or equal to a predetermined threshold value, and outputs the second posture angle when the swing speed exceeds the predetermined threshold value.

16. The posture computing apparatus for a work machine according to claim 2, wherein the selecting unit outputs the second posture angle when a difference between the first posture angle and the second posture angle exceeds a predetermined threshold value.

17. The work machine comprising:
a posture computing apparatus for the work machine according to claim 2, wherein
at least some position information of the work machine is obtained using the first posture angle or the second posture angle outputted from the posture computing apparatus for the work machine.

18. The work machine according to claim 17, comprising:
a position detection apparatus that detects position information of the work machine; and
a target excavation topography generating apparatus that determines a position of a work implement based on the at least some position information of the work machine outputted from the posture computing apparatus for a work machine, and the position information detected by the position detection apparatus, and generates information about a target excavation topography representing a target shape of an excavation object of the work implement, from information on a target working plane representing the target shape.

19. The work machine according to claim 18, comprising a display apparatus that displays the target excavation topography, based on display information for displaying the target excavation topography.

20. The work machine according to claim 18, comprising a work implement control unit that performs excavation control such that a speed in a direction in which the work implement approaches the excavation object is less than or equal to a speed limit, based on the information about a target excavation topography obtained from the target excavation topography generating apparatus.

21. The work machine according to claim 1, wherein the posture angle includes a pitch angle of the work machine.

* * * * *